US011532954B2

(12) United States Patent
Lee et al.

(10) Patent No.: US 11,532,954 B2
(45) Date of Patent: Dec. 20, 2022

(54) REFRIGERATOR

(71) Applicant: LG Electronics Inc., Seoul (KR)

(72) Inventors: Seonghun Lee, Seoul (KR);
Byungsang Jung, Seoul (KR);
Hwanyong Kim, Seoul (KR); Seungje Park, Seoul (KR); Sangdoo Ha, Seoul (KR); Yongjun Son, Seoul (KR);
Seonwook Park, Seoul (KR); Jaesung Yang, Seoul (KR); Wonbok Lee, Seoul (KR); Gyoocheol Choi, Seoul (KR);
Joonggil Jeong, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/576,168

(22) Filed: Jan. 14, 2022

(65) Prior Publication Data

US 2022/0140658 A1 May 5, 2022

Related U.S. Application Data

(60) Continuation of application No. 17/103,202, filed on Nov. 24, 2020, now Pat. No. 11,239,702, which is a
(Continued)

(30) Foreign Application Priority Data

Jan. 4, 2016 (KR) .................... 10-2016-0000586
Apr. 25, 2016 (KR) .................... 10-2016-0050154
(Continued)

(51) Int. Cl.
*H02J 50/12* (2016.01)
*H01F 27/36* (2006.01)
(Continued)

(52) U.S. Cl.
CPC .............. *H02J 50/12* (2016.02); *F25D 11/00* (2013.01); *F25D 25/02* (2013.01); *F25D 27/005* (2013.01);
(Continued)

(58) Field of Classification Search
None
See application file for complete search history.

(56) References Cited

U.S. PATENT DOCUMENTS

| 2005/0081547 A1 | 4/2005 | Avenwedde et al. |
| 2012/0140440 A1 | 6/2012 | Dam et al. |

(Continued)

FOREIGN PATENT DOCUMENTS

| CN | 102635995 | 8/2012 |
| CN | 202393162 | 8/2012 |

(Continued)

OTHER PUBLICATIONS

Notice of Allowance in Korean Appln. No. 10-2021-7033156, dated Apr. 6, 2022, 5 pages (with English translation).
(Continued)

*Primary Examiner* — Britt D Hanley
(74) *Attorney, Agent, or Firm* — Fish & Richardson P.C.

(57) ABSTRACT

Disclosed is a refrigerator for uniformly illuminating an inner space thereof. The refrigerator includes a cabinet including a storage compartment having a predetermined size, a shelf installed in the storage compartment, the shelf including a light source unit for illuminating an inside of the storage compartment, a transmitter connected to an external power supply for wirelessly transmitting power, the transmitter having a primary resonance frequency within a predetermined range, and a receiver for wirelessly receiving the power from the transmitter so as to supply the power to the light source unit of the shelf, the transmitter transmitting the
(Continued)

power to the receiver using a secondary resonance frequency generated when the receiver is located close to the transmitter.

19 Claims, 55 Drawing Sheets

Related U.S. Application Data division of application No. 16/458,819, filed on Jul. 1, 2019, now Pat. No. 10,886,785, which is a continuation of application No. 15/381,402, filed on Dec. 16, 2016, now Pat. No. 10,340,741, which is a continuation of application No. PCT/KR2016/008400, filed on Jul. 29, 2016.

(60) Provisional application No. 62/311,917, filed on Mar. 23, 2016.

(30) Foreign Application Priority Data

May 18, 2016 (KR) .......... 10-2016-0060770
Jun. 24, 2016 (KR) .......... 10-2016-0079572

(51) Int. Cl.
*F25D 11/00* (2006.01)
*F25D 25/02* (2006.01)
*F25D 27/00* (2006.01)
*F25D 29/00* (2006.01)
*H01F 38/14* (2006.01)
*H01F 27/28* (2006.01)

(52) U.S. Cl.
CPC ......... *F25D 29/008* (2013.01); *H01F 27/366* (2020.08); *H01F 38/14* (2013.01); *F25D 25/024* (2013.01); *F25D 2325/022* (2013.01); *F25D 2400/40* (2013.01); *F25D 2700/02* (2013.01); *H01F 27/2804* (2013.01); *H01F 27/36* (2013.01)

(56) References Cited

U.S. PATENT DOCUMENTS

| | | |
|---|---|---|
| 2012/0204581 A1 | 8/2012 | Kang |
| 2015/0035432 A1 | 2/2015 | Kendall et al. |
| 2016/0141078 A1 | 5/2016 | Hammond |
| 2016/0248275 A1 | 8/2016 | Okldan |
| 2016/0359372 A1 | 12/2016 | Lee |
| 2017/0025900 A1 | 1/2017 | Amari |

FOREIGN PATENT DOCUMENTS

| | | |
|---|---|---|
| CN | 102844954 | 12/2012 |
| CN | 104160590 | 11/2014 |
| DE | 102007029182 | 1/2009 |
| EP | 2824798 | 1/2015 |
| EP | 2950415 | 12/2015 |
| JP | 2005005424 | 1/2005 |
| JP | 2010065921 | 3/2010 |
| JP | 2012023913 | 2/2012 |
| JP | 2012213252 | 11/2012 |
| JP | 2013506399 | 2/2013 |
| JP | 2015008578 | 1/2015 |
| JP | 2015202025 | 11/2015 |
| KR | 1020040067549 | 7/2004 |
| KR | 1020060068763 | 6/2006 |
| KR | 100756449 | 8/2007 |
| KR | 20110034271 | 4/2011 |
| KR | 20110045445 | 5/2011 |
| KR | 20120052983 | 5/2012 |
| KR | 20120088709 | 8/2012 |
| KR | 1020130013219 | 2/2013 |
| KR | 20130040864 | 4/2013 |
| KR | 20130072181 | 7/2013 |
| KR | 1020130091739 | 8/2013 |
| KR | 1020130117096 | 10/2013 |
| KR | 20150093588 | 8/2015 |
| KR | 20150125525 | 11/2015 |
| KR | 20160047266 | 5/2016 |
| KR | 20170084990 | 7/2017 |
| KR | 1020180091703 | 8/2018 |
| KR | 1020190009432 | 1/2019 |
| WO | WO2011019589 | 2/2011 |
| WO | WO2011143059 | 11/2011 |
| WO | WO2013027761 | 3/2015 |
| WO | WO2015097809 | 3/2017 |

OTHER PUBLICATIONS

Chinese Office Action in Chinese Application No. 201680002288.3, dated Sep. 23, 2019, 25 pages (with English translation).
European Office Action in European Application No. 16 808 547.0, dated Apr. 23, 2020, 6 pages.
Extended European Search Report in European Application No. 16808547.0, dated Feb. 21, 2018, 9 pages.
International Search Report in International Application No. PCT/KR2016/008400, dated Nov. 23, 2016, 13 pages.
Japanese Office Action in Japanese Application No. 2017-538331, dated Aug. 11, 2020, 12 pages (with English translation).
Notice of Allowance issued in U.S. Appl. No. 15/381,361 dated Jun. 14, 2017, 13 pages.
Notice of Allowance in Korean Appln. No. 10-2017-7002915, dated Jul. 20, 2021, 1 pages (English translation).
Notice of Allowance in Korean Appln. No. 10-2017-7002914, dated Jul. 21, 2021, 1 pages (English translation).
Notice of Allowance in Korean Appln. No. 10-2017-7002916, dated Jul. 21, 2021, 1 pages (English translation).
KR Office Action in Korean Appln. No. 10-2017-7002914, dated May 17, 2021, 11 pages (with English translation).
KR Office Action in Korean Appln. No. 10-2019-7001846, dated May 10, 2021, 15 pages (with English translation).
KR Notice of Allowance in Korean Appln. No. 10-2019-7001846, dated Jul. 14, 2021, 8 pages (with English translation).

FIG. 10

| CONDITION | (a) WHEN EQUIVALENT RESISTANCE OF LOAD IS SMALL | WHEN STRUCTURE OF (a) & (c) CANNOT BE USED | (c) WHEN EQUIVALENT RESISTANCE OF LOAD IS LARGE |
|---|---|---|---|
| | $Q = \dfrac{1}{R_L}\sqrt{\dfrac{C_S}{L_{lk2}}} \geq 2$ | $|i_1| > |0.2 \times i_2|$ (AT CURRENT, $i_1 \fallingdotseq 0.5 \times i_2$) | $Q = R_L\sqrt{\dfrac{C_p}{L_{lk2}}} \geq 2$ |
| VARIATION IN STRUCTURE OF RECEIVER'S RESONATOR | TRANSMITTER RESONATOR / RECEIVER RESONATOR | TRANSMITTER RESONATOR / RECEIVER RESONATOR | TRANSMITTER RESONATOR / RECEIVER RESONATOR |

REFRIGERATOR

CROSS-REFERENCE TO RELATED APPLICATIONS

This application is a continuation of U.S. application Ser. No. 17/103,202, filed on Nov. 24, 2020, which is a divisional of U.S. application Ser. No. 16/458,819, filed on Jul. 1, 2019, now U.S. Pat. No. 10,886,785, which is a continuation of U.S. application Ser. No. 15/381,402, filed on Dec. 16, 2016, now U.S. Pat. No. 10,340,741, which is a continuation of International Application No. PCT/KR2016/008400, filed on Jul. 29, 2016, which claims the benefit of U.S. Provisional Application No. 62/311,917, filed on Mar. 23, 2016, which claims the benefit of foreign priority applications filed in Korea as Serial No. 10-2016-0000586 on Jan. 4, 2016, Serial No. 10-2016-0050154 on Apr. 25, 2016, Serial No. 10-2016-0060770 on May 18, 2016, and Serial No. 10-2016-0079572 on Jun. 24, 2016, all of which are incorporated by reference.

TECHNICAL FIELD

The present application relates to a refrigerator, and more particularly, to a shelf installed in the refrigerator.

BACKGROUND

Generally, a refrigerator is an apparatus that is configured to store food fresh. The refrigerator includes a machine room in the lower region of a main body. The machine room is generally installed in the lower region of the refrigerator in consideration of the center of gravity of the refrigerator, and to increase efficiency of assembly and reduce vibrations. A refrigeration cycle device is installed in the machine room of the refrigerator so that the inside of the refrigerator is kept in a frozen/refrigerated state so as to keep food fresh using the nature of low-pressure liquid-phase refrigerant, which absorbs outside heat while being changed to gas-phase refrigerant.

The refrigeration cycle device of the refrigerator is comprised of, for example, a compressor for changing low-temperature and low-pressure gas-phase refrigerant into high-temperature and high-pressure gas-phase refrigerant, a condenser for changing the high-temperature and high-pressure gas-phase refrigerant from the compressor into low-temperature and high-pressure liquid-phase refrigerant, and an evaporator for absorbing outside heat while changing the low-temperature and high-pressure liquid-phase refrigerant from the condenser into gas-phase refrigerant.

Because the space inside the refrigerator is dark, the inner space may be provided with illumination in order to allow a user to easily look for stored food. However, it may be difficult to illuminate the entire inner space because a light source is installed at a particular position in the inner space. Meanwhile, the refrigerator may include a shelf, which is installed in the inner space and is configured to support food. Because a plurality of shelves is installed in the inner space, the inner space may be uniformly illuminated when light sources are provided to these shelves. Therefore, for uniform illumination, it is necessary to consider an improvement in the shelf so as to illuminate the inner space.

SUMMARY

The present application is provided to solve the problem described above, and one object of the present application is to provide a refrigerator configured to uniformly illuminate the space inside the refrigerator.

In addition, another object of the present application is to provide a refrigerator having a shelf configured to illuminate the inner space.

According to one aspect of the present application to achieve the objects described above, there is provided a refrigerator including a cabinet including a storage compartment having a predetermined size, a shelf installed in the storage compartment, the shelf including a light source unit for illuminating an inside of the storage compartment, a transmitter connected to an external power supply for wirelessly transmitting power, the transmitter having a primary resonance frequency within a predetermined range, and a receiver for wirelessly receiving the power from the transmitter so as to supply the power to the light source unit of the shelf, wherein the transmitter transmits the power to the receiver using a secondary resonance frequency generated when the receiver is located close to the transmitter.

The secondary resonance frequency may be described as being greater than the primary resonance frequency, and more specifically, the secondary resonance frequency may be set so as to be greater than two times the primary resonance frequency. The primary resonance frequency may range from 100 kHz to 150 kHz, and the secondary resonance frequency may range from 300 kHz to 400 kHz.

The receiver may be configured to adjust a capacitance of a capacitor connected to a load of the light source unit depending on a resistance of the load in order to generate the secondary resonance frequency. More specifically, the receiver may include the capacitor connected in series and/or in parallel to the load depending on the resistance of the load of the light source unit.

The transmitter and the receiver may be provided respectively on a sidewall of the storage compartment and a side portion of the shelf so as to face each other. More specifically, the shelf may include a shelf member and brackets for supporting opposite side portions of the shelf member, and the transmitter may be installed in a sidewall of the storage compartment, and the receiver is installed in one of the side portions of the shelf. In addition, the receiver may be installed in a rear portion of one of the brackets.

Each of the transmitter and the receiver may include a shield member for blocking leaking electromagnetic waves. More specifically, the transmitter may include a first surface facing the receiver and a second surface opposite the first surface, and the shield member may be attached to the second surface. The receiver may include a first surface facing the transmitter, and a second surface opposite the first surface, and the shield member may be attached to the second surface.

The transmitter may include a circuit board, a coil formed on a surface of the circuit board facing the receiver for generating electromagnetic waves for power transmission, and a wire for connecting the circuit board and the external power supply to each other. In addition, the receiver may include a circuit board, a coil formed on a surface of the circuit board facing the transmitter for inducing current from electromagnetic waves transmitted from the transmitter, and a wire for connecting the circuit board and the light source unit to each other so as to supply the induced current.

Alternatively, according to another aspect to achieve the above objects, there is provided a refrigerator including a cabinet including a storage compartment having a predetermined size, a shelf installed in the storage compartment, the shelf including a light source unit for illuminating an inside of the storage compartment, a transmitter connected to an external power supply for wirelessly transmitting power, and a receiver for wirelessly receiving the power from the transmitter so as to supply the power to the light source unit of the shelf, wherein the light source unit includes a housing, and a light source module placed in the housing for emitting light.

The light source unit may be placed on a front portion of the shelf, and is oriented to emit light downward.

The housing may include a shield portion configured so as not to pass light, and a window configured to pass light, and the window may be located in a rear region of a bottom portion of the housing. The window may have a distance between a front end and a rear end thereof, and the distance may be set to half a distance between a front end and a rear end of the housing. In addition, the window may be curved. Moreover, the light source module may be oriented to emit light toward an upper inner surface of the housing, or may be tilted by a predetermined angle relative to a horizontal plane so as to emit light toward upper and front inner surfaces of the housing.

The light source unit may include a holder for holding the light source module, and the holder may include a stopper for supporting each of opposite ends of the light source module, and first and second arms for supporting a top and a bottom of the light source module respectively. In addition, the second arm may extend longer than the first arm.

The shelf may include a shelf member for supporting articles thereon, the shelf member having a transparent body, and the shelf member may include an opaque layer disposed on the transparent body for preventing leakage of light through the body. More specifically, the layer may be formed along an edge of the shelf member.

The light source unit may be oriented parallel to a horizontal plane so as to emit light vertically downward from the shelf, or is tilted by a predetermined angle relative to the horizontal plane so as to emit light to a rear portion of the shelf.

Alternatively, according to a further aspect to achieve the objects, there is provided a refrigerator including a cabinet including a storage compartment having a predetermined size, a shelf installed in the storage compartment, the shelf including a light source unit for illuminating an inside of the storage compartment, a transmitter connected to an external power supply for wirelessly transmitting power, and a receiver for wirelessly receiving the power from the transmitter so as to supply the power to the light source unit of the shelf, wherein each of the transmitter and the receiver includes a sealing member provided therein for preventing foreign impurities from being introduced thereinto.

The light source unit may include a housing, a light source module placed in the housing for emitting light, a holder placed in the housing for holding the light source module, and a first seal interposed between the housing and the holder for preventing foreign impurities from being introduced into the housing.

In addition, the light source unit may further include a head placed outside the housing so as to be coupled to the shelf, and a second seal provided inside the head for preventing foreign impurities from being introduced into the housing.

In addition, the light source unit may further include a third seal interposed between the holder and the light source module for preventing foreign impurities from reaching the light source module.

The refrigerator may further include a cover for covering the receiver so as to protect the receiver, and the cover may be formed of a material that does not impede wireless power transmission. More specifically, the cover may be formed of a non-conductive or non-metallic material.

According to examples described in the present application, the space inside a refrigerator may be uniformly illuminated when light sources are provided to shelves of the refrigerator. Further, problems, such as a short-circuit, an electric shock, or corrosion, do not occur when power is wirelessly supplied to the light sources of the shelves. Furthermore, when mechanical and circuitry components for wireless power transmission are optimally designed and optimized control thereof is applied, the space inside the refrigerator may be more effectively and efficiently illuminated.

The additional range of applicability of the examples described in the present application will become apparent from the following detailed description. However, because various changes and modifications will be clearly understood by those skilled in the art within the sprit and scope of the described examples, it should be understood that the detailed description and the preferred examples of the present application are merely given by way of example.

BRIEF DESCRIPTION OF THE DRAWINGS

FIG. 10 is a table illustrating conditions for the structures of the respective receivers illustrated in FIGS. 7 to 9.

DETAILED DESCRIPTION

Figure 1:
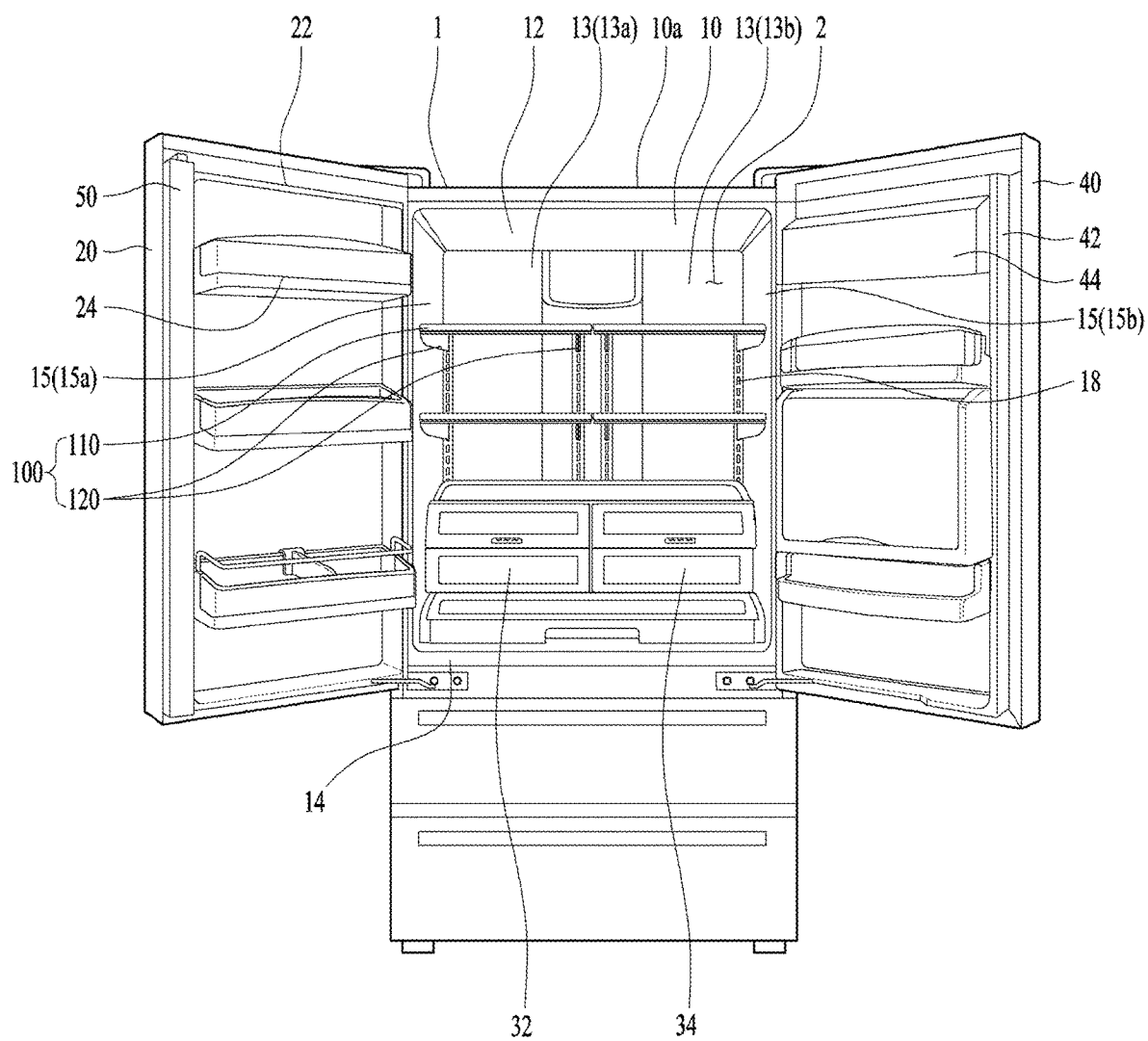
FIG. 1 is a front view illustrating a refrigerator according to the present application.

Generally, a refrigerator is an apparatus that keeps stored food for a long duration to prevent decomposition. To this end, the refrigerator defines a food storage space therein, the penetration of heat from the outside into which may be blocked by a cabinet and a door, which are filled with a thermal insulation material. In addition, the refrigerator includes a refrigeration device, which is comprised of an evaporator for absorbing heat inside the food storage space and a radiator for dissipating collected heat to the outside of the food storage space, thereby keeping the food storage space at a low temperature, at which the survival and proliferation of microorganisms is difficult.

The refrigerator is divided into a refrigerating compartment, which stores food at temperatures above zero, and a freezing compartment, which stores food at temperatures below zero. According to the arrangement of the refrigerating compartment and the freezing compartment, refrigerators are classified into, for example, a top-freezer-type refrigerator, which includes an upper freezing compartment and a lower refrigerating compartment, a bottom-freezer-type refrigerator, which includes a lower freezing compartment and an upper refrigerating compartment, and a sideby-side type refrigerator, which includes a left freezing compartment and a right refrigerating compartment. In addition, in order to allow the user to conveniently place or retrieve food into or from the food storage space, for example, a plurality of shelves and drawers is provided inside the food storage space.

Hereinafter, examples of the present application, which may concretely realize the objects described above, will be described with reference to the accompanying drawings.

In the drawings, the dimensions, shapes, or the like of constituent elements may be exaggerated for clarity and convenience of description. In addition, the terms, which are particularly defined while taking into consideration of the configurations and operations of the present application, may be replaced by other terms based on the intentions of users or operators, or customs. These terms should be defined based on the whole content of this specification.

The circuitry and structural configuration of a wireless power transmission system described in this specification may be applied to any device that requires wireless power transmission or charging. That is, although the configuration of the wireless power transmission system is mainly described in relation to the refrigerator, more particularly, a shelf in the following detailed description, it is not necessarily limited to the refrigerator, and may be used in all devices for wireless power transmission without particular alteration. For example, the circuitry and structural configuration of the wireless power transmission system may be directly applied to, for example, a cellular phone, smart phone, laptop computer, wearable device, HMD, sign, smart watch, smart glasses, TV, washing machine, cleaner, and air conditioner. Accordingly, any other devices including constituent elements described herein are included in the scope of the present disclosure.

FIG. 1 is a front view illustrating a refrigerator according to one example of the present application.

Referring to FIG. 1, the refrigerator according to one example includes a cabinet 1 defining the external appearance of the refrigerator.

The cabinet 1 is provided with a storage compartment 2 capable of storing food. The cabinet 1 may include an inner case 10, and an outer case 10a, which is spaced apart from the inner case 10 by a predetermined distance and surrounds the inner case 10. In addition, the space between the inner case 10 and the outer case 10a may be filled with a thermal insulation material.

The storage compartment 2 may be defined by the inner case 10, which is provided inside the cabinet 1. The storage compartment 2 includes a rear wall 13 forming a rear surface, a top wall 12 forming a top surface, two sidewalls 15 forming side surfaces, and a bottom wall 14 forming a bottom surface. The front surface of the storage compartment 2 may be open to allow the user to introduce or retrieve food into or from the storage compartment 2 therethrough. More particularly, the rear wall 13 may include a left rear wall 13a and a right rear wall 13b on opposite sides of the central portion. In addition, the sidewalls 15 may include a left sidewall 15a and a right sidewall 15b. In the following description, unless otherwise described, the rear wall 13 encompasses the left and right rear walls 13a and 13b, and reference numerals 13, 13a and 13b may be selectively used suitably to indicate the relative positions of related constituent elements. In the same manner, the sidewalls 15 encompass the left and right sidewalls 15a and 15b, and reference numerals 15, 15a and 15b may be selectively used suitably to indicate the relative positions of related constituent elements.

The cabinet 1 is provided at the front surface thereof with a first door 20, which is pivotally rotatably installed to the cabinet 1 and opens or closes one side of the storage compartment 2, and a second door 40, which is pivotally rotatably installed to the cabinet 1 and opens or closes the other side of the storage compartment 2. At this time, when the first door 20 and the second door 40 close the front surface of the storage compartment 2, the storage compartment 2 may be completely sealed.

The first door 20 may be provided with a pillar 50, which is rotated so as to come into contact with the second door 40. The pillar 50 may have the overall shape of a rectangle, and may be coupled to the first door 20 so as to be rotated relative to the first door 20.

The first door 20 may be provided with a door dike 22, which defines the external appearance of the rear side of the first door 20. In addition, the second door 40 may be provided with a door dike 42, which defines the external appearance of the rear side of the second door 40.

Baskets 44 and 24 may be installed on the respective door dikes 42 and 22, and may store various shapes of food therein.

The storage compartment 2 may accommodate a first drawer 32 located near the first door 20 and a second drawer 34 located near the second door 40. At this time, the first drawer 32 and the second drawer 34 may be placed in the same horizontal plane. That is, the first drawer 32 and the second drawer 34 may be placed on left and right sides at the same height within the storage compartment 2. The first drawer 32 and the second drawer 34 may be pulled outward independently of each other.

In one example of the present application, the first door 20 for opening or closing the left side of the storage compartment 2 and the second door 40 for opening or closing the right side of the storage compartment 2 are provided, whereby the left and right sides of one storage compartment 2 may be opened or closed by the respective doors 20 and 40.

A shelf 100, on which food may be placed, may be installed in the storage compartment 2. The shelf 100 may need to be supported by the inner sidewalls of the storage compartment 2 in order to support food. Assuming that the shelf 100 is supported by the left and right sidewalls 15a and 15b, the shelf 100 may continuously extend from the left sidewall 15a to the right sidewall 15b, such that only one shelf 100 may be installed at a certain height or in a certain plane. On the other hand, assuming that the shelf 100 is supported by the rear wall 13, as illustrated in FIG. 1, two or more shelves 100 may be arranged on left and right sides of the storage compartment 2. That is, a plurality of shelves 100 may be arranged in the same plane while being supported by the rear wall 13. In addition, the shelves 100, which are supported by the rear wall 13 or the sidewalls 15, may be arranged at different heights.

Meanwhile, because the storage compartment 2 of the refrigerator is dark, the inner space may be provided with illumination in order to allow the user to easily look for stored food. However, it may be difficult to illuminate the entire inner space because a light source is generally installed at a particular position in the inner space, for example, on the top wall 12 or the rear wall 13. Accordingly, the shelf 100 may be configured to illuminate the storage compartment 2. As described above, because the plural shelves 100 are installed in the storage compartment 2 so as to divide the storage compartment 2, providing the shelves 100 with light sources may allow the inner space, i.e. the storage compartment 2, to be uniformly illuminated.

When the shelf 100 incorporates a light source or an illumination device, a device for supplying a voltage to the light source is required. As such a power supply device, a connection structure for directly connecting a power supply to the light source using wires or electrical contacts may be applied. For example, a power input contact may be installed on the shelf 100 at a predetermined position, and a power output contact may be installed at a predetermined position on the refrigerator, i.e. on any one of the walls 12 to 15 of the storage compartment 2. Once the shelf 100 has been installed on any one of the walls 12 to 15 of the storage compartment 2, the power input contact and the power output contact may be connected to each other. Thereby, when a voltage is supplied, the light source of the shelf 100 may emit light. However, such a direct connection structure has a very high possibility of undergoing corrosion of the exposed contact of each of the shelf and the refrigerator main body due to the humid environment of the refrigerator itself or the failure of mechanical contacts thereof. In addition, when liquid stored inside the refrigerator is improperly maintained or when the shelf is immediately coupled after being washed, there is a very high possibility of a short-circuit or electric shock at the contacts.

Recently, wireless power transmission technology using magnetic flux linkage has been discussed, and has been developed so as to be commercialized in the field of wireless charging of electric vehicles as well as mobile appliances. In particular, as will be described below, such a wireless power transmission technology may be useful in devices that require a separable coupling structure, a waterproofing function or a vibration-proofing function because power may be transmitted using magnetic flux without wires. Accordingly, the shelf 100 may be configured to have a light source for illuminating the storage compartment 2, and a wireless power transmission system may be used to supply power to the light source.

Figure 2:
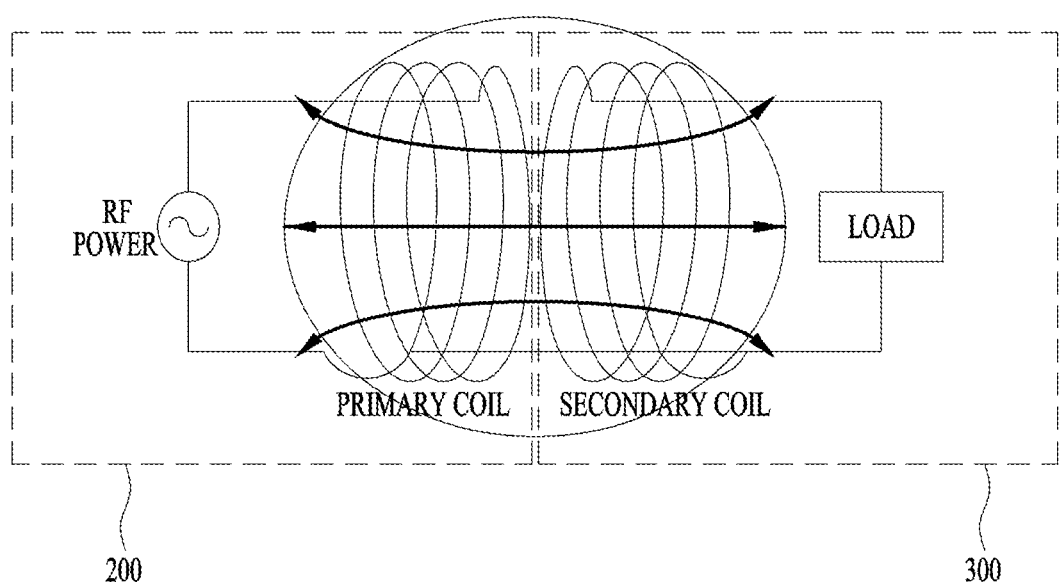
FIG. 2 is a schematic view schematically illustrating the circuit of a wireless power transmission system, which is mounted to a shelf of the refrigerator, according to one example of the present application.

FIG. 2 schematically illustrates the circuit of the wireless power transmission system, which is mounted to the shelf of the refrigerator, according to one example of the present application.

As illustrated in FIG. 2, the wireless power transmission system is comprised of a circuit including a primary coil (installed in the refrigerator main body) and a circuit including a secondary coil (installed in the shelf). The shelf is designed so as to be detachably attached to the refrigerator main body and to cause no problems due to, for example, washing. When alternating current (AC) is applied to the primary coil illustrated in FIG. 2, magnetism, i.e. electromagnetic waves, are generated, and in turn, the secondary coil induces magnetism due to the generated magnetism, i.e. the electromagnetic waves, which consequently causes power to be supplied to a load (e.g. LED).

The circuit including the primary coil illustrated in FIG. 2 may be installed in the refrigerator main body illustrated in FIG. 1, i.e. in the cabinet 1, and may constitute a transmitter 200 of the wireless power transmission system. In addition, the circuit including the secondary coil illustrated in FIG. 2 may be installed in the shelf 100 of the refrigerator illustrated in FIG. 1, and may constitute a receiver 300 of the wireless power transmission system. The wireless power transmission system may be configured as part of the refrigerator in order to supply a voltage to the light source of the shelf 100, and therefore, the transmitter 200 and the receiver 300 may also be configured as parts of the refrigerator. The mechanical configuration of the transmitter 200 and the receiver 300 will be described later in more detail with reference to FIGS. 14 to 53 in conjunction with the structure of the shelf 100, and the circuitry configuration thereof will first be described in detail. In the description of the circuitry configuration, for the convenience of description, although different reference numerals are given to the transmitter and the receiver, the transmitter and the receiver are respectively designated by reference numerals 200 and 300 throughout the specification.

The transmitter 200 and the receiver 300 may be designed in a printed circuit board (PCB) coil structure in order to achieve, for example, a small and thin structure. The power supplied to each shelf installed in the refrigerator is about 1.2 W, and the distance for the transmission of power, i.e. the distance between the shelf 100 and the refrigerator main body (e.g. the rear wall 13 or the sidewall 15 of the storage compartment 2) ranges from about 6 mm to 10 mm. When the distance is below 6 mm, friction between the rear wall 13 or the sidewall 15 and the shelf 100 may occur due to the short distance during the mounting or separation of the shelf 100, thus causing damage thereto. In addition, because the rear wall 13 and the sidewall 15 may be raised due to the thermal insulation material between the inner case 10 and the outer case 10a of the refrigerator, the raised rear wall 13 or sidewall 15 may interfere with the shelf 100 when the distance is below 6 mm. When the distance is above 10 mm, the efficiency of wireless power transmission may be deteriorated, and the generation of a secondary resonance frequency may be impeded. Therefore, when the distance between the shelf 100 and the refrigerator main body is set to a range from about 6 mm to 10 mm as described above, this is advantageous in preventing damage to the shelf 100 and the rear wall 13 or the sidewall 15 and in ensuring efficient wireless power transmission. Because the transmitter 200 and the receiver 300 are installed respectively in the refrigerator main body and the shelf 100, the aforementioned distance may also be equally applied to the distance between the transmitter 200 and the receiver 300. Of course, the numerical values are only given by way of example, and the scope of the present application should of course be interpreted based on the description of the claims.

In addition, for cost reduction, other communication functions are not applied to the transmitter 200 and the receiver 300. Meanwhile, although there is a technical effect of cost reduction in the case where a foreign object detection (FOD) function is omitted, a heat emission issue is anticipated in the event that a metallic foreign substance is brought close after the shelf is removed. In order to solve the problem described above, the present application has a feature of using a secondary resonance frequency band. This will be described later in more detail with reference to FIG. 4 and the following drawings.

In addition, the time during which a voltage is supplied to the transmitter 200 installed in the refrigerator main body is set to about 7 minutes from the point in time at which the door of the refrigerator is opened. Of course, an alternative setting to other numerical values falls within the scope of the present application.

Figure 3:
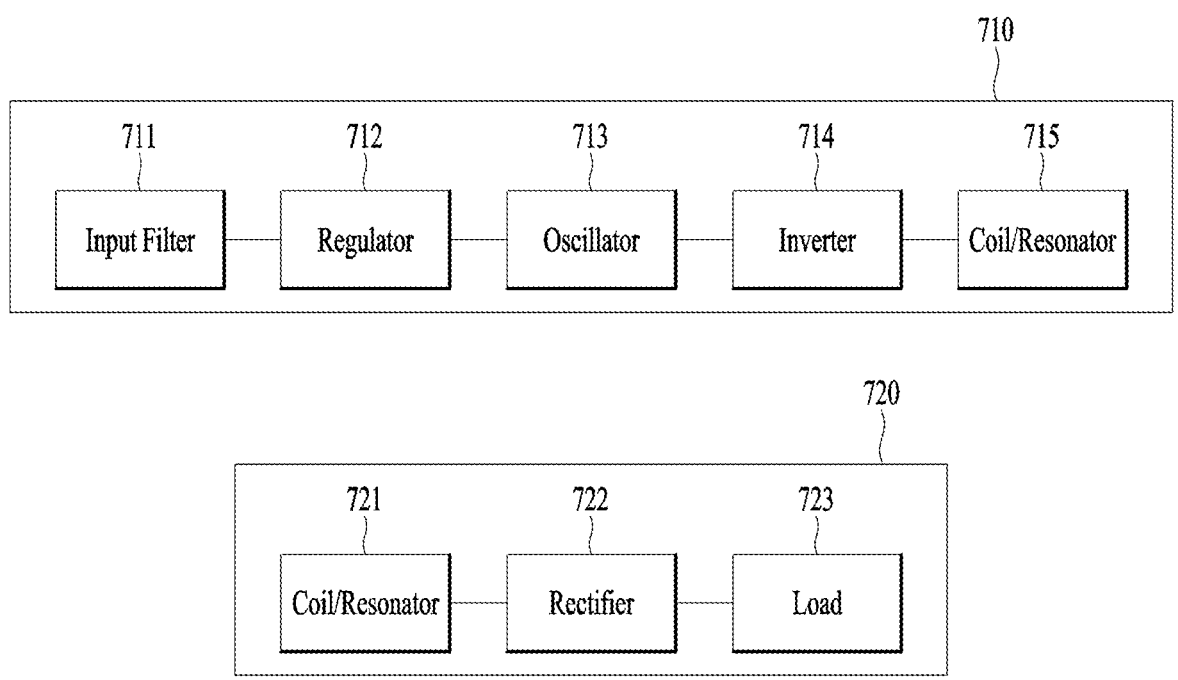
FIG. 3 is a block diagram illustrating, in more detail, the circuit of the wireless power transmission system, mounted to the shelf of the refrigerator, according to one example of the present application.

FIG. 3 illustrates, in more detail, the circuit of the wireless power transmission system, mounted to the shelf of the refrigerator, according to one example of the present application.

In the wireless power transmission system illustrated in FIG. 3, a transmitter 710 is installed in the refrigerator main body, and more particularly, is installed at a slight distance from the separably installed shelf. The slight distance is sufficient so long as it causes secondary resonance using coils installed in the transmitter 710 and a receiver 720. The refrigerator main body may be, for example, all of the sidewalls 15 and the rear wall 13 inside the refrigerator.

The transmitter 710, as illustrated in FIG. 3, is comprised of, for example, an input filter 711, a regulator 712, an oscillator 713, an inverter 714, and a coil/resonator 715. The oscillator 713, the inverter 714, and the coil/resonator 715 are necessary constituent elements, and the other constituent elements may be selectively included. The transmitter is a simplified power transmission circuit, includes no separate signal modulation or demodulation algorithm, and is configured to have only operating and non-operating modes depending on input power, which is about 12V. In addition, the circuit diagram illustrated in FIG. 3 is merely given by way of example, and the addition, change, or omission of some circuit components by those skilled in the art falls within the scope of the present application.

The receiver 720 of the wireless power transmission system illustrated in FIG. 3 is installed in the shelf 100 of the refrigerator, and is spaced apart from the refrigerator main body by a slight distance. The slight distance is sufficient so long as it causes secondary resonance using coils installed in the transmitter 710 and the receiver 720. The secondary resonance (or auxiliary resonance) will be described later in more detail with reference to FIG. 4 and the following drawings.

The receiver 720, as illustrated in FIG. 3, is comprised of a coil/resonator 721, a rectifier 722, and a load 723. The load 723 corresponds to, for example, a light-emitting diode (LED). However, the load 723 may be implemented using any other material for emitting light, rather than the LED. Like the transmitter 710, the receiver 720 may include no separate signal modulation algorithm, and it is sufficient to have any other structure (or circuit) for transmitting power to the load 723 of the receiver 720 when the transmitter 710 generates a magnetic field.

Figure 4:
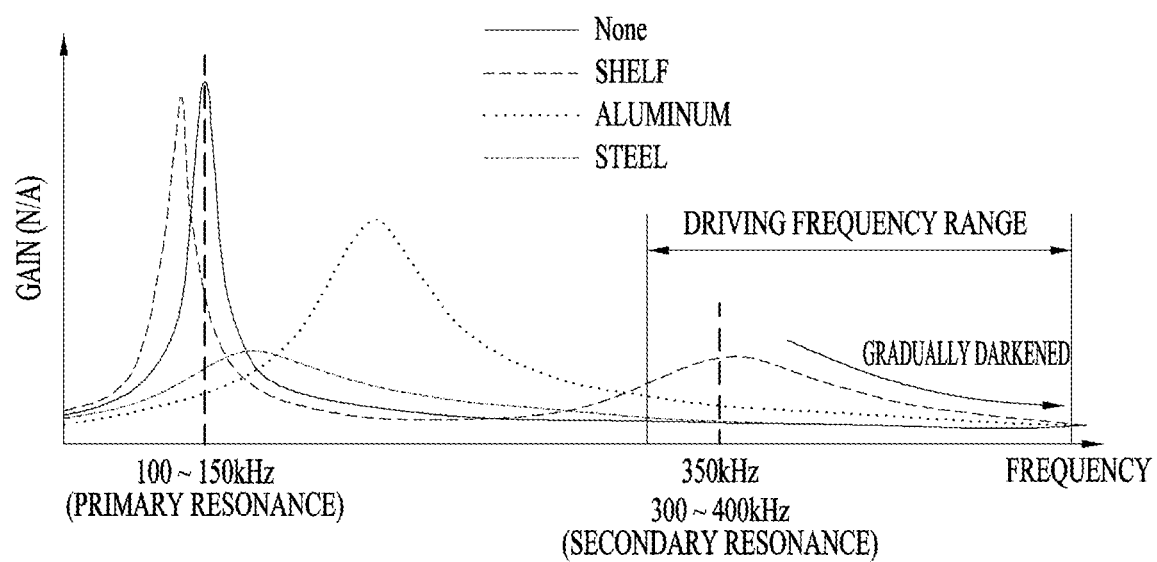
FIG. 4 is a graph illustrating the relationship between primary resonance and secondary resonance and gain, acquired through experimentation, according to one example of the present application.

FIG. 4 illustrates the relationship between primary resonance and secondary resonance and gain (primary coil current/primary coil voltage), which are acquired through experimentation in the transmitter 200, according to one example of the present application.

As described above, in the realization of the wireless power transmission system according to one example of the present application, the function of communication between the transmitter 200 and the receiver 300 is not applied, and thus, a foreign object detection (FOD) function for detecting a metallic material around the transmitter 200 (e.g. the refrigerator main body) using communication is not applied.

Accordingly, it is necessary to set a secondary resonance frequency for maximizing the gain of secondary resonance (minor resonance or auxiliary resonance) in order to achieve efficient wireless power transmission and to prevent the heating of a metallic foreign substance. In addition, it is necessary to minimize the gain of the metallic material due to the use of the secondary resonance frequency. For reference, considerations when setting the secondary resonance frequency include (1) the selection of a first resonance frequency, (2) the selection of a second resonance frequency equal to 1.5 times or more (appropriately 2 times or more) the first resonance frequency in order to minimize induction heating attributable to the metallic foreign substance, and (3) the configuration of a second capacitor (series capacitor) or a third capacitor (parallel capacitor) to achieve auxiliary resonance at the second resonance frequency in consideration of load conditions.

The results illustrated in FIG. 4 were acquired through experimentation upon the implementation of the transmitter and the receiver of the wireless power transmission system, which will be described with reference to FIG. 6 and the following drawings.

First, as illustrated in FIG. 4, when only the transmitter 200 (the refrigerator main body) is present without the receiver 300 (the refrigerator shelf 100), only primary resonance (major resonance) within a frequency range from 100 kHz to 150 kHz occurs in the transmitter 200, i.e. in the primary coil thereof. When the receiver 300 (the refrigerator shelf 100) is not located near the transmitter 200 (the refrigerator main body), but a foreign substance, such as aluminum or steel, is brought close, the major resonance frequency is changed to fall within the range from 150 kHz to 250 kHz depending on the proximity of the corresponding foreign substance. However, when the receiver 300 (the refrigerator shelf 100) is attached at a short distance from the transmitter 200 (the refrigerator main body), a secondary resonance frequency (from 300 kHz to 400 kHz), which exceeds the resonance frequency range (from 150 kHz to 250 kHz) attributable to the foreign substance, is generated in the transmitter 200. Accordingly, through the use of auxiliary resonance, there are technical effects of minimizing standby power and preventing induction heating attributable to a foreign substance while enabling wireless power transmission.

Figure 5:
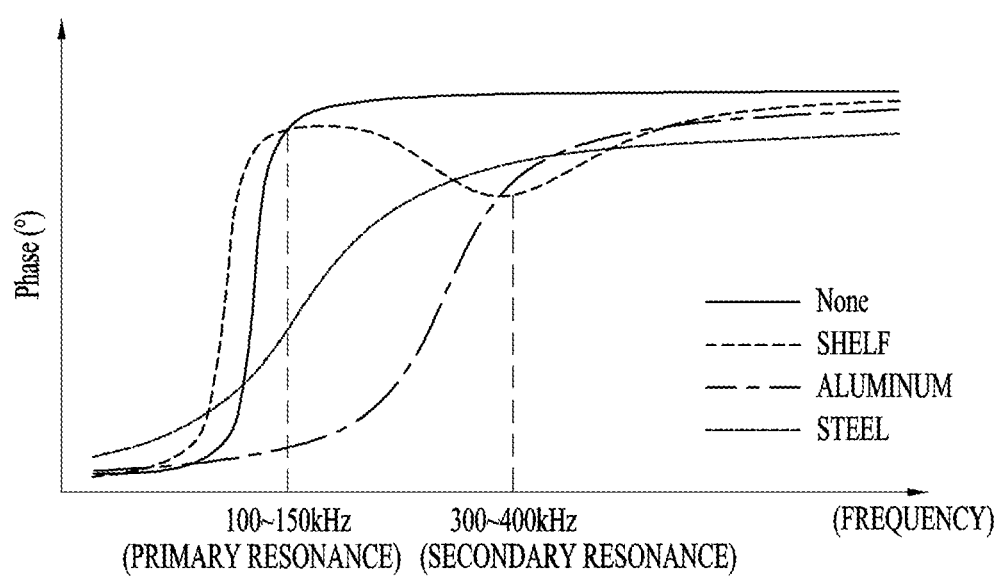
FIG. 5 is a graph illustrating the relationship between primary resonance and secondary resonance and phase, acquired through experimentation, according to one example of the present application.

FIG. 5 illustrates the relationship between primary resonance and secondary resonance and phase, acquired through experimentation, according to one example of the present application.

While FIG. 4 illustrates the gain (primary coil current/voltage) of a resonator (see 1030 in FIG. 6) of the transmitter depending on the driving frequency of the transmitter 200, FIG. 5 illustrates the phase of current and the driving voltage (i.e. the phase difference between the primary coil voltage and current) of the resonator 1030 depending on the driving frequency of the transmitter 200.

As illustrated in FIG. 4, it can also be seen from FIG. 5 that primary resonance and secondary resonance occur depending on the coupling (slightly separated coupling) of the transmitter 200 and the receiver 300 of the wireless power transmission system according to one example of the present application. Accordingly, because the secondary resonance frequency (from 300 kHz to 400 kHz) is higher than the frequency (from 150 kHz to 250 kHz) attributable to the coupling of the transmitter 200 and the metallic material, when power is transmitted using the secondary resonance frequency, almost no current in the primary coil, which may cause induction heating, is generated even if the metallic material, rather than the receiver 300, is brought close to the transmitter 200. Accordingly, the technical effect of preventing heating of the metallic material may be anticipated. In addition, owing to the high utility of power transmission using resonance, the use of the secondary resonance frequency enables effective wireless power transmission while avoiding the heating of the metallic material.

When the second resonance frequency is set so as to be about 2 times (or more) higher than the first resonance frequency, it is possible to prevent heating, which is expected to occur when the metallic foreign substance, rather than the receiver 300 (the shelf), is brought close to the transmitter 200 (the refrigerator main body).

To summarize, FIGS. 4 and 5 will again be described below.

When a ferrous metal is aligned with the transmitter 200 (the refrigerator main body), the impedance of the transmitter tends to greatly increase because induced current is generated and consumed as heat (induction heating) in the metal in response to the current flowing in the coil of the transmitter 200.

In addition, when an aluminum-based metal is aligned with the transmitter 200, induction heating does not occur, but the magnetic path of the coil is changed, which causes variation in the inductance of the coil, and consequently, great variation in the resonance frequency of the resonator of the transmitter. However, the metal varies only with respect to a resonance property, and does not generate an additional resonance point (secondary resonance).

On the other hand, when the receiver 300 (the refrigerator shelf) having an additional resonance point is aligned with the transmitter 200, a separate auxiliary resonance point may be generated in the transmitter 200, and the magnetic coupling state of the transmitter 200 and the receiver 300 and the resonator of the receiver 300 may be regulated to set a frequency that is at least two times as high.

Figure 6:
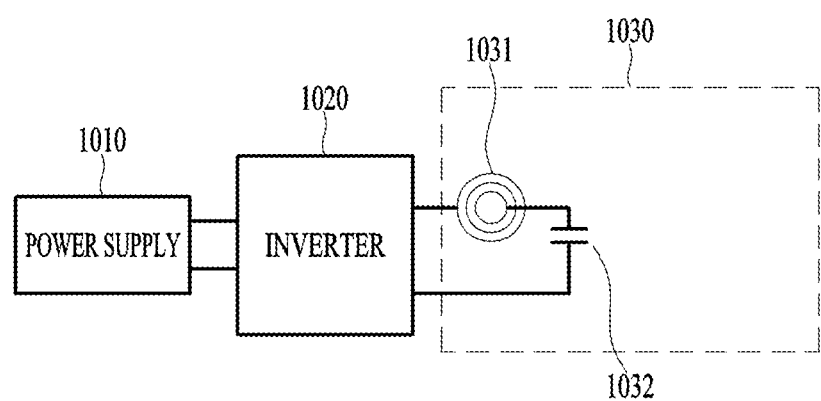
FIG. 6 is a schematic view illustrating, in brief, the structure of a transmitter of the wireless power transmission system according to one example of the present application.

FIG. 6 illustrates, in brief, the structure of the transmitter in the wireless power transmission system according to one example of the present application.

The transmitter 200 of the wireless power transmission system according to one example of the present application is comprised of, for example, a power supply 1010, an inverter 1020, and the resonator 1030. The resonator 1030 is comprised of a coil 1031 and a capacitor 1032. Of course, the omission, addition, and change of some modules falls within the scope of the present application.

As illustrated in FIG. 6, when the transmitter 200 (the refrigerator main body), which uses the resonator 1030 in which the coil 1031, having inductance, and the capacitor 1032 are connected to each other in series, is present alone, a single resonance point is generated in the resonator 1030.

However, when the metallic foreign substance is located near the coil 1031 of the transmitter 200 illustrated in FIG. 6, the resonance frequency and the resonance quality factor are changed. In addition, when the receiver 300 (the refrigerator shelf 100), which includes the resonator using the inductance of the coil and the capacitor, similarly to the transmitter 200 illustrated in FIG. 6, is also disposed, auxiliary resonance (or secondary resonance) may occur. The detailed structure of the receiver 300 will be described later in more detail with reference to FIG. 7.

The wireless power transmission system using a plurality of coils according to one example of the present application is comprised of the transmitter 200 illustrated in FIG. 6 and the receiver 300, which will be described later with reference to FIG. 7 and the following drawings.

The transmitter 200 includes a module 1010 for receiving a preset voltage, and a first resonator 1030 for generating a first resonance frequency depending on the received voltage, and the first resonator 1030 includes a first coil 1031 and a first capacitor 1032. In addition, according to another feature of the present application, the module 1010 may be designed to include the inverter 1020, which converts DC power into AC power and supplies the converted AC power to the first resonator 1030. The module 1010 is also designed to control the inverter 1020, which is driven by a second resonance frequency. When the wireless power transmission system according to one example of the present application is applied to the refrigerator, the module 1010 receives the preset voltage when the opening of the refrigerator door is detected, and the reception of the preset voltage by the module 1010 stops when the closing of the refrigerator door is detected, whereby the unnecessary loss of power may be prevented within the scope of the present application.

The receiver 300, which is spaced apart from the transmitter 200, includes a load for emitting light, a capacitor connected in series or in parallel depending on the equivalent resistance of the load, and a second coil designed to generate the second resonance frequency. The detailed configuration of the receiver 300 will be described later with reference to FIG. 7 and the following drawings.

Figure 7:
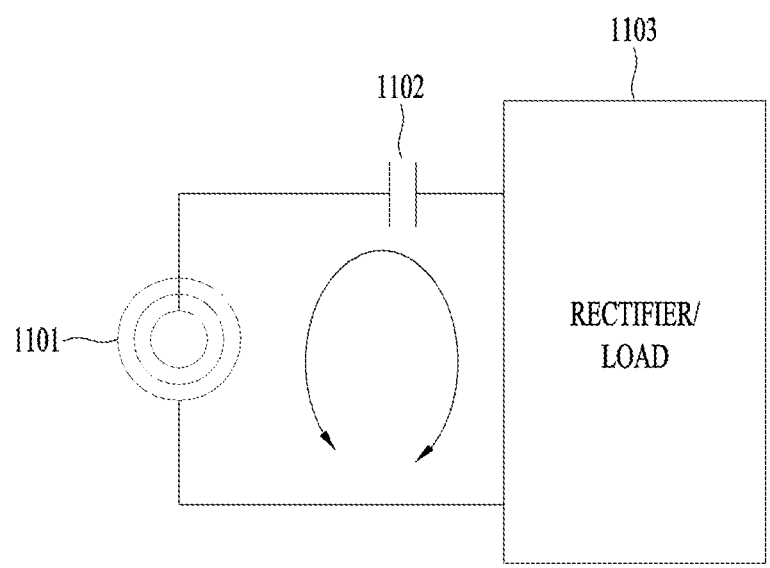
FIG. 7 is a schematic view illustrating one exemplary structure of a receiver of the wireless power transmission system according to one example of the present application.
Figure 8:
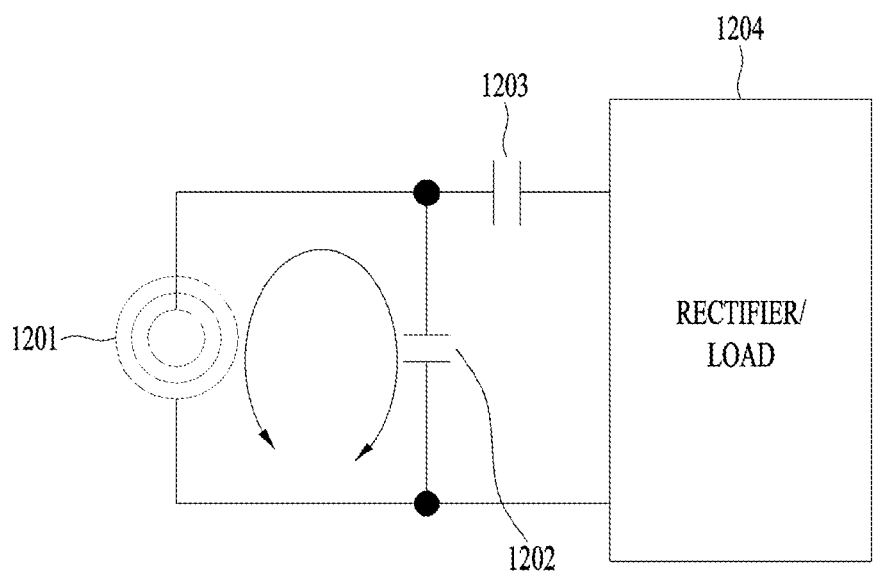
FIG. 8 is a schematic view illustrating another exemplary structure of the receiver of the wireless power transmission system according to one example of the present application.
Figure 9:
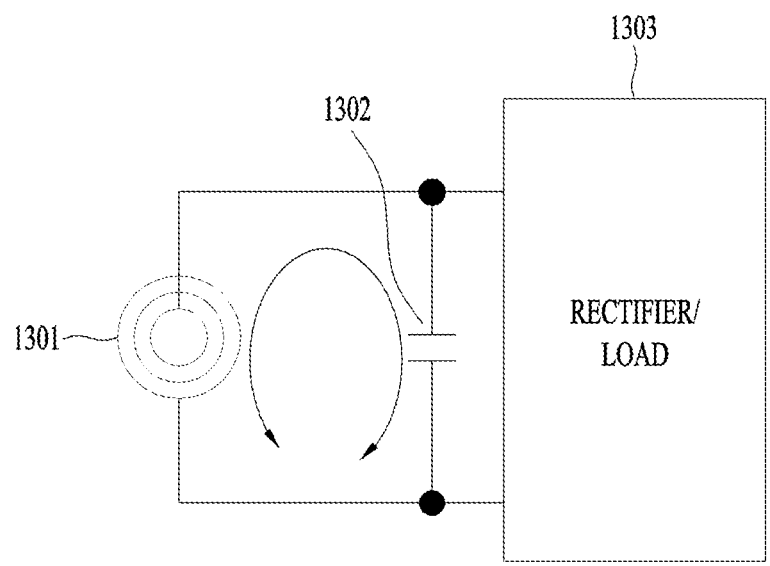
FIG. 9 is a schematic view illustrating a further exemplary structure of the receiver of the wireless power transmission system according to one example of the present application.

FIG. 7 illustrates one exemplary structure of the receiver of the wireless power transmission system according to one example of the present application. FIG. 8 illustrates another exemplary structure of the receiver of the wireless power transmission system according to one example of the present application. FIG. 9 illustrates a further exemplary structure of the receiver of the wireless power transmission system according to one example of the present application.

The respective receivers 300 illustrated in FIGS. 7, 8 and 9 have structures based on different loads in order to have an additional resonance point (auxiliary resonance or secondary resonance).

The present application has another feature by which the structure of the receiver 300 is changed depending on the magnitude of a load, and the receiver 300 needs to be designed so that large amounts of current are capable of flowing in the capacitor. A large or small equivalent resistance value of the load may be applied depending on the coupling state of the transmitter 200 and the receiver 300 (i.e. the distance therebetween), and may be acquired through experimentation.

As can be appreciated from the result of accumulated experimental data, the auxiliary resonance (secondary resonance) tends to increase as the coupling of the coils of the transmitter 200 and the receiver 300 increases (i.e. as the mutual inductance increases, or as the distance between the transmitter and the receiver decreases), as the capacitance of the series capacitor decreases, or as the capacitance of the parallel capacitor decreases.

When the equivalent resistance of the load (e.g. the LED) of the receiver 300 (e.g. the refrigerator shelf 100) is relatively small, as illustrated in FIG. 7, a coil 1101 and a rectifier/load 1103 of the receiver 300 are connected to a capacitor 1102 in series.

When the equivalent resistance of the load of the receiver 300 is within an approximately intermediate range, as illustrated in FIG. 8, both a capacitor 1202 and a series capacitor 1203 are present between a coil 1201 and a rectifier/load 1204.

Finally, when the equivalent resistance of the load of the receiver 300 is relatively large, as illustrated in FIG. 9, a coil 1301 and a rectifier/load 1303 of the receiver 300 are connected in parallel with a capacitor 1302.

To summarize FIGS. 7 to 9, when the equivalent resistance of the load (LED) of the receiver 300 is below a preset first threshold, the coil and the capacitor of the receiver 300 are connected to each other in series. When the equivalent resistance of the load of the receiver 300 exceeds a preset second threshold, the coil and the capacitor of the receiver 300 are connected to each other in parallel. Here, the second threshold is, for example, greater than the first threshold. When the equivalent resistance of the load of the receiver 300 is equal to or greater than the preset first threshold and is equal to or less than the second threshold, two capacitors are provided and are respectively connected to the coil of the receiver 300 in series and in parallel. The coil of the transmitter 200 may be referred to as a first coil, and the coil of the receiver 300 may be referred to as a second coil.

FIG. 10 illustrates conditions for the structures of the respective receivers illustrated in FIGS. 7 to 9. In particular, FIG. 10 illustrates, in detail, the principle of the generation of auxiliary resonance (secondary resonance) using the resonator transformer modeling of each of the transmitter 200 (the refrigerator main body) and the receiver 300 (the refrigerator shelf 100) of the wireless power transmission system.

Based on the principle, an auxiliary resonance point, which is generated by an inductor component $L_{lk2}$ and a capacitor component $C_p/C_s$ included in the resonator of the receiver 300, is transmitted by a mutual inductance $L_m$, which is generated by the coupling of the coils of the transmitter 200 and the receiver 300, and an ideal transformer including the same.

Because the quality (Q) factor, which is the index for indicating the resonance property of the resonator of the receiver 300, needs to be sufficiently high in order to allow the receiver 300 to exhibit the resonance property, the receiver 300 exerts a technical effect of sufficiently representing auxiliary resonance (secondary resonance) only when designed as in FIG. 10 depending on the magnitude of the equivalent resistance of the load (e.g. the LED).

That is, when the equivalent resistance of the load of the receiver 300 is relatively small, as illustrated in (a) of FIG. 10, the capacitor $C_s$ is designed to be connected in series. On the other hand, when the equivalent resistance of the load of the receiver 300 is relatively large, as illustrated in (c) of FIG. 10, the capacitor $C_s$ is designed to be connected in parallel.

When the circuit diagrams illustrated in (a) and (c) of FIG. 10 cannot be used (i.e. when the equivalent resistance of the load of the receiver 300 falls within the intermediate range), sufficient auxiliary resonance (secondary resonance) is generated through the provision of both the series capacitor $C_s$ and the parallel capacitor $C_p$ in the resonator of the receiver 300.

While FIG. 10 illustrates that the circuit diagram is changed depending on the equivalent resistance of the load, the design in which the series/parallel capacitor is connected depending on the equivalent resistance of the load via only one circuit diagram under the provision of a switch also falls within the scope of the present application.

Figure 11:
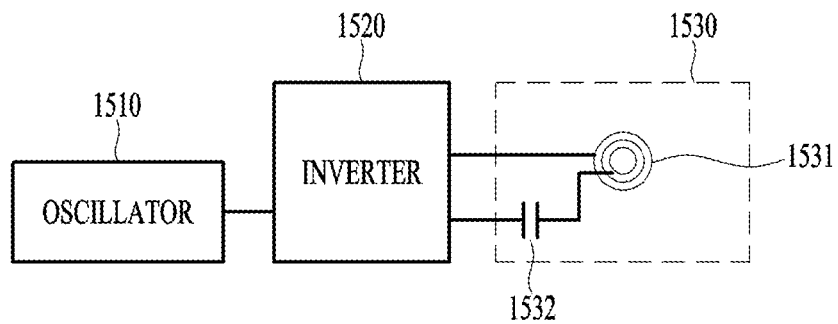
FIG. 11 is a schematic view illustrating one exemplary structure of the transmitter illustrated in FIG. 6.

FIG. 11 illustrates one exemplary structure of the transmitter illustrated in FIG. 6. Hereinafter, the principle of generating auxiliary resonance using the transmitter 200, which uses a fixed frequency, will be described with reference to FIG. 11.

As illustrated in FIG. 11, the transmitter 200 (the refrigerator main body) is comprised of an oscillator 1510, an inverter 1520, and a resonator 1530, and the resonator 1530 is comprised of a coil 1531 and a capacitor 1532.

Figure 12:
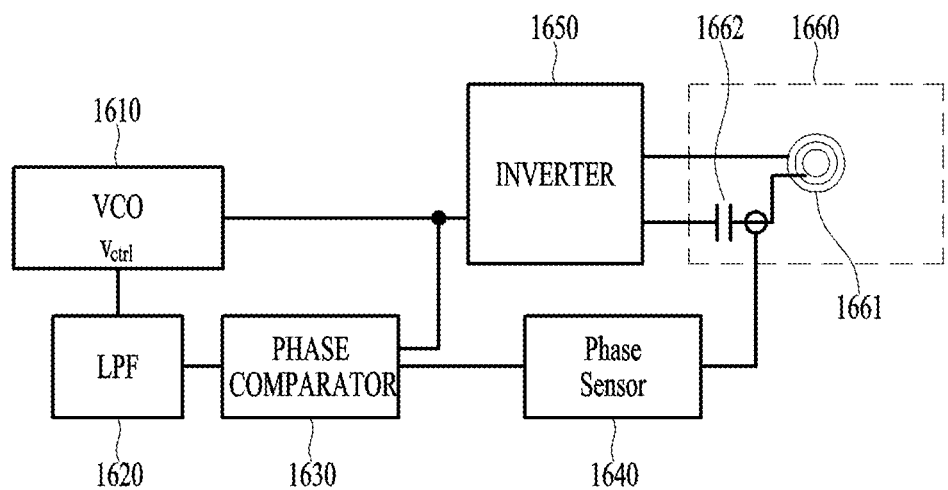
FIG. 12 is a schematic view illustrating another exemplary structure of the transmitter illustrated in FIG. 6.
Figure 13:
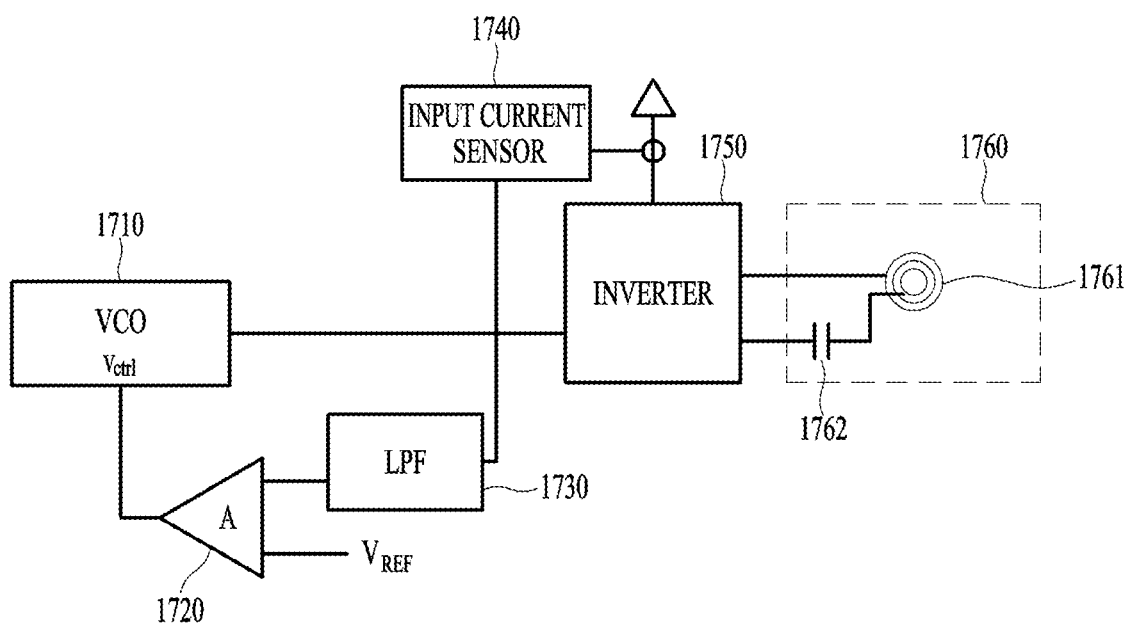
FIG. 13 is a schematic view illustrating a further exemplary structure of the transmitter illustrated in FIG. 6.

As described above, assuming that the resonance frequency of the resonator of the transmitter 200 is f1 when the transmitter 200 (the refrigerator main body) is present alone (i.e. the state in which the shelf 100 is not attached) and the resonance frequency, which is additionally generated when the receiver 300 is mounted, is f2, wireless power transmission may be accomplished by setting the series capacitor or the parallel capacitor of the receiver 300 to a distance that satisfies the relation f2>2f1 (see FIG. 10) and via the configuration of the transmitter 200 illustrated in FIG. 11, 12 or 13.

When the transmitter 200 is driven at a fixed frequency near the additionally generated secondary resonance frequency of f2, only very small current flows in the resonator of the transmitter 200 because the resonance frequency f1 of the resonator of the transmitter 200 that is generated when the transmitter 200 is present alone or the resonance frequency of the resonator of the transmitter 200 that is generated when the metallic foreign substance approaches is brought nearby is very different from the resonance frequency f2.

Therefore, there are technical effects of considerably reducing induction heating attributable to the metallic material and achieving sufficient energy transmission via auxiliary resonance when the receiver 300 (the shelf 100) is aligned with the transmitter 200.

FIG. 11 illustrates one exemplary structure of the transmitter 200 using the method described above. The oscillator 1510 has an output in the form of a pulse having the frequency of interest, and the inverter 1520 converts DC power to AC power of the corresponding frequency component. When the AC power output from the inverter 1520 flows in the coil 1531 of the resonator 1530 of the transmitter 200, the magnetic coupling of the transmitter 200 and the receiver 300 occurs for energy transmission.

FIG. 12 illustrates another exemplary structure of the transmitter illustrated in FIG. 6. Hereinafter, a method of sensing the receiver 300, which generates auxiliary resonance, using the transmitter 200, which senses the phase, will be described.

As illustrated in FIG. 12, the transmitter 200 (the refrigerator main body) includes a voltage control oscillator (VCO) 1610, a low pass filter (LPF) 1620, a phase comparator 1630, a phase sensor 1640, an inverter 1650, and a resonator 1660. The resonator 1660 is comprised of a coil 1661 and a capacitor 1662.

FIG. 12 illustrates a method of sensing the receiver 300 (the shelf 100) by observing variation in the phase difference between current and voltage in the resonator 1660 of the transmitter 200 when the transmitter 200 (the refrigerator main body) and the receiver 300 (the shelf 100) are aligned with each other. When described in comparison with FIG. 11, the oscillator 1510 of FIG. 11 is replaced with the VOC, and the phase sensor 1640 for sensing the phase difference between the rectification of the resonator 1660 of the transmitter 200 and the driving frequency of the inverter 1650, the phase comparator 1630, and the LPF 1620 for preventing oscillation due to a feedback loop are added.

The operating algorithm is as follows.

First, the transmitter 200 illustrated in FIG. 12 starts driving at a higher frequency than f2 (auxiliary resonance frequency or secondary resonance frequency), and searches for an operating point, which has a specific voltage/current phase difference in the resonator of the transmitter 200, and which is generated only when the receiver 300 is aligned with the transmitter 200, within a specific frequency range including f2. As illustrated in FIG. 4, because secondary resonance occurs in a predetermined frequency band, rather than occurring at an arbitrary specific frequency, the specific frequency range may include at least part of the frequency band illustrated in FIG. 4 in which secondary resonance may occur, or may include the entire secondary resonance frequency band. In addition, the specific frequency range may be set so as to be wider or narrower than the secondary resonance frequency band.

When the operating point cannot be found within the specific frequency range, it is judged that the foreign substance (i.e. a metal rather than the shelf 100) has been brought close or that the receiver 300 (the shelf 100) has been removed, and thus, the supply of voltage to the transmitter 200 is turned off.

On the other hand, when the operating point is found within the specific frequency range, it is judged that the receiver 300 (the shelf 100) is aligned, and thus, the transmitter 200 continuously transmits energy (power) as long as the phase difference is maintained.

When compared with the fixed frequency driving method illustrated in FIG. 11, the so-called phase sensing method illustrated in FIG. 12 has the following advantages.

First, there is a technical effect of reducing standby power by sensing whether or not the receiver 300 (the shelf 100) is aligned. Second, there is a technical effect of preventing the possibility of induction heating by sensing whether or not the foreign substance is aligned. Third, there is a technical effect of maintaining a constant operating point even if the scattering of constituent elements of the transmitter and the receiver occurs.

FIG. 13 illustrates a further exemplary structure of the transmitter illustrated in FIG. 6. Hereinafter, the principle of generating auxiliary resonance using the transmitter 200, which senses input power, will be described with reference to FIG. 13.

As illustrated in FIG. 13, the transmitter 200 (the refrigerator main body) includes a VCO 1710, an amplifier 1720, an LPF 1730, an input current sensor 1740, an inverter 1750, and a resonator 1760. The resonator 1760 is comprised of a coil 1761 and a capacitor 1762.

When operated at the auxiliary resonance (or secondary resonance) frequency of f2, the transmitter transmits great power only when the transmitter and the receiver 300 (the shelf 100) are aligned with each other, and is insensitive to the difference in efficiency attributable to load or distance. Therefore, the control of power in the transmitter 200 is possible when it is desired to control the power of the receiver 300.

FIG. 13 illustrates a method of controlling power in the transmitter using the feature described above. When compared with the fixed frequency driving method illustrated in FIG. 11, the input current sensor 1740 for measuring power, the LPF 1730 for removing a driving frequency component that is combined with input current, and the reference voltage and operational amplifier (OPAMP) 1720 for the feedback of a filtered input current value on a specific value are added.

The driving algorithm of the power control method illustrated in FIG. 13 is as follows.

The transmitter 200 (the refrigerator main body) starts driving at a higher frequency than the frequency of f2, and searches for an operating point having specific input current within the specific frequency range including the frequency of f2.

When the operating point within the specific frequency range cannot be found, it is judged that the foreign substance (i.e. a metal rather than the shelf 100) has been brought close or that the receiver 300 (the shelf 100) has been removed, and thus, the supply of voltage to the transmitter 200 is turned off.

On the other hand, when the operating point is found within the specific frequency range, it is judged that the receiver 300 (the shelf 100) is aligned with the transmitter 200, and thus, the transmitter 200 continuously transmits energy (power) as long as the phase difference is maintained.

When compared with the fixed frequency driving method illustrated in FIG. 11, the so-called input current sensing method illustrated in FIG. 13 has the following advantages.

First, there is a technical effect of reducing standby power by sensing whether or not the receiver 300 (the shelf 100) is aligned with the transmitter. Second, there is a technical effect of preventing the possibility of induction heating by sensing whether or not the foreign substance is aligned with the transmitter. Third, there is a technical effect of maintaining a constant operating point even if the scattering of constituent elements of the transmitter and the receiver occurs. Fourth, there is a technical effect of maintaining a constant operating point even if the coupling of the coils of the transmitter 200 (the refrigerator main body) and the receiver 300 (the refrigerator shelf 100) is changed (e.g. when the distance between the coil of the transmitter 200 and the coil of the receiver 300 is changed). Fifth, the driving of the load may be stabilized via constant power driving.

As described above, when the refrigerator is designed using the wireless power transmission system according to one example of the present application, a light source (i.e. the LED) may be mounted to each of the shelves 100, which are separably installed.

According to the related art, the LED, which is mounted in the shelf 100 separably installed in the refrigerator, adopts a contact type connector, and thus, has the risk of aging and corrosion. However, one example of the present application may solve this problem.

When the transmitter 200 is mounted in the inner wall surface of the refrigerator and the receiver 300 is mounted in the shelf 100 so that power is wirelessly transmitted using an auxiliary resonance point, it is possible to effectively transmit power to the shelf 100 without a wire and to prevent damage to the transmitter 200 due to excessive resonance even if, for example, an aluminum beverage can or a ferrous metal pot, rather than the shelf 100, is placed near the transmitter, or to prevent induction heating of the aluminum beverage can or the ferrous metal pot. As described above, one example of the present application may solve all problems described above through the use of an auxiliary resonance point (secondary resonance point), and thus is very useful.

Meanwhile, both the coil of the transmitter 200 mounted in the refrigerator main body and the coil of the receiver 300 mounted in the refrigerator shelf 100 were manufactured using a PCB coil, and an MnZn-based ferrite (shield member) may be added to each of the coils so as to increase the mutual inductance between the coils of the transmitter and the receiver.

The shield member may be applied to both the transmitter 200 and the receiver 300, and may have a thickness ranging from 1.2 mm to 10 mm. In addition, the shield member may be formed of a rigid plate or a flexible sheet.

The particulars of the resonator of the transmitter 200 include, for example, the coil inductance of about 9.3 µH, the series capacitor of about 100 nF, and the resonance frequency of about 150 kHz when the transmitter 200 is present alone.

The particulars of the resonator of the receiver 300 include, for example, the coil inductance of about 36 µH, the series capacitor of about 4.7 nF, the parallel capacitor of about 2.2 nF, and the auxiliary resonance frequency of about 350 kHz, which is generated when the transmitter 200 and the receiver 300 are coupled to each other. Of course, the auxiliary resonance frequency may be changed depending on the coupling state of the transmitter and the receiver, and may be an experimental value that is determined when the transmitter 200 and the receiver 300 are aligned with each other by a distance of about 9 mm.

Finally, the particulars of the load of the receiver 300 include, for example, the kind of the load, namely an LED, and the equivalent load resistance of about 50Ω.

As another example of the present application, the respective shelves 100 may be designed to emit light having different colors or brightnesses. To realize this, the amount of power to be supplied to the refrigerator main body (i.e. to the transmitter 200), which is located closer to the side surface of each shelf 100, may be differentially adjusted. In addition, dimming may be realized by adjusting the duty cycle at which the power supply is turned on or off using the principle in which power is transmitted when a voltage is applied to the wireless power transmission module, and is shut down when the voltage is interrupted. In addition, as illustrated in FIG. 4, dimming may be realized using a driving frequency based on the fact that the transmission of power is reduced as the driving frequency is increased from the auxiliary resonance frequency. That is, the brightness of the light source may be gradually reduced by gradually increasing the driving frequency from the auxiliary resonance frequency. Conversely, the brightness of the light source may be gradually increased by gradually reducing the driving frequency to the auxiliary resonance frequency.

The technology of dimming the illumination of the shelf 100 has the effect of increasing visibility by gradually increasing the brightness of illumination when the refrigerator door is opened, and enables adjustment in the brightness of illumination of the shelf 100 depending on the peripheral temperature of the refrigerator or the lapse of time. The dimming technology enables colorful illumination via the combination of various colors (e.g. R, G and B).

As described above in detail, in the wireless power transmission system using the plural coils, the transmitter may include a module for receiving a predetermined voltage, a first coil for generating a magnetic flux depending on current flowing therein, and a first capacitor connected to the first coil in series for generating a first resonance frequency. The receiver, which is spaced apart from the transmitter, includes a load for consuming power, a second coil, to which the current is induced via the magnetic flux linkage with the first coil, and a second capacitor or a third capacitor connected to the second coil in series or in parallel based on the equivalent resistance of the load so as to generate auxiliary resonance when the receiver is aligned with the transmitter.

The wireless power transmission system described above may solve the problem of generation of excessive resonance energy (current) in the transmitter coil when the receiver is separated through the use of an auxiliary resonance point, which is generated when the transmitter and the receiver are aligned with each other, and the problem of induction heating of the metallic foreign substance when the metallic foreign substance is brought close after the receiver is separated from the transmitter. In addition, the wireless power transmission system may minimize the consumption of standby power when the receiver is separated. In addition, the wireless power transmission system may be simplified and achieve high efficiency by minimizing unnecessary circuits.

Figure 14:
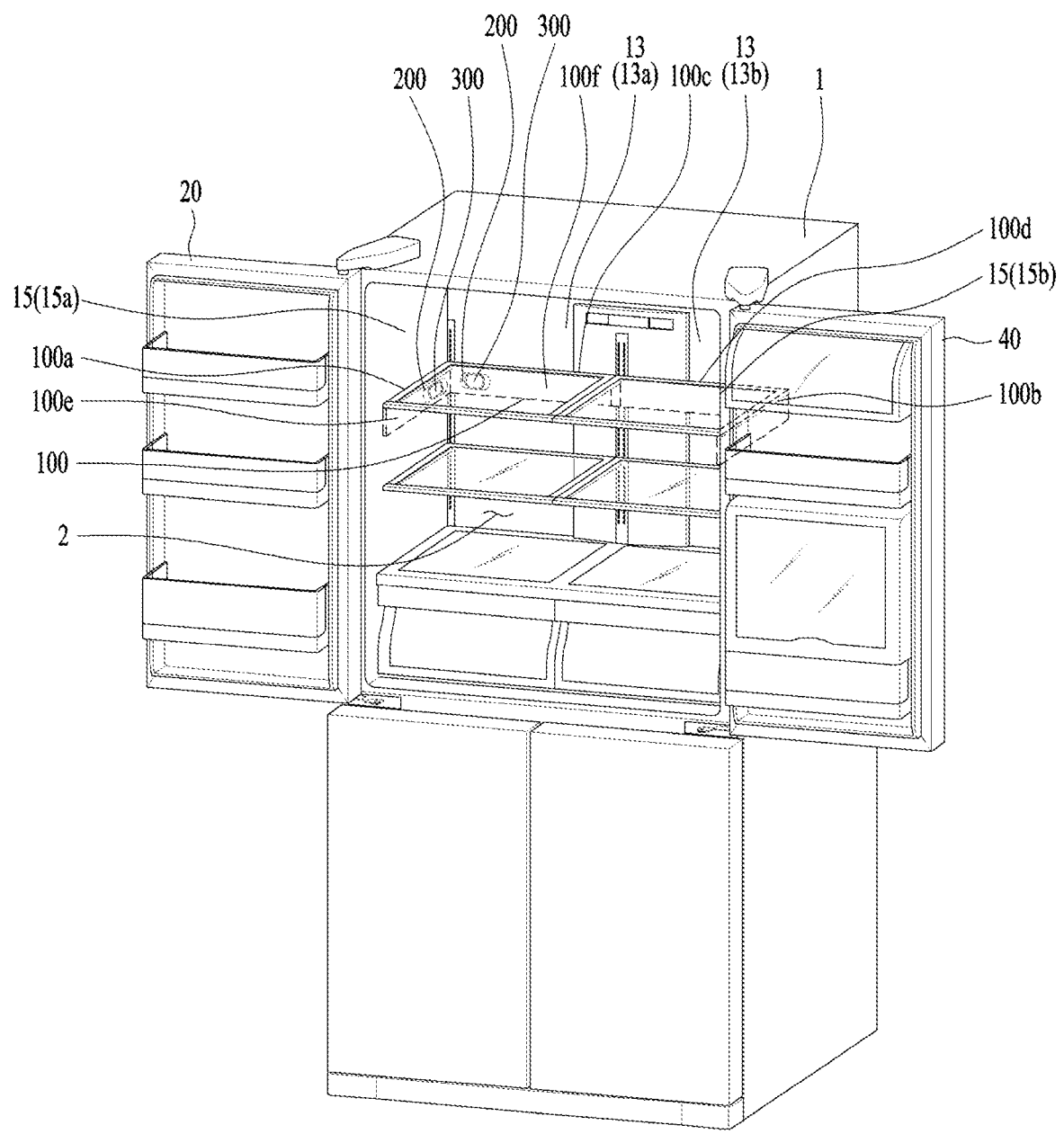
FIG. 14 is a perspective view schematically illustrating a storage compartment and shelves of the refrigerator.

In addition to including the circuitry elements, i.e. functional elements described above with reference to FIGS. 2 to 13, the transmitter 200 and the receiver 300 may be applied so as to include various mechanical elements, i.e. structural elements in the shelf 100 of the refrigerator. Among these mechanical elements, the arrangement of the transmitter 200 and the receiver 300 may be important from the standpoint of design, and thus, may need to be contemplated first. More specifically, once the arrangement of the transmitter 200 and the receiver 300 has been determined, the shelf 100 and related structures may be easily designed based on the arrangement. Accordingly, FIG. 14 is a perspective view schematically illustrating the storage compartment and shelves of the refrigerator. Next, the arrangement of the transmitter 200 and the receiver 300 will be described with reference to FIG. 14.

As described above, the shelf 100 may be supported by the sidewalls 15 or the rear wall 13 in order to be installed inside the storage compartment 2. In addition, the transmitter 200 and the receiver 300 need to face each other in order to wirelessly transmit power using magnetic flux, i.e. electromagnetic waves. Accordingly, the transmitter 200 and the receiver 300 may be installed on portions of the shelf 100 and the refrigerator (the storage compartment 2) facing each other, i.e. on side portions 100a and 100b of the shelf 100 and the sidewalls 15a and 15b, or on rear portions 100c and 100d of the shelf 100 and the rear walls 13a and 13b. In practice, because the shelf 100 has a thin plate shape, the side portions 100a and 100b and the rear portions 100c and 100d thereof may be not suitable for directly installing the transmitter 200 or the receiver 300. Therefore, as illustrated, flanges 100e and 100f for the installation of the transmitter 200 or the receiver 300 may be provided respectively on the side portions 100a and 100b and the rear portions 100c and 100d.

The transmitter 200 may be located on the sidewall 15a or 15b, and may also be located in the rear wall 13a or 13b. In addition, the receiver 300 may be located on the side portion 100a or 100b or the rear portion 100c or 100d of the shelf 100 so as to face the transmitter 200. When the transmitter 200 and the receiver 300 are located respectively on the sidewall 15a or 15b and the side portion 100a or 100b of the shelf 100, the transmitter 200 and the receiver 300 may be invisible to the user, which may improve the external appearance of the refrigerator. Accordingly, the configuration in which the transmitter 200 and the receiver 300 are located respectively on the sidewall 15a or 15b and the side portion 100a or 100b of the shelf 100 may be contemplated first. The shelf 100, which will be described later with reference to FIGS. 16A to 45, includes the transmitter 200 and the receiver 300, which are located in the above-described manner. More specifically, the receiver 300 may be installed on the side portion 100a or 100b of the shelf 100 in order to supply a received voltage to the light source of the shelf, and the transmitter 200 may be connected to an external power supply and may be installed on the sidewall 15a or 15b so as to face the receiver 300. Alternatively, because various mechanical devices are provided behind the rear walls 13a and 13b and are connected to the power supply, the transmitter 200 may be easily connected to the external power supply when it is located on the rear wall 13a or 13b. Accordingly, as in the example of FIGS. 46 and 47, the transmitter 200 and the receiver 300 may be located respectively on the rear wall 13a or 13b and the rear portion 100c or 100d of the shelf 100.

Figure 16A:
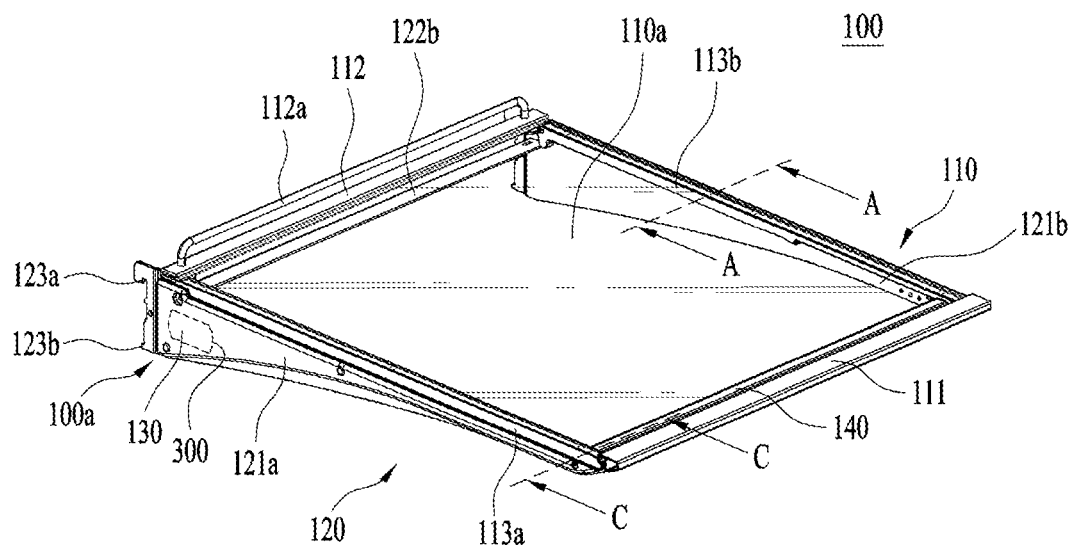
FIGS. 16A and 16B are perspective views illustrating the shelf according to the present application, which are viewed respectively from the left side and the right side.
Figure 16B:
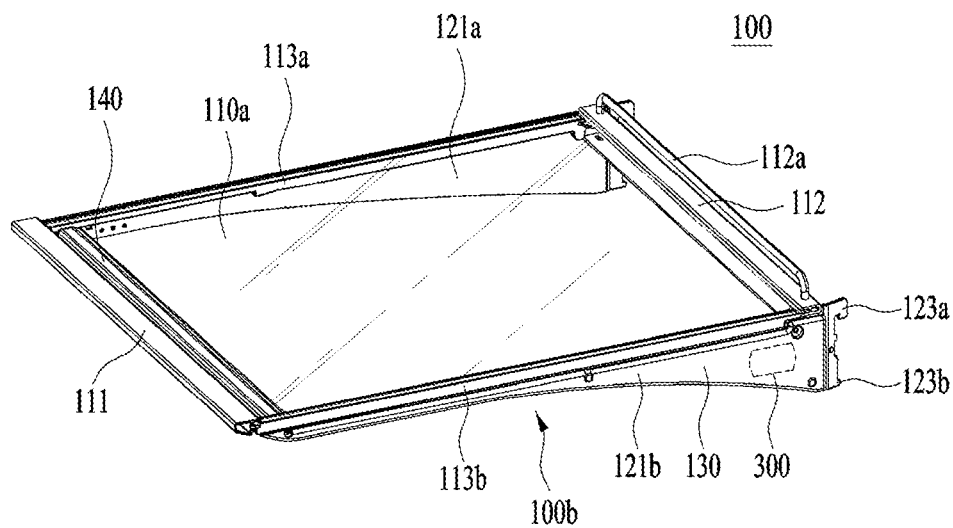
Figure 16C:
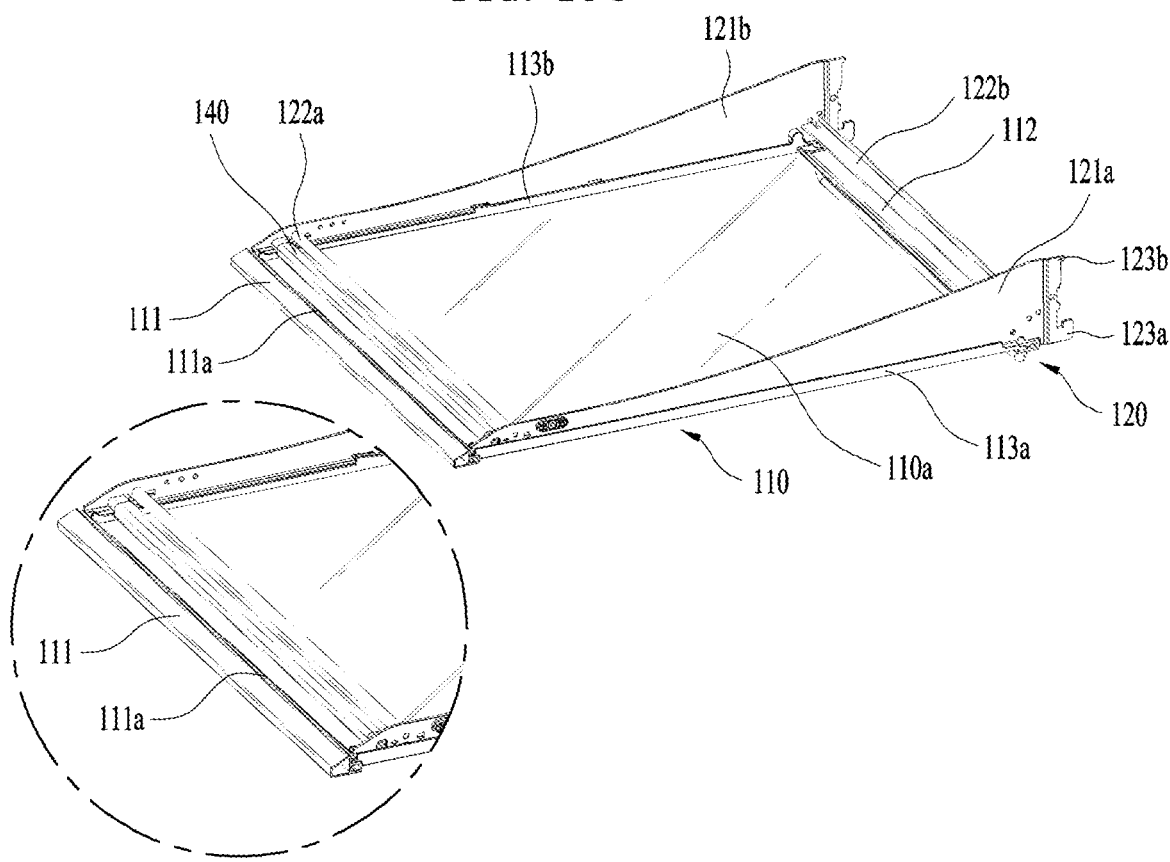
FIG. 16C is a perspective view of the shelf according to the present application, which is viewed from the bottom side.
Figure 16D:
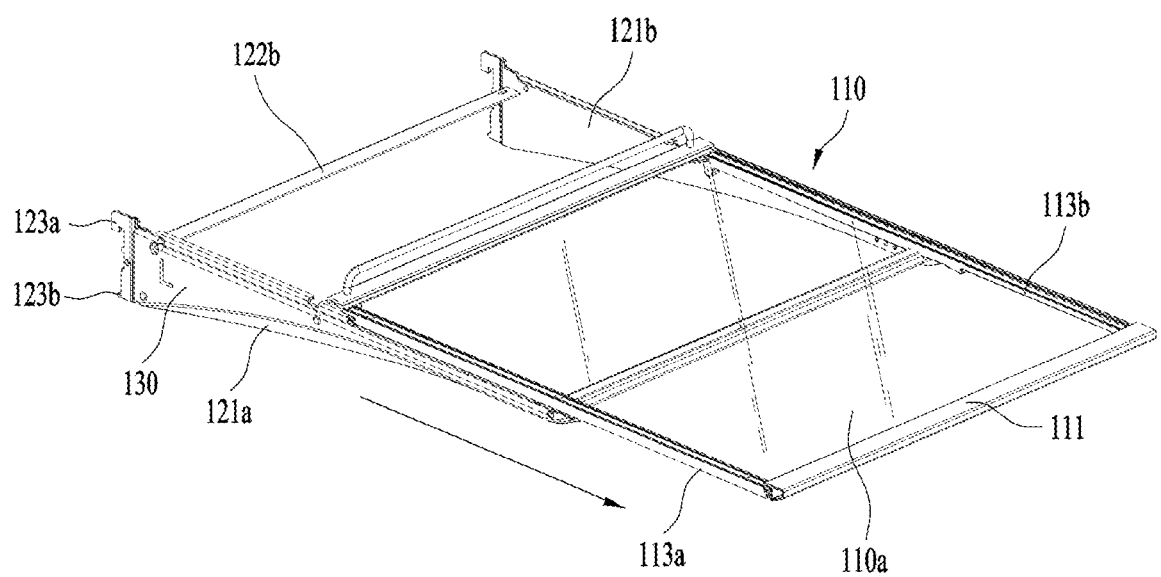
FIG. 16D is a perspective view illustrating the shelf having a moved shelf member.
Figure 17:
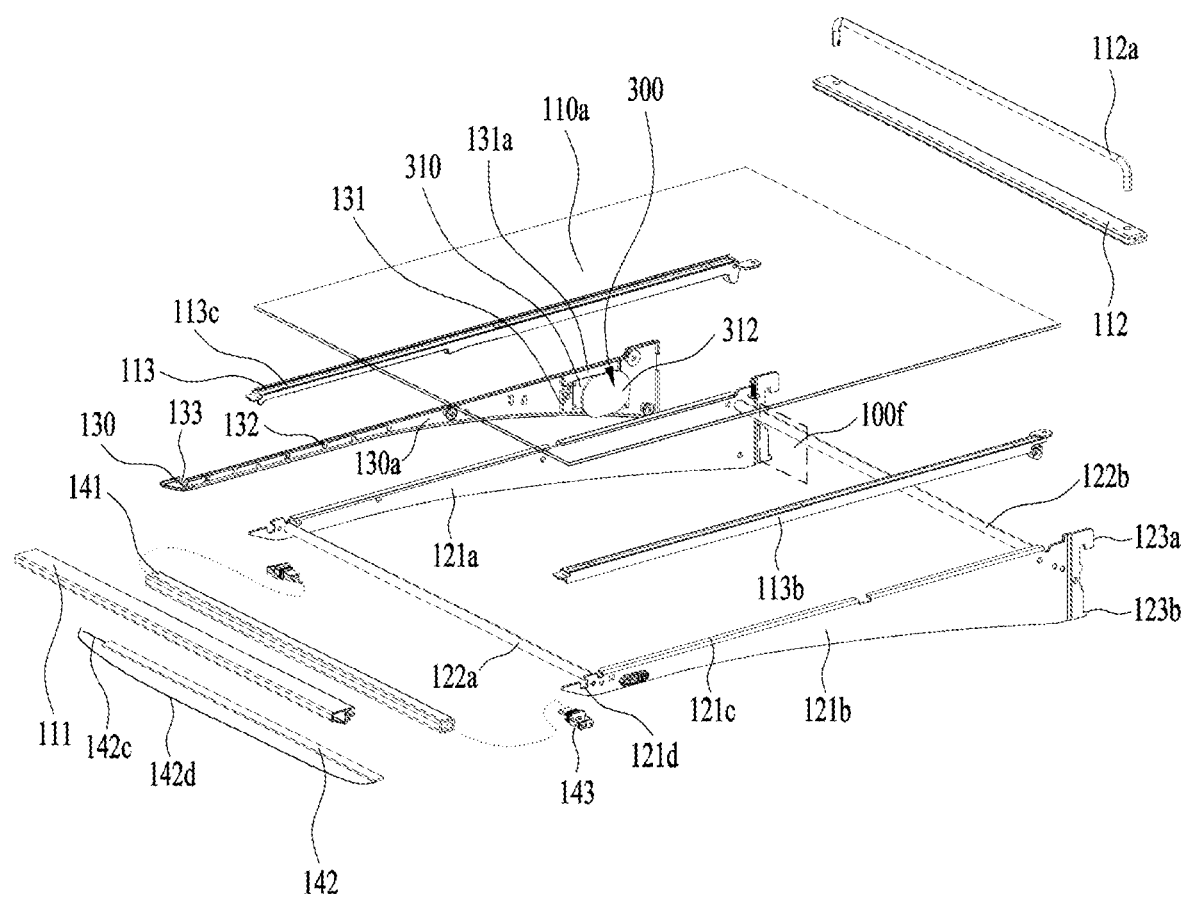
FIGS. 17 and 18 are exploded perspective views of the shelf of FIGS. 16A to 16D.
Figure 18:
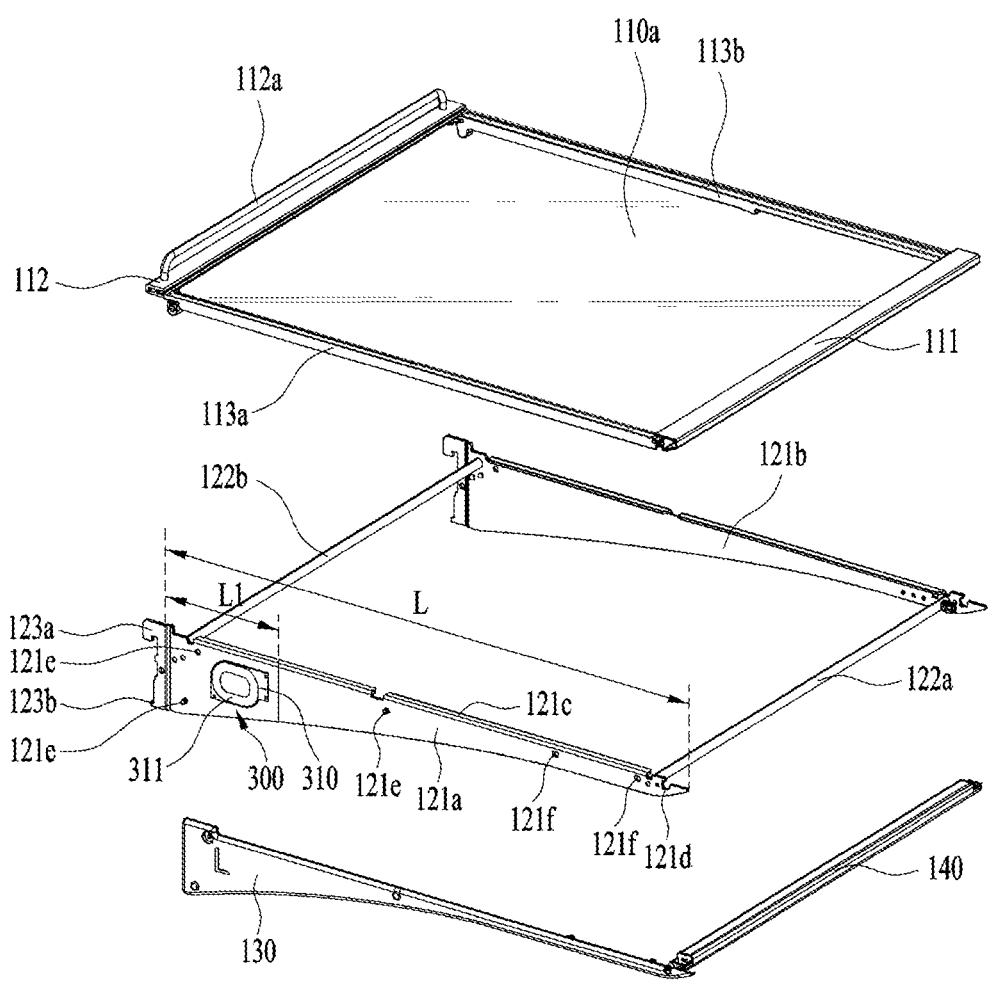
Figure 19:
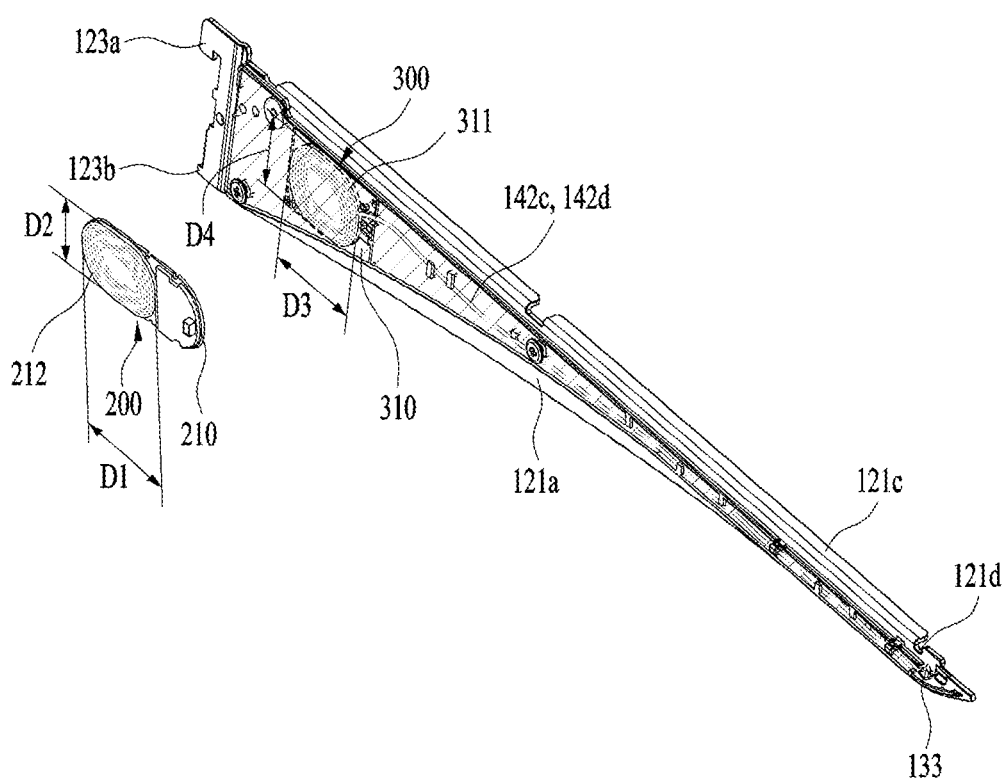
FIG. 19 is a partial perspective view of the shelf including a cover, a receiver, and a transmitter.
Figure 20A:
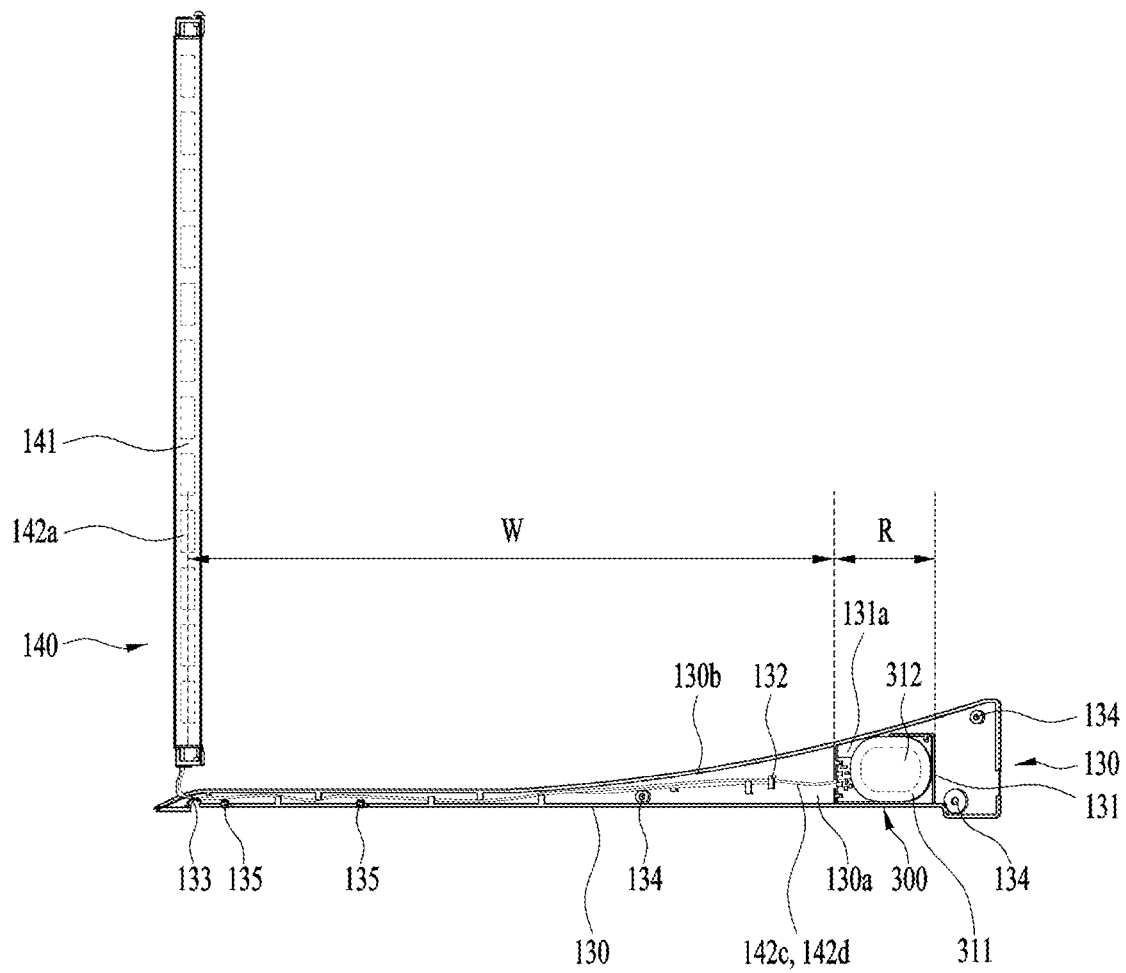
FIG. 20A is a plan view illustrating the assembly of the receiver and a light source unit.
Figure 20B:
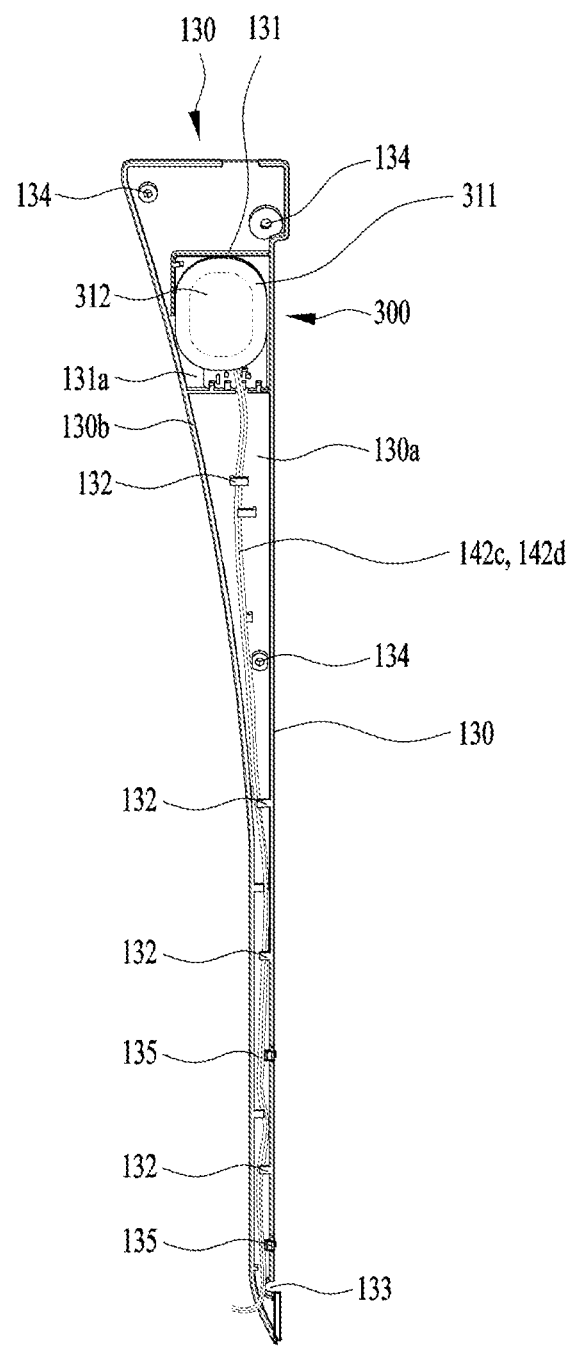
FIG. 20B is a plan view illustrating the cover in detail.

The shelf 100 may be designed so as to achieve optimized functional and structural connection with the transmitter 200 and the receiver 300, which are located as described above. This shelf 100 will be described below in more detail with reference to the related drawings. FIGS. 16A and 16B are perspective views illustrating the shelf according to the present application, which are viewed respectively from the left side and the right side, and FIGS. 17 and 18 are exploded perspective views of the shelf of FIGS. 16A to 16D. In addition, FIG. 19 is a partial perspective view of the shelf including the cover, the receiver, and the transmitter, FIG. 20A is a plan view illustrating the assembly of the receiver and the light source unit, and FIG. 20B is a plan view illustrating in detail the internal structure of the cover.

As described above with reference to FIGS. 1 to 14, in order to efficiently use the storage space, the plural shelves 100 may be supported by the rear wall 13 and may be arranged respectively on the left and right sides of the storage compartment 2. FIG. 16A illustrates the shelf 100 located on the left side of the storage compartment 2 when viewing the refrigerator from the front side, and FIG. 16B illustrates the shelf 100 located on the right side of the storage compartment 2 when viewing the refrigerator from the front side. As described above and illustrated in FIGS. 19, 21 and 23, the transmitter 200 and the receiver 300 may be located on the sidewall 15 and the side portion of the shelf 100 facing the sidewall 15 so as to face each other for wireless power transmission and reception. In the case of the shelf 100 in FIG. 16A in which the left side portion 100a faces the left sidewall 15a, the receiver 300 may be located on the left portion 100a of the shelf 100 and the transmitter 200 may be located on the left sidewall 15a. In addition, in the case of the shelf 100 in FIG. 16B in which the right side portion 100b faces the right sidewall 15b, the receiver 300 may be located on the right portion 100b of the shelf 100 and the transmitter 200 may be located on the right sidewall 15b. In addition, because the illustrated shelves 100 are fixed or supported on the rear wall 13 in order to be arranged respectively on the left and right sides, as illustrated, each shelf 100 may be provided with left and right brackets 121a and 121b. The brackets 121a and 121b respectively form the left and right side portions 100a and 100b of the shelf 100, and may provide the sufficient space for the installation of the receiver 300. Thus, the receiver 300 may be installed on the left bracket 121a in the case of the shelf 100 of FIG. 16A, and may be installed on the right bracket 121b in the case of the shelf 100 of FIG. 16B. The assembly of the brackets 121a and 121b will be described later in more detail. Unlike the illustrations of FIGS. 1 and 16, when the refrigerator includes a single shelf 100, which continuously extends between the left and right sidewalls 15a and 15b, the transmitter 200 and the receiver 300 may be selectively installed on the left sidewall 15a and the left side portion 100a of the shelf, or on the right sidewall 15b and the right side portion 100b of the shelf.

In addition to the basic configuration described above, the detailed configuration of the shelf 100 will be described below with again reference to the aforementioned drawings.

First, the shelf 100 may include a shelf member 110. Food to be stored in the refrigerator may be placed on the shelf member 110. The shelf member 110 may include a plate 110a, which substantially supports the food. The plate 110a may substantially occupy most of the shelf member 110, and thus may form the body of the shelf member 110. The plate 110a may have sufficient strength to stably support food. The plate 110a may be formed as a transparent member for easy identification of food placed thereon and food placed on the plate 110a of another shelf 100. In addition, the shelf member 110 may include rails 113a and 113b disposed respectively on opposite side portions of the plate 110a. The rails 113a and 113b may be configured to support opposite sides of the plate 110a. More specifically, as seen clearly in FIG. 24, the rails 113a and 113b may have recesses 113c formed in upper portions thereof so as to extend in the longitudinal direction. Side portions of the plate 110a may be stably supported in the recesses 113c. In addition, the shelf member 110 may include a front cover 111 and a rear cover 112, which are located respectively on the front end and the rear end of the plate 110a. The front and rear covers 111 and 112 may have a design capable of protecting the exposed front and rear ends of the plate 110a and improving the external appearance of the shelf 100. More specifically, the rear cover 112 may have a barrier 112a installed on the upper portion thereof. The barrier 112a may protrude from the rear cover 112 by a predetermined height, and thus, may prevent food placed on the shelf member 110 from falling rearward from the shelf. To assemble the shelf member 110, the plate 110a may first be seated in the recesses 113c of the rails 113a and 113b, and may then be fixed to the grooves in the recesses 113c using fixing means, for example, an adhesive 113f In addition, the covers 111 and 112 are fitted respectively to the front and rear ends of the preliminary assembly of the plate 110a and the rails 113a and 113b, such that the ends of the rails 113a and 113b as well as the plate 110a may be held by the covers 111 and 112. Through this process, the plate 110a, the rails 113a and 113b, and the covers 111 and 112 may be formed as a single assembly, i.e. the shelf member 110.

In addition, the shelf 100 may include a bracket 120 configured to support the shelf member 110 and food placed thereon relative to the rear wall 13. The bracket 120 may be located below the shelf member 110, and may support the bottom portion of the shelf member 110. The bracket 120 may include the left and right brackets 121a and 121b, which are located respectively on opposite side portions of the shelf member 110 in order to stably support the shelf member 110. More specifically, the left and right brackets 121a and 121b may be located below the left and right sides of the shelf member 110 and may respectively support the left and right sides of the bottom portion of the shelf member 110. The left and right brackets 121a and 121b may extend a long length along the left and right sides of the shelf member 110 in order to stably support the shelf member 110. In addition, the bracket 120 may include bars 122a and 122b configured to support the left and right brackets 121a and 121b. The bars 122a and 122b may be located between the left and right brackets 121a and 121b, and may be oriented perpendicular to the left and right brackets 121a and 121b. In addition, the bars 122a and 122b may be located respectively on the front and rear sides of the left and right brackets 121a and 121b. The bars 122a and 122b may be coupled to the brackets 121a and 121b using fixing members, such as bolts, or may be directly welded to the brackets 121a and 121b. The bars 122a and 122b may prevent the distortion or deformation of the brackets 121a and 121b due to external force, and thus, may increase the strength of the shelf 100. The bars 122a and 122b may have any of various cross-sectional shapes, such as circular, elliptical, and rectangular shapes, so long as they have sufficient strength. For example, as illustrated in FIG. 16C, the front bar 122a may be formed as a cylinder member having a circular cross section, whereas the rear bar 122b may be formed as a plate member having a rectangular cross section.

The bracket 120 may be fixed to or supported by the rear wall 13 in order to support the shelf member 110. For such fixing and supporting, the rear wall 13 may have a seating hole 18 in which the rear end of the bracket 120 may be caught and supported. In consideration of the different heights and sizes of foods, the shelf 100 may be configured so as to be movable vertically, i.e. upward or downward in order to efficiently store the foods. Accordingly, as illustrated in FIGS. 1, 21, 23A, and 23B, a plurality of seating holes 18 may be vertically arranged in a column. Moreover, such a column of seating holes 18 may be provided for each of the left and right brackets 121a and 121b. When each of the brackets 121a and 121b is separated from any one seating hole 18 and is then coupled into another seating hole 18 at a different height, the height of the shelf 100 may be changed.

More specifically, as illustrated in detail in FIGS. 16A to 19 and FIG. 22, the bracket 120 may include a first catch piece 123a and a second catch piece 123b, which are coupled to the rear wall 13, i.e. coupled into the seating holes 18. The first and second catch pieces 123a and 123b may be provided on the rear end of the bracket 120, and may be located respectively on upper and lower portions of the rear end. The first catch piece 123a and the second catch piece 123b may be coupled respectively into different seating holes 18 so as to fix the bracket 120 to the rear wall. The first catch piece 123a may generally have an "L"-shaped form, i.e. an angled form, and may be provided on the upper portion of the rear end of the bracket 120. When the first catch piece 123a is inserted into the seating hole 18, the first catch piece 123a is caught by the upper end of the seating hole 18, which may prevent the front end of the bracket 120 from drooping downward. The second catch piece 123b may be provided below the first catch piece 123a and may be inserted into the seating hole 18. When the second catch piece 123b is inserted into the seating hole 18, it may be possible to prevent the bracket 120 from pivoting toward the rear wall 13 about the first catch piece 123a, which may prevent the front end of the bracket 120 from drooping downward. The second catch piece 123b and the first catch piece 123a may have different shapes due to the functional difference therebetween. For example, as illustrated, the second catch piece 123b may take the form of a pin protruding rearward from the rear end of the bracket 120.

The seating hole 18 for the insertion of the first catch piece 123a and the seating hole 18 for the insertion of the second catch piece 123b may be arranged next to each other so as to be paired. For example, the seating hole 18 for the insertion of the first catch piece 123a may be larger than the seating hole 18 for the insertion of the second catch piece 123b. In this case, the seating hole 18 for the insertion of the first catch piece 123a and the seating hole 18 for the insertion of the second catch piece 123b may be sequentially arranged to form a pair. In addition, the pair of seating holes may be vertically aligned in a column in the rear wall 13 as described above.

Figure 24:
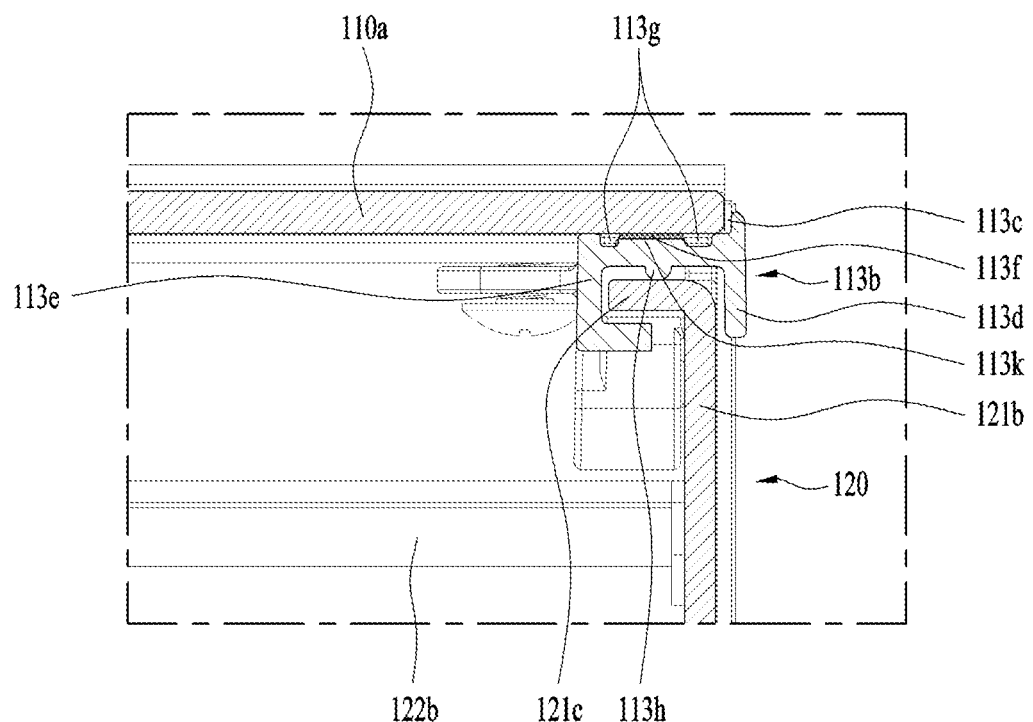
FIG. 24 is a sectional view taken along line A-A of FIG. 16A.
Figure 37:
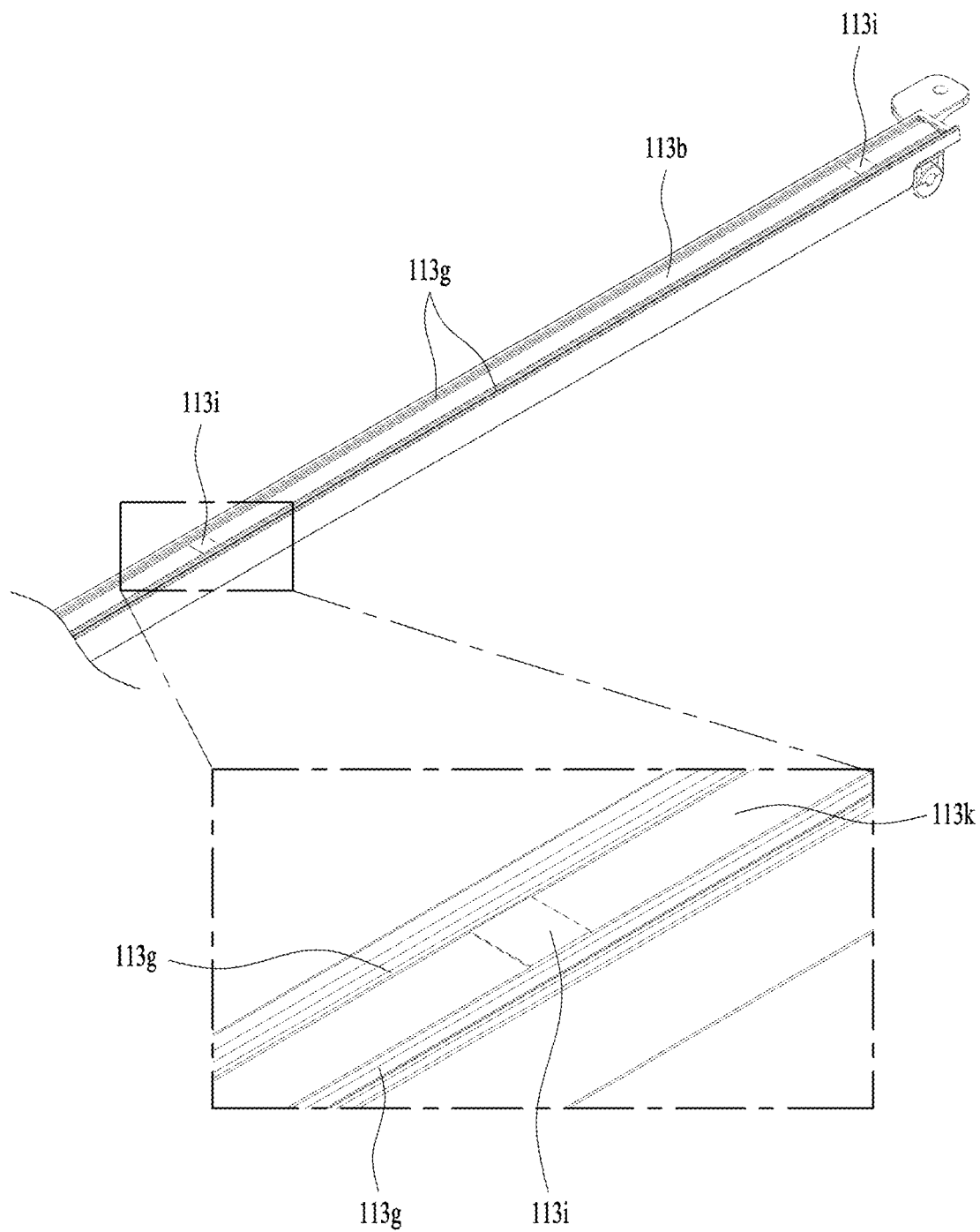
FIG. 37 illustrates a perspective view and a partially enlarged view illustrating a rail of the shelf member.

Alternatively, the user may have difficulty in retrieving food placed on the rear portion of the shelf 100. Accordingly, for the easy retrieval of food, the shelf 100 may be configured to be movable horizontally, i.e. forward and rearward. In practice, because moving the entire shelf 100 as described above may be difficult due to the structure thereof, the shelf member 110 of the shelf 100 may be configured to be movable forward and rearward. For such forward and rearward movement, the rails 113a and 113b of the shelf member 110 may be configured so as to be supported by or coupled to the bracket 120 in a sliding manner. FIG. 24 is a sectional view taken along line A-A of FIG. 16A, and FIG. 37 illustrates a perspective view and a partially enlarged view illustrating the rail of the shelf member. More specifically, FIG. 24 illustrates the plate 110a, the right bracket 121b, and the right rail 113b, and FIG. 37 illustrates only the right rail 113b without any other related members. The mechanism for such forward and rearward movement and the detailed configuration of the rail will be described later with reference to the aforementioned drawings.

As illustrated in FIG. 24, the bracket 120, i.e. the right bracket 121b may include a flange 121c configured to support the right rail 113b in a sliding manner. The flange 121c may extend inward so as to support the bottom surface of the rail 113b. The rail 113b may include a first flange 113d, which extends downward and is supported on the outer surface of the flange 121c. In addition, the rail 113b may include a second flange 113e, which extends downward and is supported by the inner surface of the flange 121c. The second flange 113e may include an extension configured to extend outward in the horizontal direction, and may surround the flange 121c for more stable support. As such, the rail 113b may move along the flange 121c while being guided by the first and second flanges 113d and 113e. The first and second flanges 113a and 113 and the flange 121c may be equally applied to the left and right rails 113a and 113b and the brackets 121a and 121b. As such, as illustrated in FIG. 16D, the shelf member 110 may be moved forward and rearward using the left and right rails 113a and 113b. When the shelf member 110 is moved forward, the foods may be moved close to the user, and thus, the user may conveniently retrieve the foods. Meanwhile, when the entire upper surface of the flange 121c comes into contact with the bottom surface of the rail 113b, relatively large frictional resistance may be generated by such surface contact. Therefore, as illustrated in FIG. 24, the rail 13b may include a protruding portion 113h formed on the bottom surface thereof. The protruding portion 113h may be located at the approximate center of the bottom portion of the rail 113b in the width direction so as to be located between the first and second flanges 113d and 113e, and may extend downward to the flange 121c. Because the protruding portion 113h and the flange 121c have relatively narrow contact surfaces, the rail 113b may be moved along the flange 121c without great resistance. Accordingly, as illustrated in FIG. 16D, the shelf member 110 may be efficiently moved forward and rearward while being supported by the left and right rails 113a and 113b and the brackets 121a and 121b.

The refrigerator may include not only the shelf 100 having the movable shelf member 110 described above, but also the shelf 100 having the immovable shelf member 110 fixed to the brackets 121a and 121b. For example, the user may have difficulty in retrieving food placed on the rear portion of a shelf 100 that is located in the upper region of the storage compartment 2, but may relatively easily retrieve food placed on the rear portion of a shelf 100 that is located in the lower region of the storage compartment 2. Accordingly, the movable shelf member 110 may be applied to the shelf 100 in the upper region of the storage compartment 2, and the fixed immovable shelf member 110 may be applied to the shelf 100 in the lower region of the storage compartment 2. That is, the movable shelf member 110 may be selectively applied in consideration of the relative position of the shelf 100 and other requirements.

As described above, the plate 110a, seated in the recess 113c, may be fixed to the bottom surface of the recess 113c using the adhesive 113f. In order to more efficiently perform this fixing, various elements may be added to the rails 113a and 113b. FIGS. 24 and 37 clearly illustrate these elements. First, when the plate 110a is fixed on the bottom portion of the recess 113c, pressure may be applied to the plate 110a. With this application of pressure, the adhesive 113f may leak outward from the recess 113c, thus deteriorating the external appearance of the shelf 100. For this reason, as illustrated in FIGS. 24 and 37, a groove 113g may be formed in the top of each of the rails 113a and 113b, more particularly, in the bottom surface of the recess 113c. The groove 113g may accommodate the adhesive 113f that flows in the recess 113c, and thus, may prevent the adhesive 113f from leaking outward from the recess 113c. In order to more effectively prevent the leakage of the adhesive 113f, a pair of grooves 113g may be formed in the bottom surface of the recess 113c. The grooves 113g may be spaced apart from each other by a predetermined distance, and may extend in the longitudinal direction of the rails 113a and 113b. As such, a substantial adhesive surface 113k may be formed between the grooves 113g. In addition, a spacer 113i may be formed on the bottom surface of the recess 113c. The spacer 113i may extend upward from the bottom surface of the recess 113c by a predetermined length. The plate 110a is substantially placed on the spacer 113i, and a space, which may be filled with the adhesive 113f, may be defined between the plate 110a and the recess 113c by the spacer 113i. For this reason, the spacer 113i may be located between the grooves 113g, more specifically, on the adhesive surface 113k. Upon the assembly of the shelf member 110, an adhesive member, for example, a piece of double-sided tape may be attached to the top of the spacer 113i, and the plate 110a may be preliminarily attached on the spacer 113i. Thereafter, the plate 110a may be ultimately fixed on the rail 113b using the adhesive 113f. During this fixing process, the grooves 113g may prevent the outward leakage of the adhesive 113f, and all of the adhesive 113f may be used to fix the plate 110a. Accordingly, through the configuration described above, the plate 110a may be more firmly fixed to the rail 113a or 113b without deterioration in the external appearance of the shelf 100.

Figure 25:
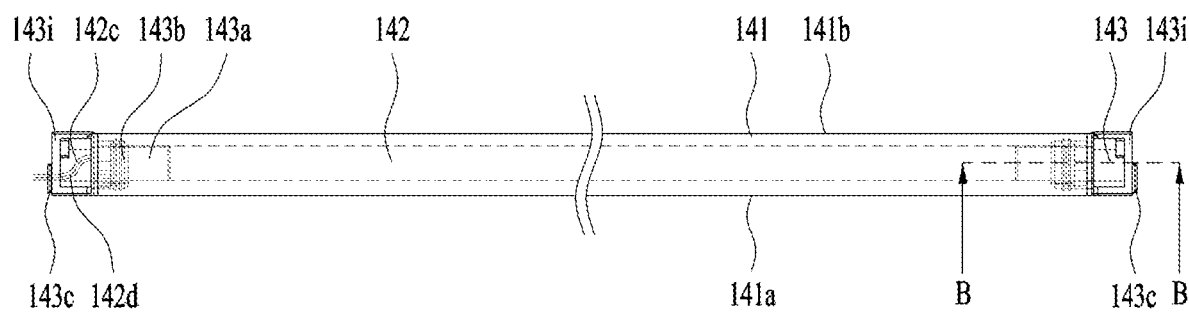
FIG. 25 is a plan view illustrating the top of the light source unit of the shelf.
Figure 26A:
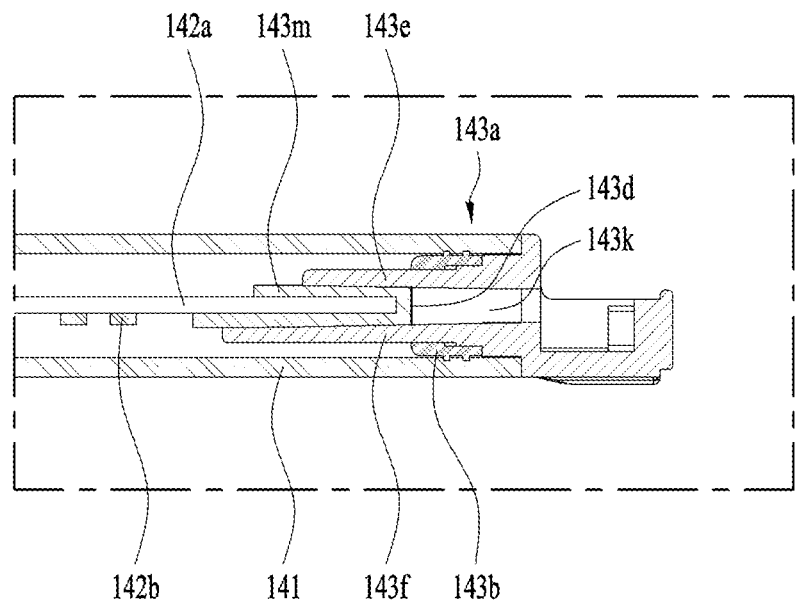
FIG. 26A is a sectional view taken along line B-B of FIG. 25.
Figure 26B:
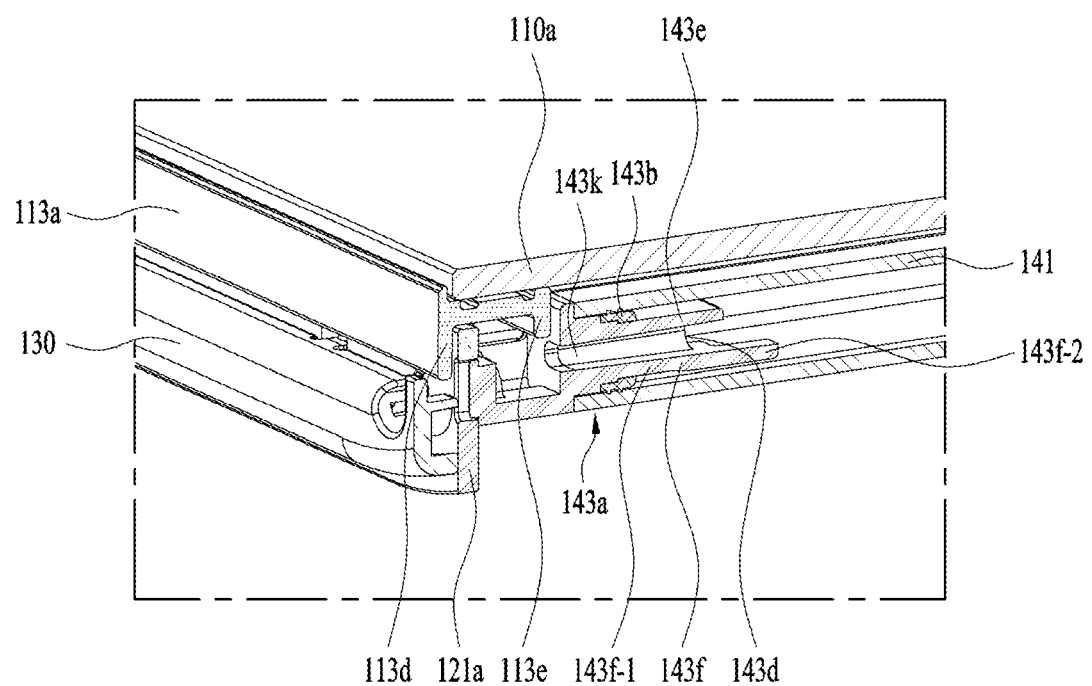
FIG. 26B is a sectional view taken along line C-C of FIG. 16A.
Figure 27:
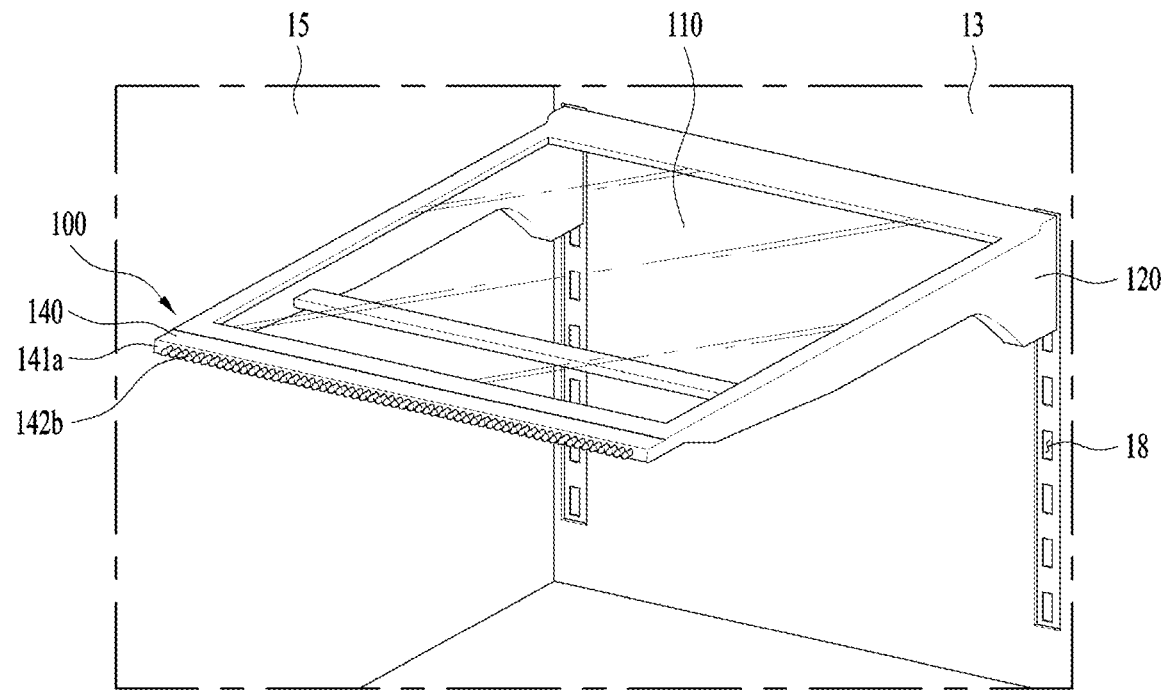
FIG. 27 is a perspective view illustrating the light source unit of the shelf, which is configured to emit light forward.
Figure 28:
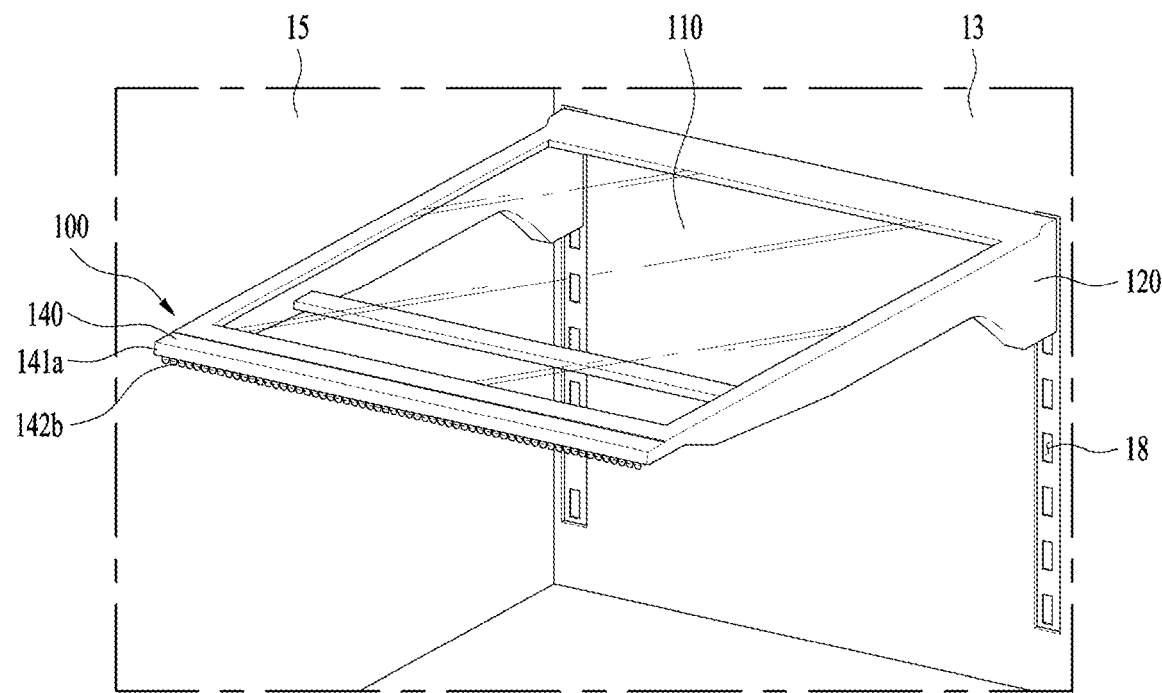
FIG. 28 is a perspective view illustrating the light source unit of the shelf, which is configured to emit light downward.
Figure 29:
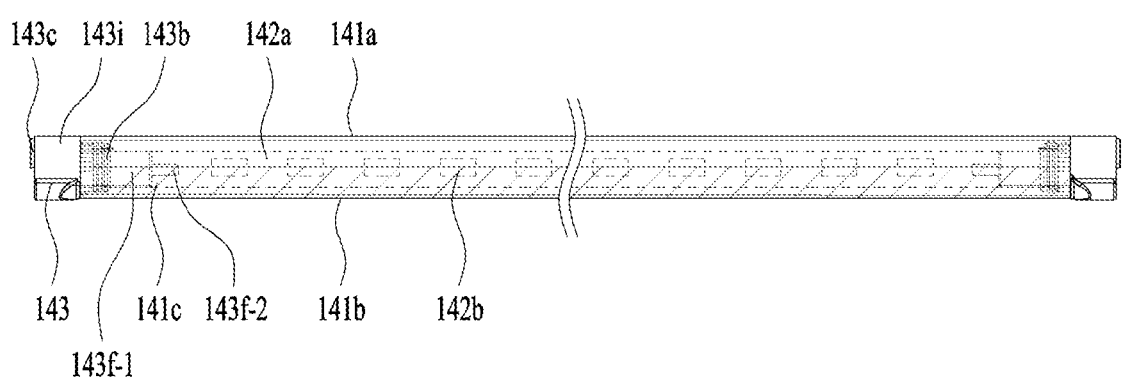
FIG. 29 is a plan view illustrating the bottom of the light source unit of FIG. 27.
Figure 30A:
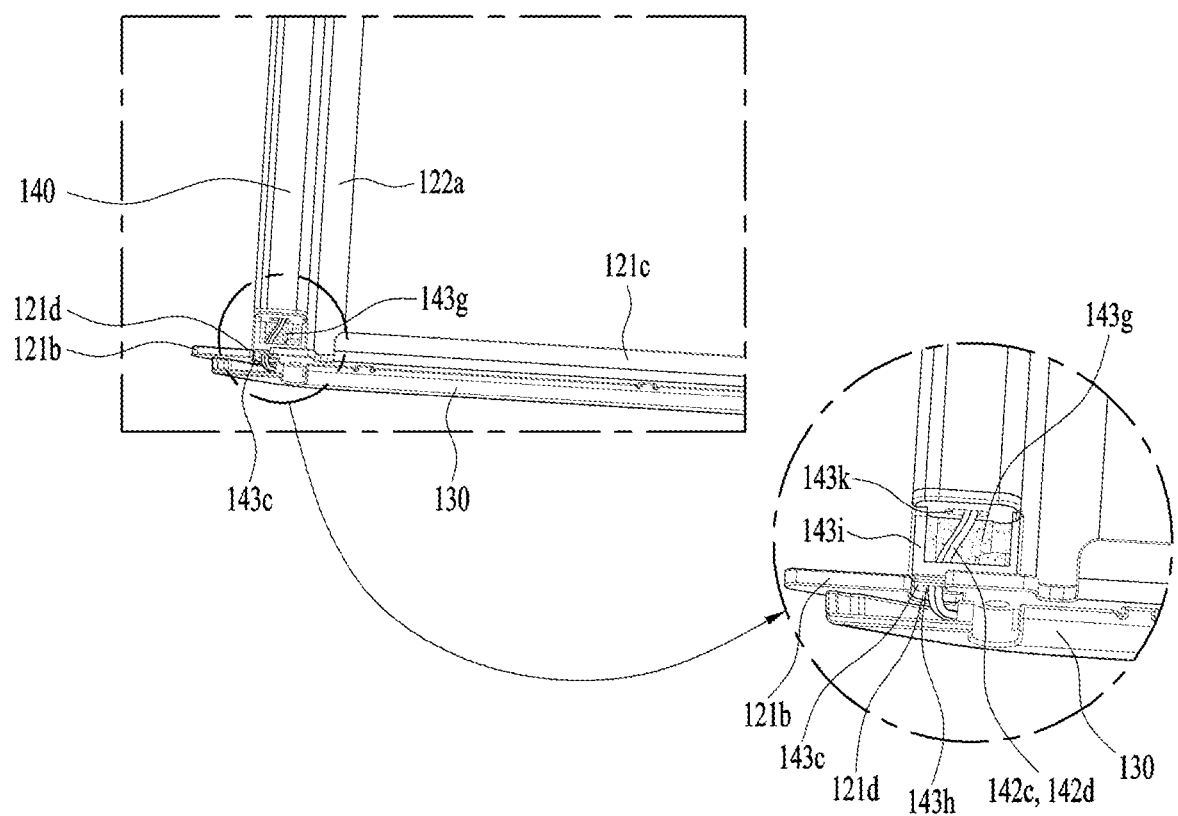
FIG. 30A illustrates a partial perspective view illustrating the light source unit coupled to the bracket and a partially enlarged view illustrating a cap member of the light source unit in detail.
Figure 30B:
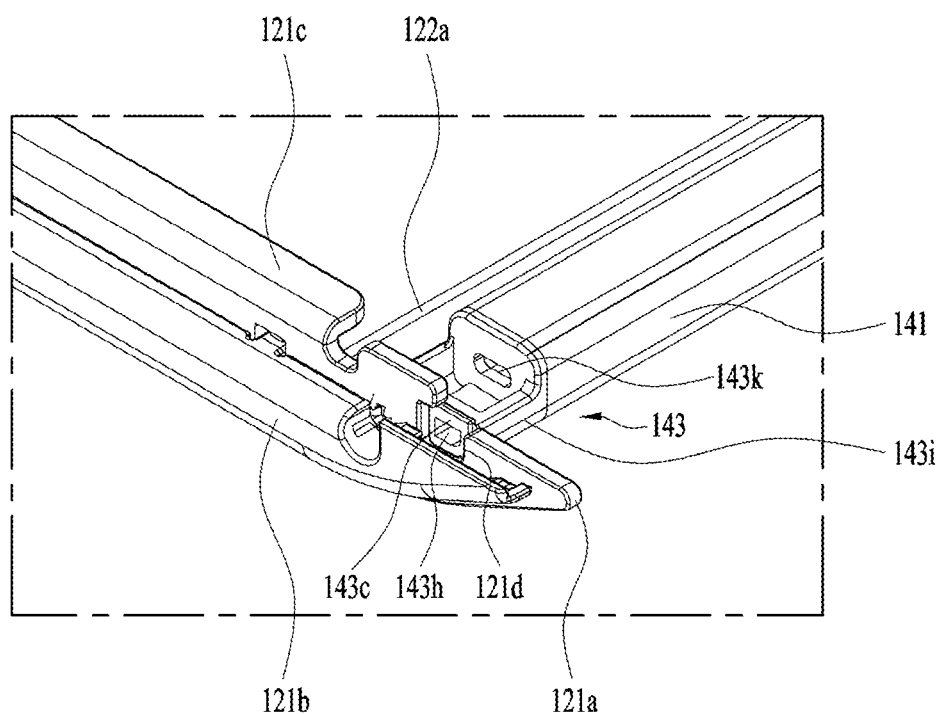
FIG. 30B is a partial perspective view illustrating the light source unit coupled to the bracket.
Figure 38:
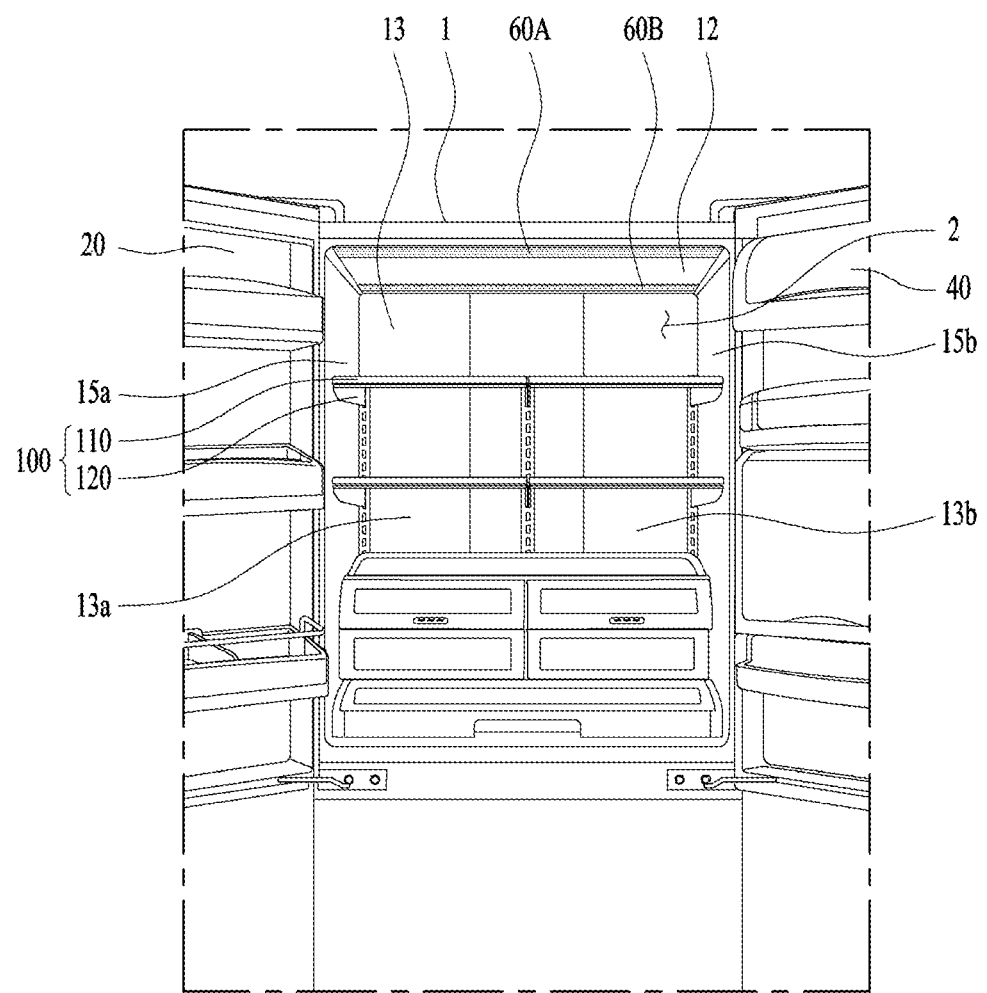
FIG. 38 is a front view of the refrigerator illustrating a wall light source for illuminating the inside of the refrigerator.
Figure 39:
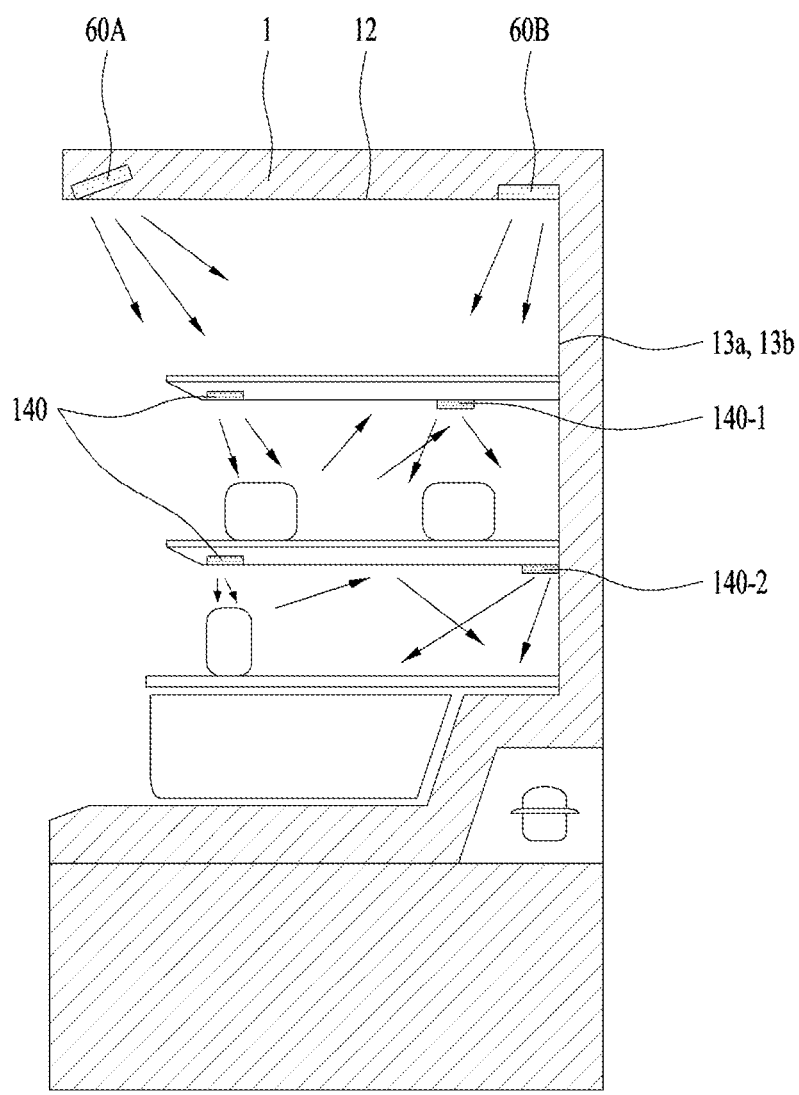
FIG. 39 is a sectional view of the refrigerator illustrating the wall light source and the light source unit of the shelf for illuminating the inside of the refrigerator.

In addition, the shelf 100 may include a light source unit 140 configured to emit light upon receiving a voltage from the receiver 300. FIG. 25 is a plan view illustrating the top of the light source unit of the shelf, FIG. 26A is a sectional view taken along line B-B of FIG. 25, and FIG. 26B is a sectional view taken along line C-C of FIG. 16A. FIG. 27 is a perspective view illustrating the light source unit of the shelf, which is configured to emit light forward, and FIG. 28 is a perspective view illustrating the light source unit of the shelf, which is configured to emit light downward. In addition, FIG. 29 is a plan view illustrating the bottom of the light source unit of FIG. 27. FIGS. 30A and 30B are partial perspective views illustrating the light source unit coupled to the bracket. In addition, FIGS. 36A to 36E are perspective views illustrating right and left caps of the light source unit, and a plan view, a front view and a right side view illustrating the cap. FIG. 38 is a front view of the refrigerator illustrating a wall light source for illuminating the inside of the refrigerator, and FIG. 39 is a sectional view of the refrigerator illustrating the wall light source and the light source unit of the shelf for illuminating the inside of the refrigerator. The light source unit 140 will be described below in detail with reference to the drawings. In addition, FIGS. 16A to 20B illustrate the prerequisite structures of the shelf 100, and thus will be referenced in the following description.

Because the space inside the refrigerator, i.e. the storage compartment 2 is dark, the user cannot easily look for stored food. Therefore, as illustrated in FIGS. 38 and 39, light sources 60A and 60B may be provided in order to illuminate the inside of the refrigerator, i.e. the storage compartment 2. For the uniform illumination of the storage compartment 2, the light sources 60A and 60B may be installed, for example, in the top wall 12, and may be located respectively in the front portion and the rear portion of the top wall 12. However, light emitted from the light sources 60A and 60B may be blocked by the shelf 100 and articles placed thereon, and thus may not reach all regions in the storage compartment 2. When the light source unit 140 is installed on the shelf 100 in addition to the light sources 60A and 60B, the light source unit 140 may directly illuminate the space between the shelves 100. Owing to the light source unit 140 installed in the shelf 100, the user can more clearly check articles placed on the shelf 100 and the storage compartment 2 may be more uniformly illuminated. In addition, because the rear region of the storage compartment 2 is generally darker than the front region, the front light source 60A may be oriented toward the rear region of the storage compartment 2 to illuminate the rear region as illustrated in FIG. 39. In this case, illumination may be more insufficient in the front region of the storage compartment 2 than in the rear region of the storage compartment 2. For this reason, the light source unit 140 may be located on the front region of the shelf 100 so as to illuminate the front region of the storage compartment 2. In addition, the light source unit 140 may continuously extend along the front portion of the shelf 100 for uniform illumination. In practice, the light source unit 140 may be located between the brackets 121a and 121b and may be coupled at left and right ends thereof to the brackets 121a and 121b. The light source unit 140 may supplement the illumination of the front region of the storage compartment 2. In addition, as illustrated in FIG. 39, light emitted from the light source unit 140 may be reflected by foods immediately below the light source unit 140 or other shelves, and thus the storage compartment 2 may be more uniformly illuminated. In addition, as illustrated in FIG. 39, the refrigerator may include an additional illuminator 140-1 installed on the central portion of the shelf 100 and/or an additional illuminator 140-2 installed on the rear portion of the shelf 100. The additional illuminators 140-1 and 140-2 may uniformly illuminate the storage compartment 2 in conjunction with the front light source unit 140.

More specifically, as clearly illustrated in FIGS. 17 and 25, the light source unit 140 includes a housing 141. The housing 141 may be formed as a hollow tubular member. In addition, the light source unit 140 may include a light source module 142 configured to emit light. As clearly illustrated in FIG. 29, the module 142 may be comprised of a substrate 142a and light-emitting elements 142b attached to the substrate. The light-emitting elements 142b may include, for example, light-emitting diodes (LEDs). As described above, because the light source unit 140 extends a long length along the front portion of the shelf 100 for uniform illumination, the substrate 142a of the module 142 may be formed as an elongated strip member, and the light-emitting elements 142b may be arranged in a line at a predetermined interval along the substrate 142a. In addition, the module 142 may include wires 142c and 142d connected to the substrate 142a in order to receive a voltage from the receiver 300, and the wires 142c and 142d may extend outward from the light source unit 140 to thereby be connected to the receiver 300. The module 142 is accommodated in the housing 141 in order to be protected from the external environment. In addition, the remaining portion of the housing 141, excluding a specific portion, may be opaque so that the light, generated in the module 142, is emitted only in a desired direction. That is, the housing 141 may include a light shield portion configured to pass no light, and a translucent portion configured to pass light, i.e. a window (see 141c in FIG. 29).

In addition, as clearly illustrated in FIGS. 26A and 26B and FIGS. 36A to 36E, the light source unit 140 may include caps 143 configured to close opposite ends of the housing 141. The caps 143 may basically prevent moisture or other impurities from being introduced into the housing 141, causing a breakdown of the module 142. Each cap 143 may include a head 143i and an extension 143a extending from the head 143i. The head 143i may be located outside the housing 141 and may be coupled to the bracket 121a or 121*b*. The head 143*i* may have a hollow body, a portion of which is open. That is, the head 143*i* may be formed as a container defining a predetermined space therein. Access to the space inside the head 143*i* is possible because a portion of the head 143*i* is open. Thus, the worker may easily pull the wires 142*c* and 142*d* outward from the light source unit 140 through the cap 143 from the inside of the housing 141. The extension 143*a* may be inserted into the housing 141 and may catch the module 142. That is, the extension 143*a* may serve as a holder for substantially catching and supporting the module 142. Once the caps 143 have been installed on the left and right ends of the housing 141, the extensions, i.e. the holders 143*a* may catch the left and right portions of the module 142. As such, the module 142 may be stably supported inside the housing 141 while maintaining a constant distance from the inner walls of the housing 141 by using the caps 143, more particularly, the extensions 143*a*.

In addition, as illustrated in FIG. 25, the cap 143 may further include a sealing member 143*b* located between the body of the cap 143 and the housing 141. In practice, the sealing member 143*b* is located so as to surround the extension 143*a*. The sealing member 143*b* may be press-fitted between the cap 143, i.e. the extension 143*a* and the housing 141, and thus may effectively prevent moisture and other impurities from being introduced into the housing 141. That is, the sealing member 143*b* may form a first seal of the light source unit 140, which is interposed between the housing 141 and the extension 143*a* to prevent foreign substances from being introduced into the housing 141. In addition, the cap 143 may include a protrusion 143*c*. The protrusion 143*c* may extend outward from the left or right end of the cap 143 in the longitudinal direction. As clearly illustrated in FIGS. 16A to 20B, the bracket 120 may include a groove 121*d* formed in the front portion thereof. Accordingly, as clearly illustrated in FIGS. 30A and 30B, the light source unit 140 may be coupled to and stably supported by the bracket 120 as the protrusion 143*c* is inserted into the groove 121*d*. In addition, the protrusion 143*c* is directly coupled to the bracket 120 and is exposed outside the bracket 120. As such, the wires 142*c* and 142*d* may exit the light source unit 140 and the bracket 120 via the protrusion 143*c* so as to be connected to the receiver 300. For the discharge of the wires, as clearly illustrated in FIGS. 30A and 30B, the protrusion 143*c* may include a through-hole 143*h*. The wires 142*c* and 142*d* may exit through one of left and right protrusions 143*c* located close to the receiver 300, depending on the position of the receiver 300.

As described above, the extension 143*a* may function as a holder for catching the module 142. That is, the cap 143 may include the holder 143*a*, which extends into the housing 141 and is configured to stably fix the module 142. The holder 143*a* is clearly illustrated in FIGS. 26A and 26B. FIG. 26A illustrates the holder 143*a* coupled to the module 142, whereas the module 142 is omitted in FIG. 26B in order to clearly illustrate the holder 143*a*. Referring to FIGS. 26A and 26B, the cap 143 may include a stopper 143*d* configured to support each end of the module 142, the stopper 143*d* serving as the holder 143*a*. The module 142 may generally have a predetermined length, which may be determined based on various conditions, for example, the number of elements 142*b*. Because the length of the module 142 is first determined, the size of the stopper 143*d*, i.e. the length thereof may be determined so that the stopper 143*d* comes into contact with and supports the end of the module 142. The stopper 143*d* may be provided with a through-hole 143*k*, and the inside and the outside of the housing 141 may communicate with each other via the through-hole 143*k*. Accordingly, the wires 142*c* and 142*d* may exit the housing 141 via the through-hole 143*k*. The through-hole 143*k* is clearly illustrated in FIGS. 30A and 30B.

In addition, the cap 143 may include, as the holder 143*a*, a first arm 143*e* configured to support the top of the module 142. The first arm 143*e* may be disposed on the top of the module 142 so as to support the top of the module 142. More specifically, the first arm 143*e* may extend a predetermined length from the top of the stopper 143*d* into the housing 141. In addition, the cap 143 may include, as the holder 143*a*, a second arm 143*f* configured to support the bottom of the module 142. The second arm 143*f* may be disposed on the bottom of the module 142 so as to support the bottom of the module 142. More specifically, the second arm 143*f* may extend a predetermined length from the bottom of the stopper 143*d* into the housing 141. In addition, because the module 142 has an elongated body, the module 142 may droop downward due to the weight thereof. Accordingly, the second arm 143*f* may be longer than the first arm 143*e* as illustrated. For example, the second arm 143*f* may have a length 1.1 times to 3.0 times the length of the first arm 143*e*. In addition, the second arm 143*f* may have a reduced width in a portion thereof. More specifically, as clearly illustrated in FIG. 26B and FIGS. 36A to 36E, the second arm 143*f* may include a first extension 143*f*-1 extending a predetermined length from the head 143*i*, and a second extension 143*f*-2 extending from the first extension 143*f*-1, the second extension 143*f*-2 having a width smaller than the first extension 143*f*-1. The first extension 143*f*-1 may be approximately the same length as the first arm 143*e*, and thus, the second extension 143*f*-2 forms an increased length portion of the second arm 143*f*. Accordingly, the second arm 143*f* may attain the intended length using a simpler structure and less material. The second arm 143*f* may support a wider bottom portion of the module 142, and thus may more stably support the module 142 having a long length.

As described above, the wires 142*c* and 142*d* of the substrate may extend outward from the housing 141 through the through-hole 143*k* in the stopper 143*d*. Therefore, moisture may be introduced through the through-hole 143*k*. For this reason, as clearly illustrated in FIG. 30A, the head 143*i* of the cap 143 may be filled with a sealing material 143*g*. That is, the sealing material 143*g* may form a second seal, which is provided inside the head 143*i* and prevents foreign substances from being introduced into the housing 141. The sealing material 143*g* may also serve to fix the wires 142*c* and 142*d* in the head 143*i*. In addition, as illustrated in FIG. 26A, in order to more effectively prevent a failure of the module 142 due to the entry of moisture and foreign substances, a sealing member or material 143*m* may be additionally provided inside and/or around the holder 143*a*, i.e. the stopper 143*d* and the first and second arms 143*e* and 143*f*. More specifically, the sealing member or material 143*m* may be interposed between the holder 143*a* (i.e. the stopper 143*d* or the first and second arms 143*e* and 143*f*) and the module 142, and may effectively prevent moisture or other foreign substances from reaching the module 142. That is, in addition to the first and second seals 143*b* and 143*g* described above, the sealing member or material 143*m* may serve as a third seal, which is interposed between the holder 143*a* and the module 142 to prevent foreign substances from reaching the module 142. The additional sealing member or material 143*m* may also seal the through-hole 143*k* of the stopper 143*d*. Accordingly, the sealing member or material may also prevent the sealing material 143*g* in the head 143*i* (see FIG. 30A) from being introduced into the housing 141 through the through-hole 143*k*.

The light source unit 140, as illustrated in FIG. 27, may be configured to emit light forward. Referring to FIG. 25, the housing 141 may include a front portion 141*a* and a rear portion 141*b*, and the front portion 141*a* may be oriented to face the user. Accordingly, as illustrated in FIG. 27, the light-emitting elements 142*b* may be oriented forward, i.e. toward the front portion 141*a* so as to emit light forward. In addition, only the front portion 141*a* may be transparent so as to pass the emitted light therethrough. The emission of light may realize the effective illumination of the storage compartment 2, but may subject the user to glare. For this reason, as illustrated in FIG. 28, the light source unit 140 may be configured to emit light downward. Accordingly, as illustrated in FIG. 29, the light-emitting elements 142*b* may be oriented toward the bottom portion of the housing 141 so as to emit light downward. In addition, the window 141*c*, which is configured to pass the emitted light therethrough, may be formed in the bottom portion of the housing 141. This orientation may prevent light from being directly emitted to the user, thus not subjecting the user to glare.

Figure 40A:
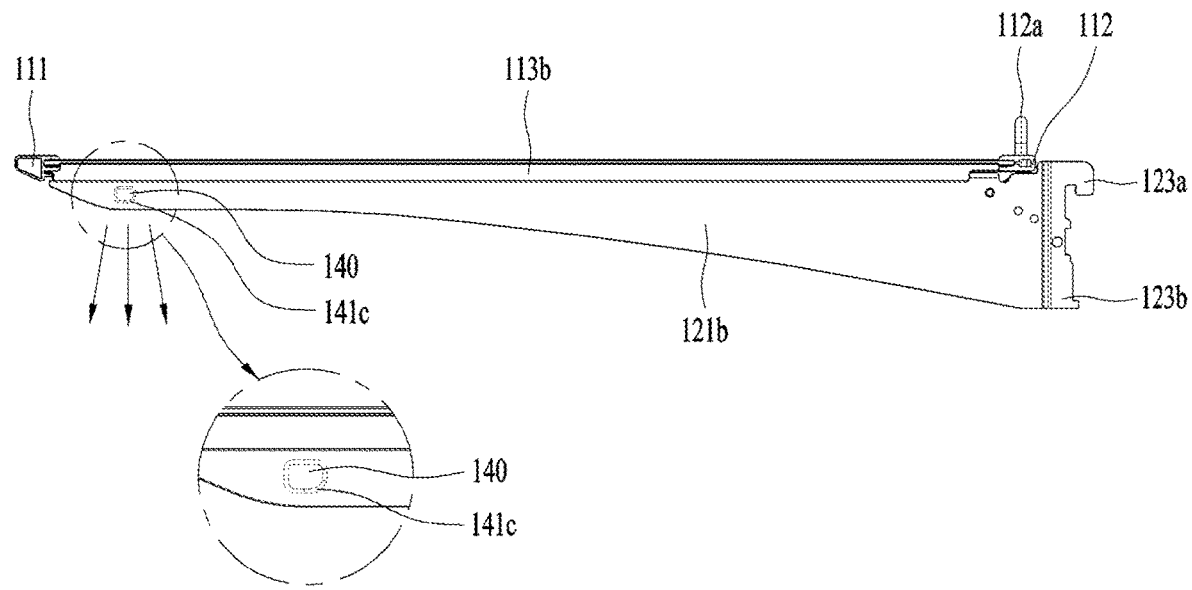
FIGS. 40A and 40B are side views illustrating examples of the orientation of the light source unit.
Figure 40B:
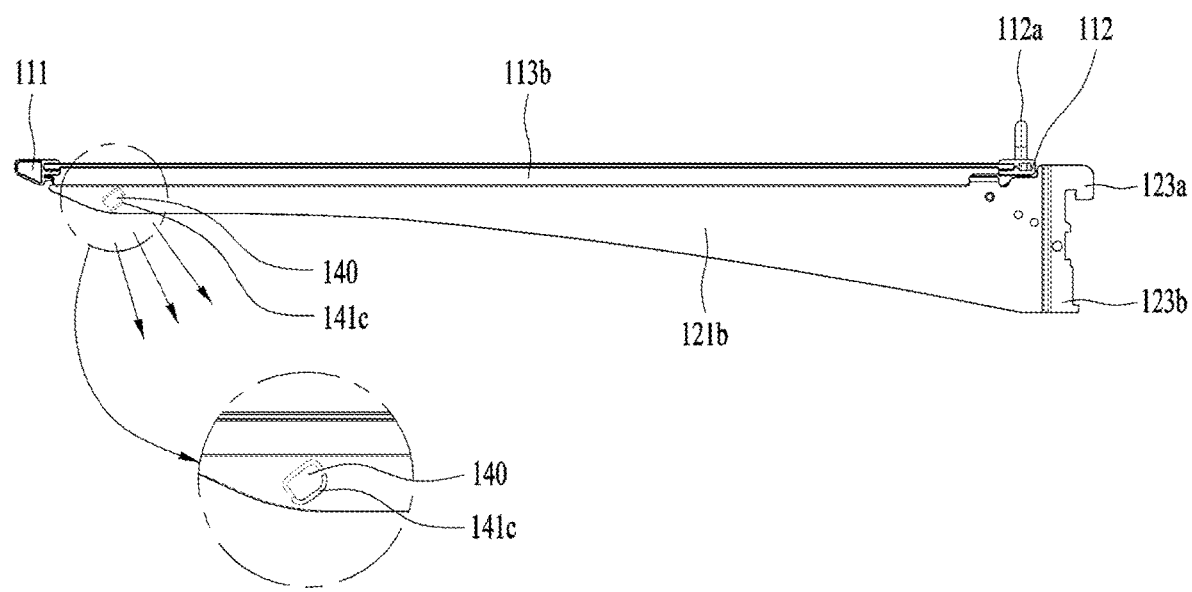

More specifically, as illustrated in FIG. 40A, the light source unit 140 may be configured to emit light vertically downward. For the vertical downward emission of light, the light source unit 140 may be oriented substantially parallel to the horizontal plane. Because the window 141*c*, which discharges light, is located in the bottom portion of the light source unit 140, more particularly, the housing 141, the bottom portion of the light source unit (i.e. the housing 141) or the window 141*c* may be oriented substantially parallel to the horizontal plane in order to emit light vertically downward. Alternatively, as illustrated in FIG. 40B, the light source unit 140 may be configured to emit light downward and to emit light to the rear region of the storage compartment 2. To this end, the light source unit 140 may be oriented to face the rear region of the storage compartment 2, and may be oriented at a predetermined angle of inclination relative to the horizontal plane. More accurately, in order to emit light to the rear region of the storage compartment 2, the bottom portion of the housing 141 or the window 141*c* may be oriented toward the rear region of the storage compartment 2, and may be oriented at a predetermined angle of inclination relative to the horizontal plane.

Although the light source unit 140 includes the housing 141 for protecting the module 142, more particularly, the light-emitting elements 142*a* as described above, the light source unit 140 may include only the module 142 without the housing 141. That is, the module 142, i.e. the light-emitting elements 142*b* of the light source unit 140 may be exposed to the outside. For example, as illustrated in FIG. 27, the exposed light-emitting elements 142*b* may be arranged, as the light source unit 140, on the shelf 100, and may be oriented to emit light forward. Alternatively, as illustrated in FIG. 28, the exposed light-emitting elements 142*b* may be arranged, as the light source unit 140, on the shelf 100, and may be oriented to emit light downward. The various configurations of the light source unit 140 described in this specification may also be equally applied to the light source unit 140 having exposed light-emitting elements 142*b*.

Figure 41A:
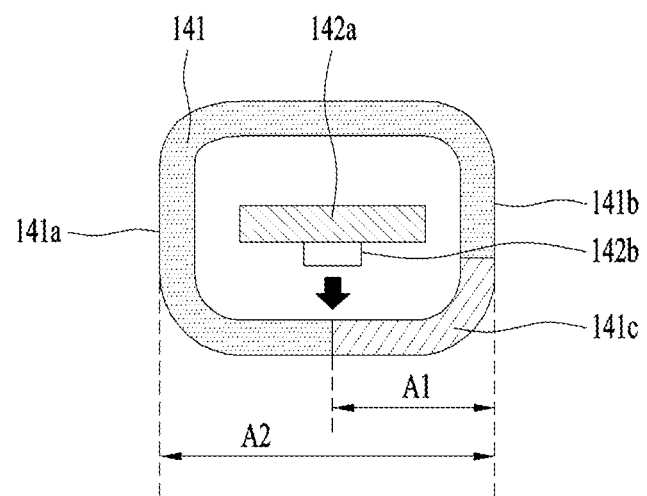
FIG. 41A is a sectional view illustrating the configuration of a housing and a light source module of the light source unit.

When the window 141*c* is formed in the entire bottom portion of the light source unit 140 (i.e. the housing 141), the inside of the storage compartment 2 may be more brightly illuminated owing to the increase in the light emission area. However, some of the light discharged through the window 141*c* may be emitted forward, subjecting the user to glare. Accordingly, as illustrated in FIG. 29 and FIGS. 41A to 41E, which illustrate the cross section of the light source unit 140, the window 141*c* may be formed in only a portion of the housing 141, rather than being formed in the entire bottom portion thereof. More specifically, as illustrated in FIG. 41A, a length A1 from the front end to the rear end of the window 141*c* may be set to half of a length A2 from the front end to the rear end of the light source unit 140 (more particularly, the housing 141). Through the setting of the length A1 of the window 141*c*, sufficient illumination may be prevented without subjecting the user to glare. In addition, when the window 141*c* is located in the front portion of the bottom portion of the housing 141, as already mentioned above, this may subject the user to glare. Accordingly, as illustrated in FIGS. 41A to 41E, the window 141*c* may be located in the rear portion of the bottom portion of the housing 141. Because the window 141*c* of FIG. 41A, i.e. the window 141*c* located in the rear portion of the housing 141 does not cause glare, as illustrated in FIG. 40A, it may be applied to the light source unit 140, which emits light vertically downward. In contrast, in the light source unit 140 of FIG. 40B, the window 141*c* is oriented toward the rear region of the storage compartment 2, and therefore, there is a low possibility of the light emitted through the window 141*c* causing glare. Accordingly, the light source unit 140 of FIG. 40B may have the window 141*c* formed in the entire bottom portion of the housing 141. In addition, because the light-emitting elements 142*b* are spaced apart from one another by a predetermined distance, a portion of the window 141*c* adjacent to the light-emitting elements 142*b* may be brighter than the remaining portion of the window 141*c*. That is, the user may perceive a point light source. This phenomenon may have a negative effect on the external appearance of the refrigerator. For this reason, the window 141*c* may be configured as a diffuser capable of uniformly dispersing incident light. The use of the diffuser may prevent effects due to the point light source.

Figure 41B:
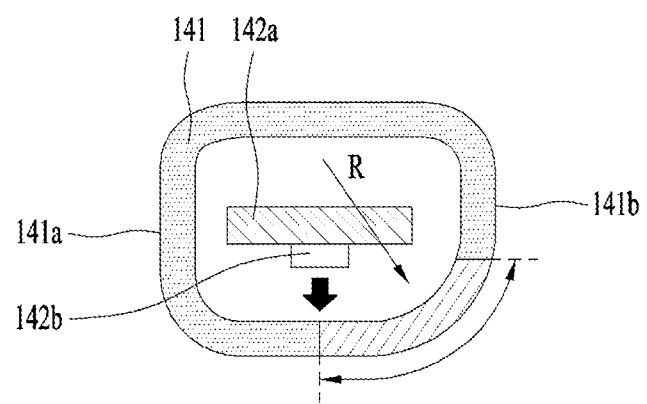
FIGS. 41B to 41E are sectional views illustrating other examples of the configuration of FIG. 41A.
Figure 41C:
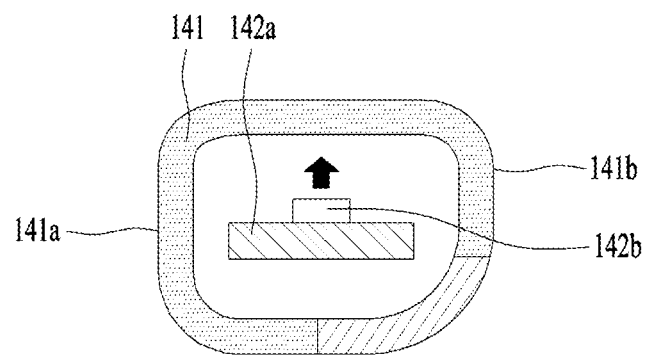
Figure 41D:
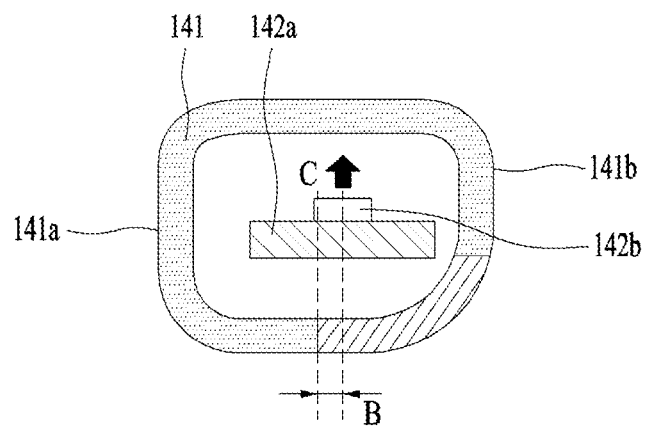
Figure 41E:
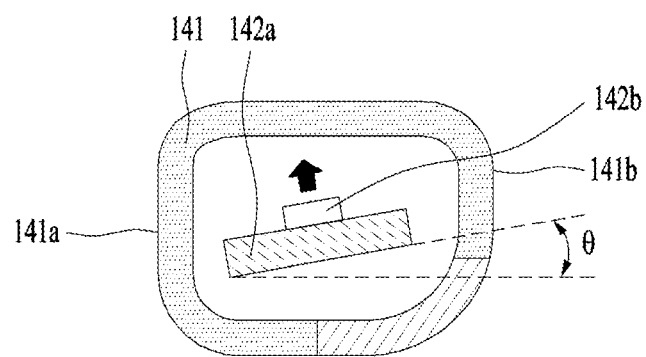

As illustrated in FIG. 41B, the window 141*c* may be curved. That is, the window 141*c* may substantially have a radius of curvature R. More specifically, a portion of the window 141*c* may be curved, and thus the window 141*c* may include at least one curved portion. In addition, the entire window 141*c* may be curved. The curved window 141*c* may allow light to be diffused over a wider range and may allow the storage compartment 2 to be more uniformly illuminated. Because the light source unit 140 is configured to illuminate the region below the shelf 100 as described above, the module 142 and the light-emitting elements 142*b* may be oriented to emit light downward as illustrated in FIGS. 41A and 41B. That is, at least the light-emitting elements 142*b* may be oriented toward the bottom of the housing 141, and thus may face the inner bottom surface of the housing 141. Alternatively, as illustrated in FIG. 41C, the module 142 and the light-emitting elements 142*b* may be oriented to emit light upward rather than downward. That is, the light-emitting elements 142*b* may be oriented in the upward direction of the housing 141, and may face the inner top surface of the housing 141. With this orientation, the light-emitting elements 142*b* do not face the window 141*c*, and therefore, the point light source phenomenon mentioned above may be fundamentally prevented. In addition, light emitted from the light-emitting elements 142*b* may be reflected and diffused by the opaque inner surfaces of the housing 141, and thus may be primarily made uniform inside the housing 141, i.e. may have uniform magnetic flux. Accordingly, uniform light may be discharged outward through the window 141*c*, which may implement more uniform illumination. In addition, as illustrated in FIG. 41D, the module 142 and the light-emitting elements 142*b*, which are oriented upward, may be arranged in the rear portion of the light source unit 140. That is, the light-emitting elements 142b may be arranged in the rear region of the space inside the housing 141. For example, the vertical center axis of each of the light-emitting elements 142b may be spaced rearward apart from the vertical center axis C of the light source unit 140 (i.e. the housing 141) by a predetermined distance B. The distance B may be, for example, about 1 mm. In the same manner, the light-emitting elements 142b may be aligned with the window 141c located in the rear portion. Accordingly, the light emitted from the light-emitting elements 142b may be reflected by the inner surface of the housing 141 to thereby directly reach the window 141c. Alternatively, as illustrated in FIG. 41E, the module 142 and the light-emitting elements 142b may be oriented to emit light to the upper portion and the front portion of the light source unit 140, more particularly, the housing 141. That is, the light-emitting elements 142b may face the inner top surface and the inner front surface of the housing 141. For this orientation, the light-emitting elements 142b may be inclined at a predetermined angle θ relative to the horizontal plane. For example, the angle θ may range from 10° to 15°. The light-emitting elements 142b oriented as described above face the plural inner surfaces of the housing 141, such that light emitted from the light-emitting elements 142b may be more greatly reflected and diffused. For example, while 40% of the light from the light-emitting elements 142b, which are oriented downward as illustrated in FIGS. 41A and 41B, is reflected by the inner surfaces of the housing 141, 70% of the light from the light-emitting elements 142b illustrated in FIG. 41E may be reflected by the inner surfaces. Accordingly, the light-emitting elements 142b of FIG. 41E may prevent the point light source phenomenon and may provide remarkably uniform illumination.

Figure 42:
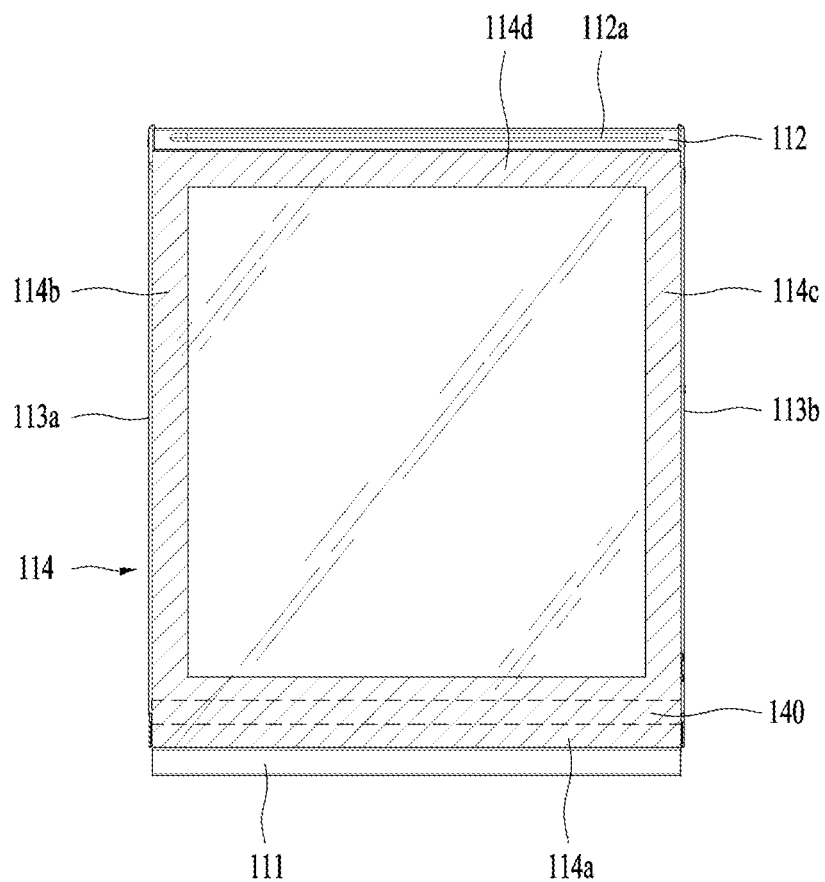
FIG. 42 is a plan view illustrating the shelf member including an opaque layer.

As described above, the plate 110a of the shelf member 110, i.e. the body of the shelf member 100 may be formed as a translucent member, and thus, may pass light emitted from the light source unit 140 or light reflected by other portions of the refrigerator. Accordingly, the intended space may not be appropriately illuminated due to the leakage of light through the plate 110a. For this reason, the shelf 100 may include a layer 114, which is formed on the shelf member 110, more particularly, the plate 110a to reflect light in order to prevent the leakage of light. FIG. 42 is a plan view illustrating the shelf member including the layer. In addition, for the convenience of description, FIG. 42 illustrates the light source unit 140 located below the shelf member 110.

The layer 114 may be opaque in order to prevent the passage of light introduced into the plate 110a. The opaque layer 114 may also reflect the light introduced into the plate 110a. The layer 114 may be disposed on the upper surface or the lower surface of the plate 110a. In addition, the layer 114 may be formed in various ways. For example, the layer 114 may be printed on the upper surface or the lower surface of the plate 110a using an opaque paint, or may be formed as an opaque film attached to the upper surface or the lower surface of the plate 110a. Because articles are generally placed on the central portion of the plate 110a, the leakage of light from the central portion may be prevented. Accordingly, the layer 142, as illustrated in FIG. 42, may be formed on the edge of the plate 110a. More specifically, the layer 114 may include front and rear layers 114a and 114d disposed respectively on the front portion and the rear portion of the plate 110a, and left and right layers 114b and 114c disposed respectively on the left and right portions of the plate 110a. The layers 114a, 114b, 114c and 114d may extend inward from the front and rear ends and the left and right ends of the plate 110a, which are exposed outward to pass light. Accordingly, the leakage of light from the edge portion of the plate 110a may be assuredly prevented. In particular, large amounts of light may leak from the front portion of the plate 110a because the light source unit 140 is located in the front portion of the plate 110a. Accordingly, the front layer 114a, as illustrated in FIG. 42, may extend from the front end of the plate 110a so as to cover the light source unit 140, which is located below the plate 110a. When the light source unit 140 is invisible to the user due to the presence of the front layer 114a, the leakage of light may be prevented and the external appearance of the shelf 100 may be improved. In the same manner, the left and right layers 114b and 114c may cover the left and right rails 113a and 113b and the brackets 121a and 121b so as to be invisible to the user.

Figure 43A:
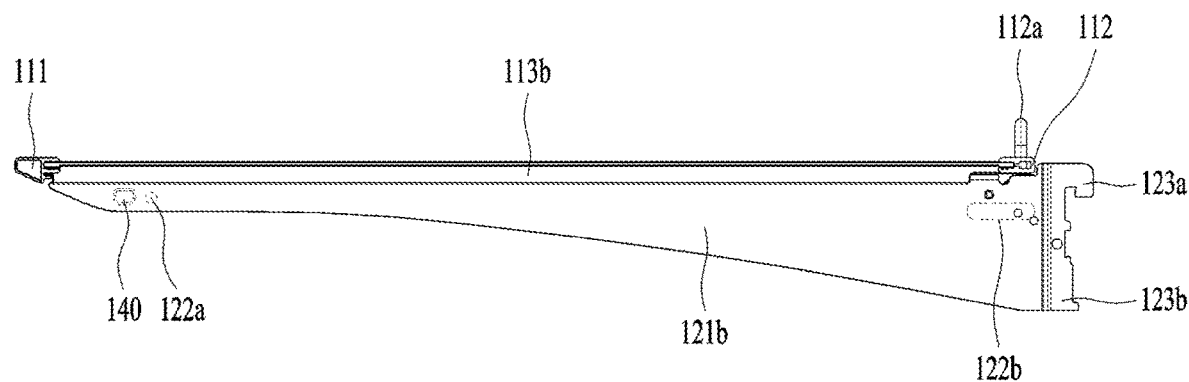
FIGS. 43A to 43C are side views illustrating various examples of the arrangement of the light source unit and a bar of the bracket.
Figure 43B:
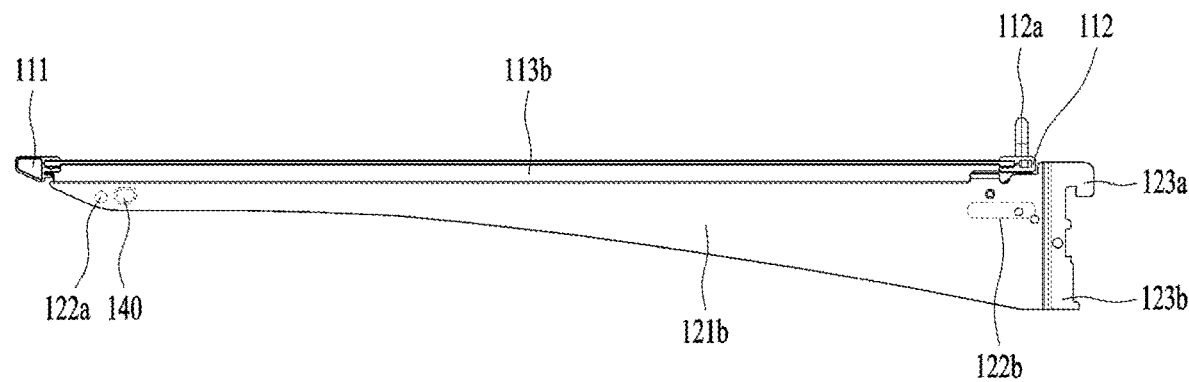
Figure 43C:
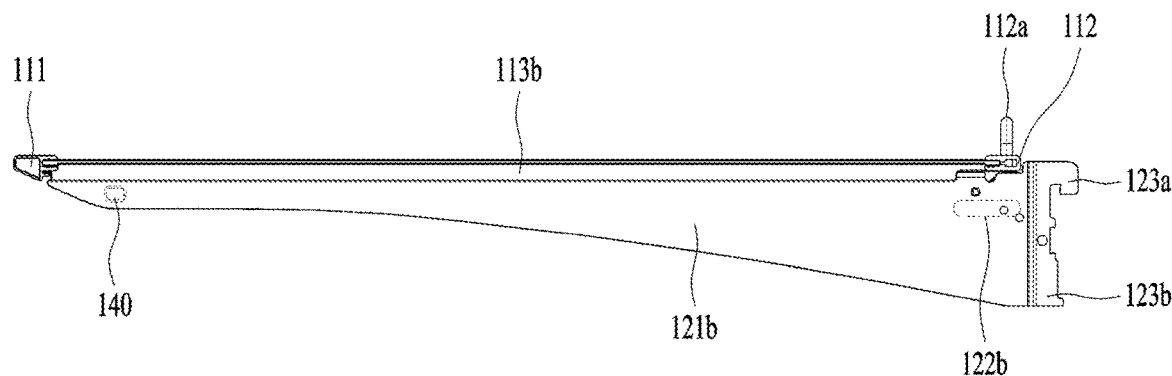

The light source unit 140, as described above, may be located in the front portion of the shelf 100 and may be oriented to emit light downward. For this intended downward illumination, the light source unit 140 may be advantageously located lower than the shelf member 110, which forms the top of the shelf. In addition, the brackets 121a and 121b are arranged below the shelf member 110 and have sufficient strength, thereby being used to support the light source unit 140, which is located below the shelf member 110. Accordingly, the light source unit 140 may be, for example, located below the shelf member 110 as illustrated in FIG. 16A, and may be installed between the front portions of the brackets 121a and 121b so as to be located in the front portion of the shelf 100. As described above, because the front bar 122a is located in the front portions of the brackets 121a and 121b like the light source unit 140, various relative positions of the light source unit 140 and the front bar 122a may be contemplated. In relation to this, FIGS. 43A to 43C are side views illustrating various arrangement examples of the light source unit and the bars of the brackets. First, as illustrated in FIG. 43A, the light source unit 140 may be located in front of the front bar 122a. Because the front bar 122a serves to increase the strength of the front portion of the shelf 100, the front bar 122a may be located at the rear of the light source unit 140 at a position close to the light source unit 140 so that both the front bar 122a and the light source unit 140 are located in the front portions of the brackets 121a and 121b. Alternatively, as illustrated in FIG. 43B, the light source unit 140 may be located at the rear of the front bar 122a. For the reason similar to that given in the above description of FIG. 43A, the light source unit 140 may serve to illuminate the front region of the storage compartment 2, and thus may be located at the rear of the front bar 122a at a position close to the front bar 122a so that both the front bar 122a and the light source unit 140 are located in the front portions of the brackets 121a and 121b. Alternatively, as illustrated in FIG. 43C, only the light source unit 140 may be located in the front portions of the brackets 121a and 121b. That is, the front bar 122a may not be provided in the front portions of the brackets 121a and 121b.

In the various configurations described above, first, in the example of FIG. 43C, the light source unit 140 may have sufficient strength to substitute for the front bar 122a. For example, the housing 141 of the light source unit 140 may be formed of a metal material and may have a sufficient thickness and size, and thus the light source unit 140 may provide the front portion of the shelf 100 with sufficient strength. Accordingly, the shelf 100 of FIG. 43C may have sufficient strength and a simplified structure. In the example of FIG. 43A, because the light source unit 140 is located in front of the front bar 122a, the light emitted from the light source unit 140 may be blocked by the front bar 122a, or may not be reflected. Accordingly, the light source unit 140 of FIG. 43A may effectively illuminate the intended front region of the storage compartment 2 without interference from the front bar 122a. In addition, the light source unit 140 may provide the front portion of the shelf 100 with strength to some extent, and therefore, the strength of the shelf 100 may be increased through the addition of the front bar 122a. Consequently, the shelf 100 of FIG. 43A may have high strength and may appropriately illuminate the intended front region of the storage compartment 2. All of the other drawings herein show the arrangement of the light source unit 140 and the front bar 122a illustrated in FIG. 43A.

Figure 44:
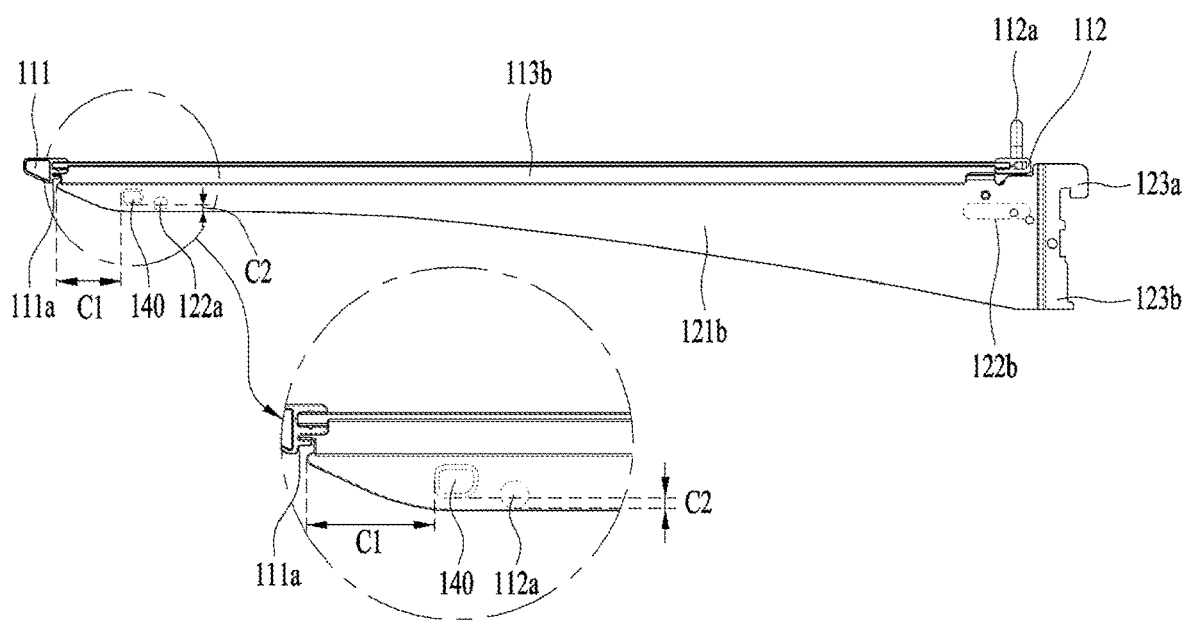
FIG. 44 is a side view illustrating the detailed configuration related to the arrangement of the light source unit and the bar.

In relation to the arrangement example of FIG. 43A, the light source unit 140 and the front bar 122a may have a more detailed configuration for user convenience. FIG. 44 is a side view illustrating the detailed configuration related to the arrangement of the light source unit and the bar. As described above, the shelf member 110 may be movable forward and rearward. For the forward and rearward movement of the shelf member 110, the user may pull or push the shelf member 110. The shelf member 110 may require a handle in order to smoothly perform the operation described above. For example, the front cover 111 may be used as a handle because the front portion of the shelf member 110, i.e. the front cover 111 is located close to the user. More specifically, as illustrated in FIG. 16C, the shelf 100 may include the shelf member 110, more particularly, a handle 111a provided on the bottom of the front cover 111. The handle 111a may have any of various structures to allow the user to grip the shelf member 110 without slippage. For example, the handle 111a may include a plurality of inclined step portions as illustrated in FIG. 16C. In addition, a space is required between the light source unit 140, which is located in the front portion of the shelf 100, and the handle 111a in order to allow the user's hand to grip the handle 111a. Accordingly, the light source unit 140 may be spaced apart from the front cover 110 by a predetermined distance. More specifically, the front end of the light source unit 140 may be spaced apart from the front cover 110, more particularly, the rear end of the handle 111a by a predetermined distance C1. For example, the distance C1 may range from 3 mm to 15 mm. The distance C1 may provide a sufficient space for the user's grip between the light source unit 140 and the handle 111a. In addition, because the light source unit 140 is located in the front portion of the shelf 100, the user may pull the light source unit 140, instead of the handle 111a, in order to move the shelf member 110. In this case, the light source unit 140 fixed to the brackets 121a and 121b may be damaged by such pulling by the user. Therefore, as already described above with reference of FIG. 43A, the front bar 122b may be located at the rear of the light source unit 140 at a position close to the light source unit 140. With this arrangement, no space, into which the user's hand may enter, is formed between the front bar 122b and the light source unit 140, which may prevent the light source unit 140, rather than the handle 111a, from being manipulated by the user. The front bar 122b may be located lower than the light source unit 140. When the front bar 122b is located lower than the light source unit 140, the user may grip the front bar 122b instead of the light source unit 140 even if the user grips a member other than the handle 111a by mistake in order to manipulate the shelf member 110. More specifically, the lower end of the front bar 122a may be lower than the lower end of the light source unit 140 by a predetermined distance C2. For example, the distance C2 may range from 1 mm to 7 mm. With the arrangement based on the distance C2, the user may grip the front bar 122a instead of the light source unit 140, which may prevent damage to the light source unit 140.

Figure 21:
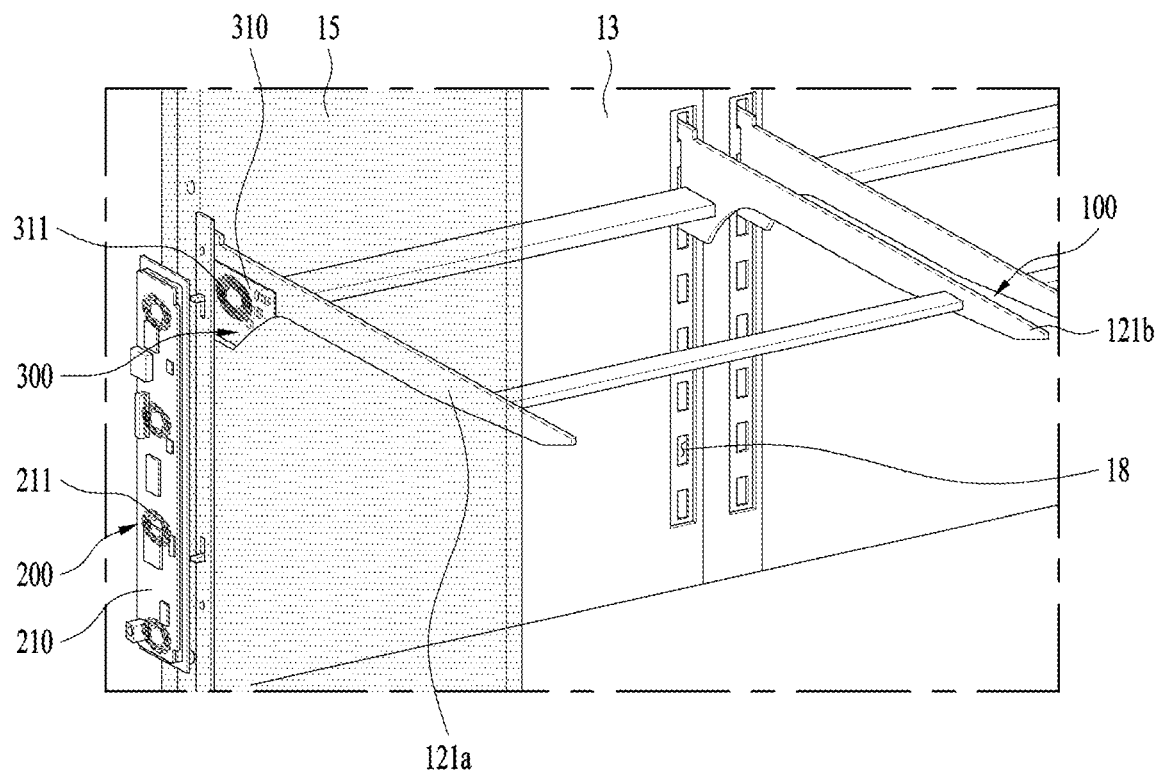
FIG. 21 is a partial perspective view illustrating the refrigerator and the shelf according to the present application.
Figure 22:
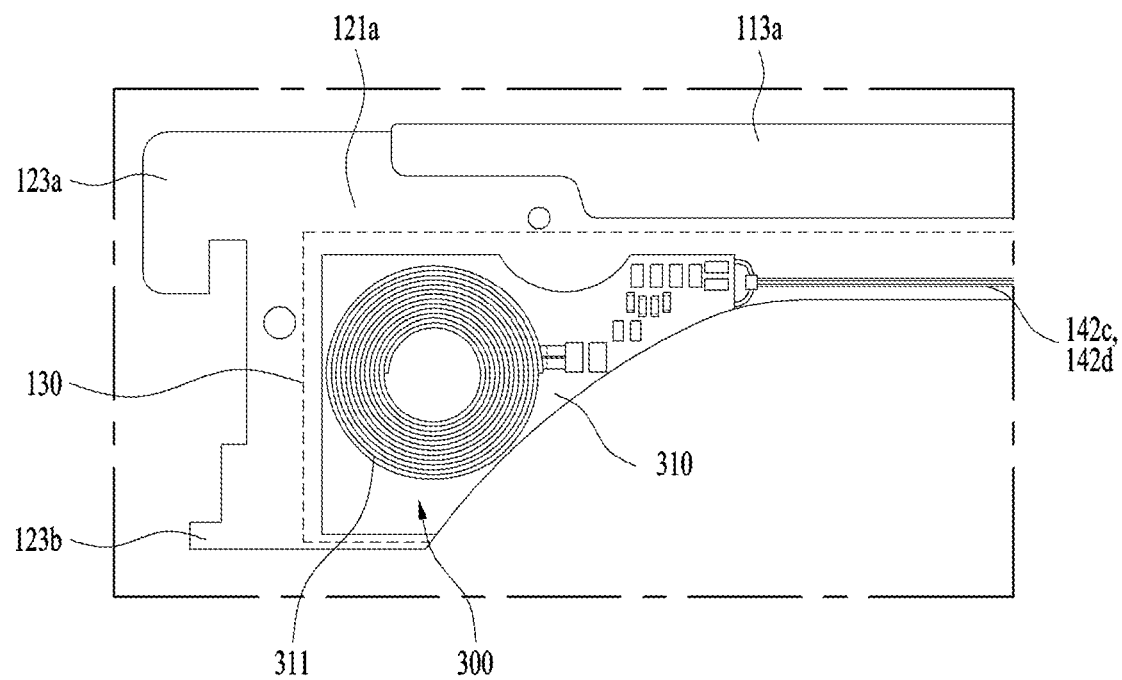
FIG. 22 is a partial plan view illustrating a bracket of the shelf and the receiver.
Figure 23A:
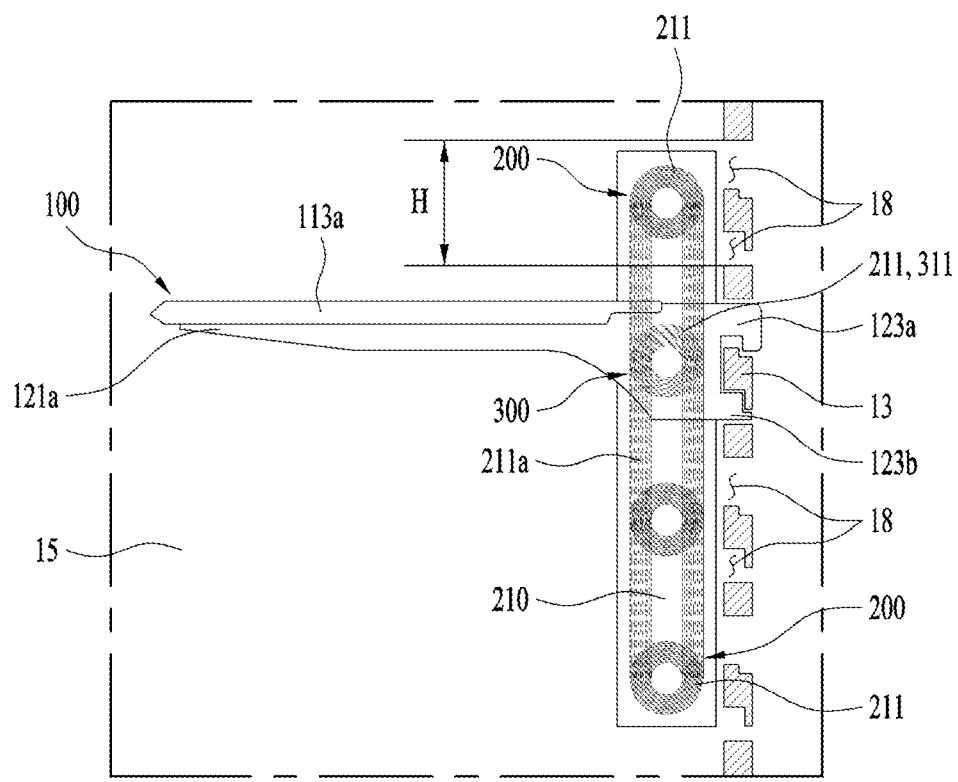
FIGS. 23A and 23B illustrate side views for explaining the alignment of a transmitter on a storage compartment sidewall and a receiver on the shelf.
Figure 23B:
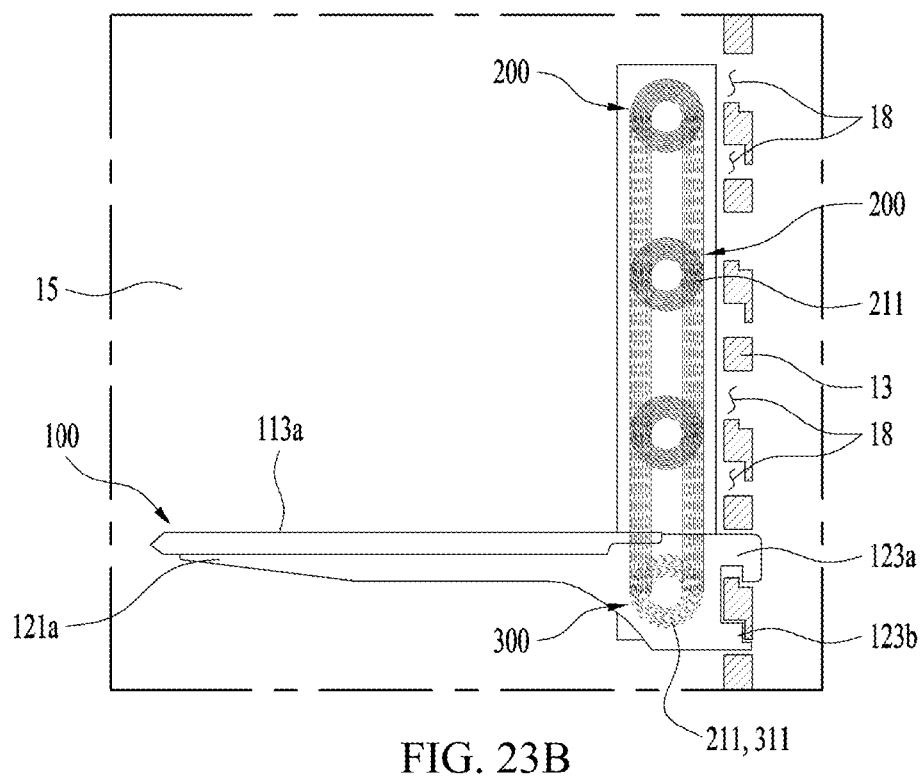
Figure 31:
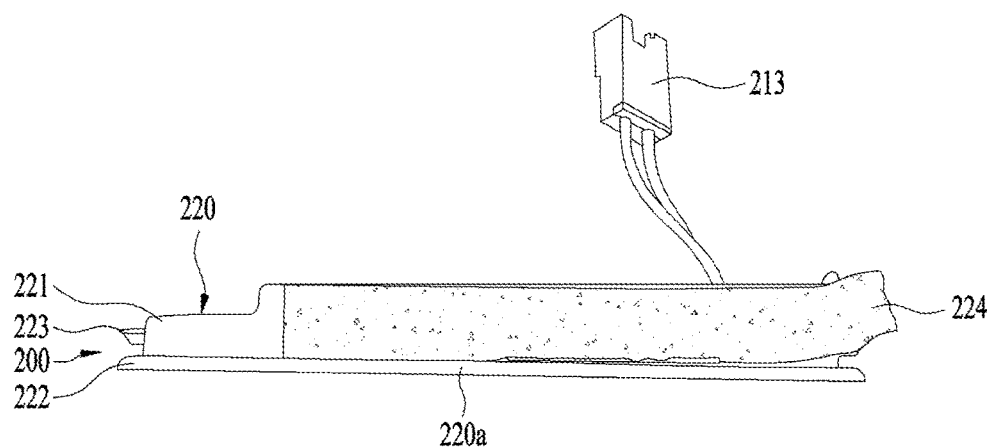
FIG. 31 is a side view illustrating the side portion of the transmitter.
Figure 32:
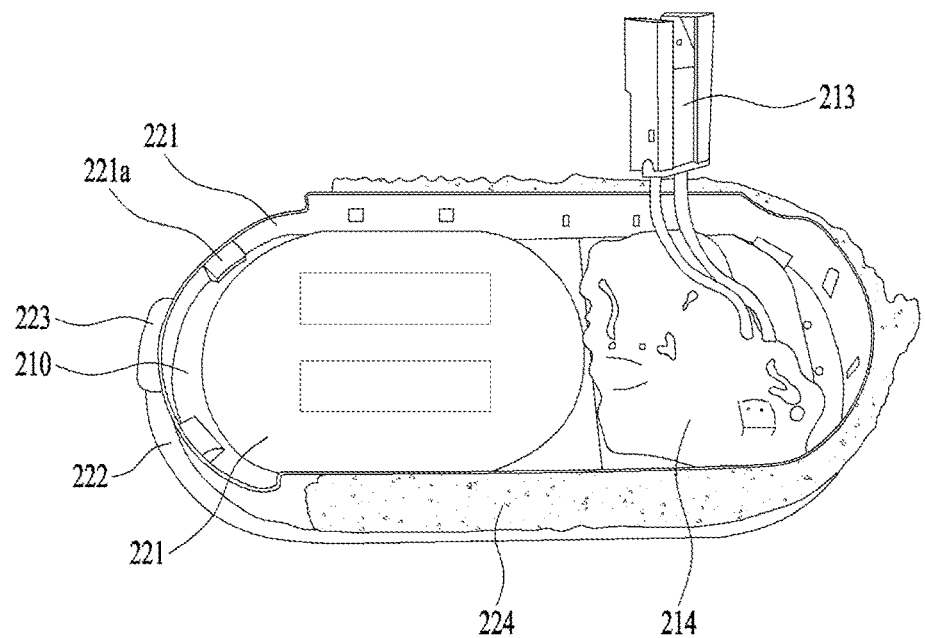
FIG. 32 is a rear view illustrating the rear surface of the transmitter.
Figure 33:
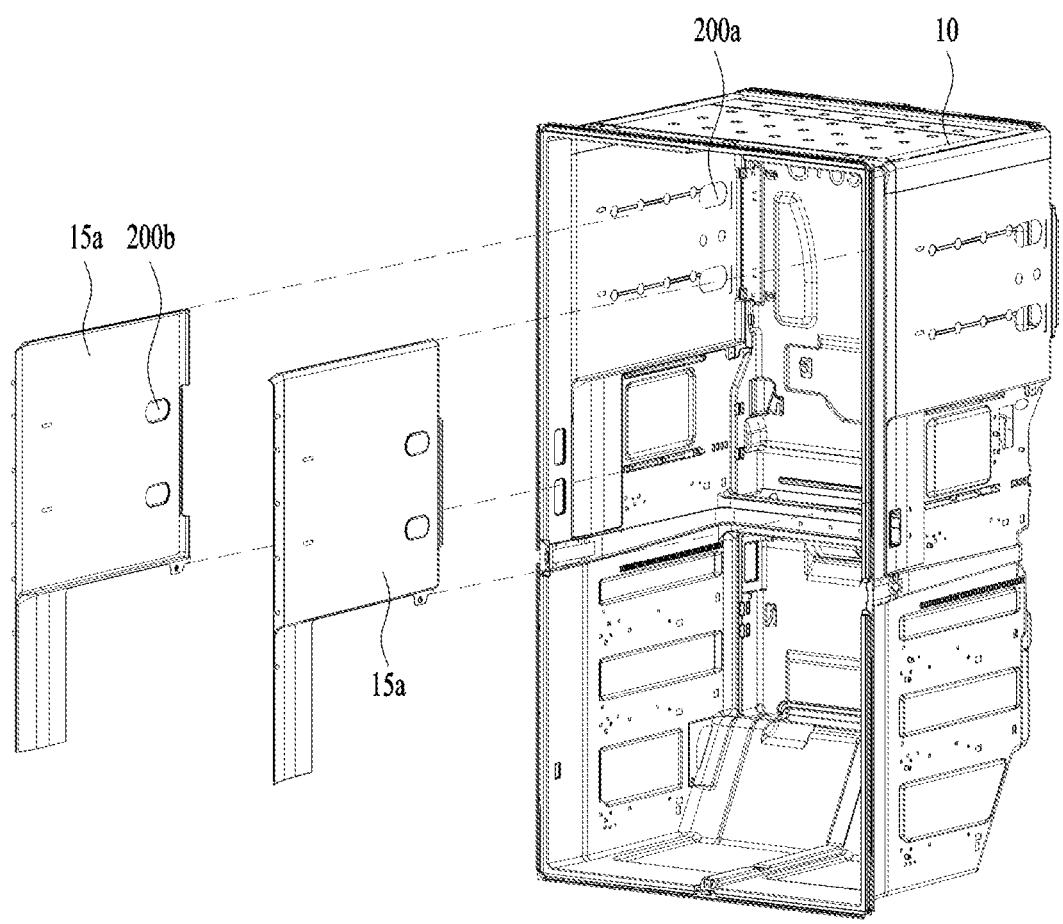
FIG. 33 is a partial perspective view of an inner case including the structure for the installation of the transmitter.
Figure 34A:
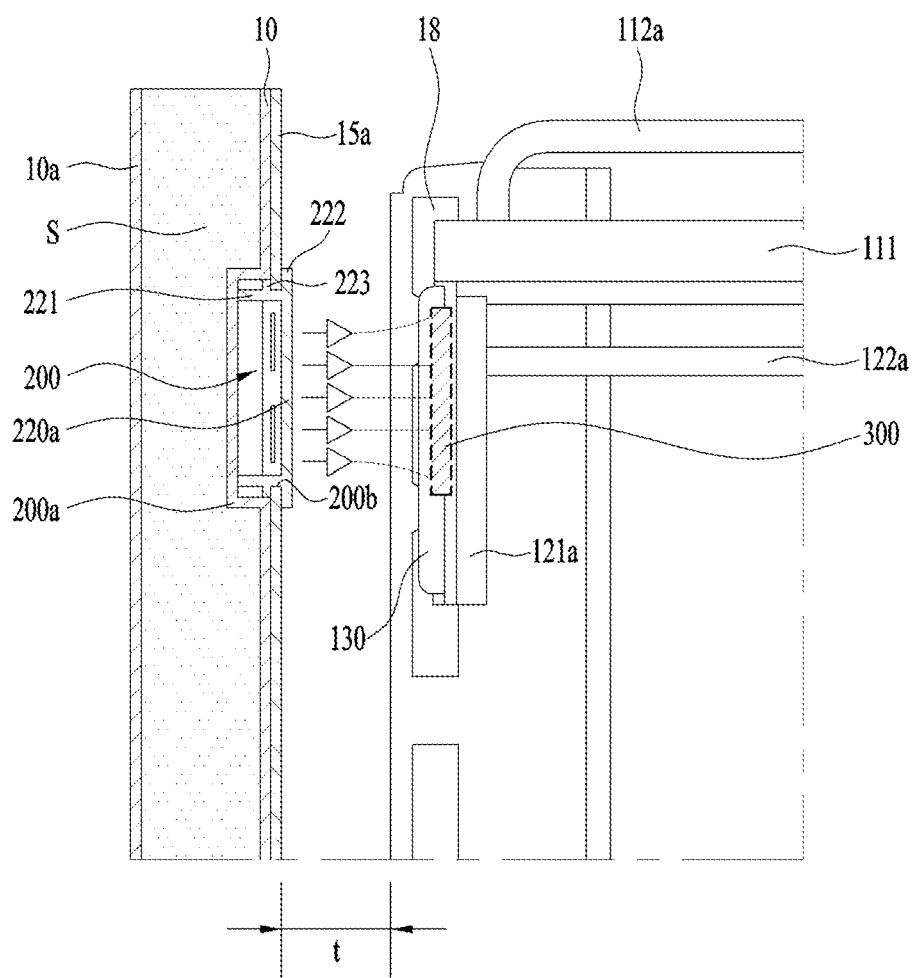
FIG. 34A is a partial sectional view illustrating one example of the transmitter and the receiver installed in the refrigerator.
Figure 34B:
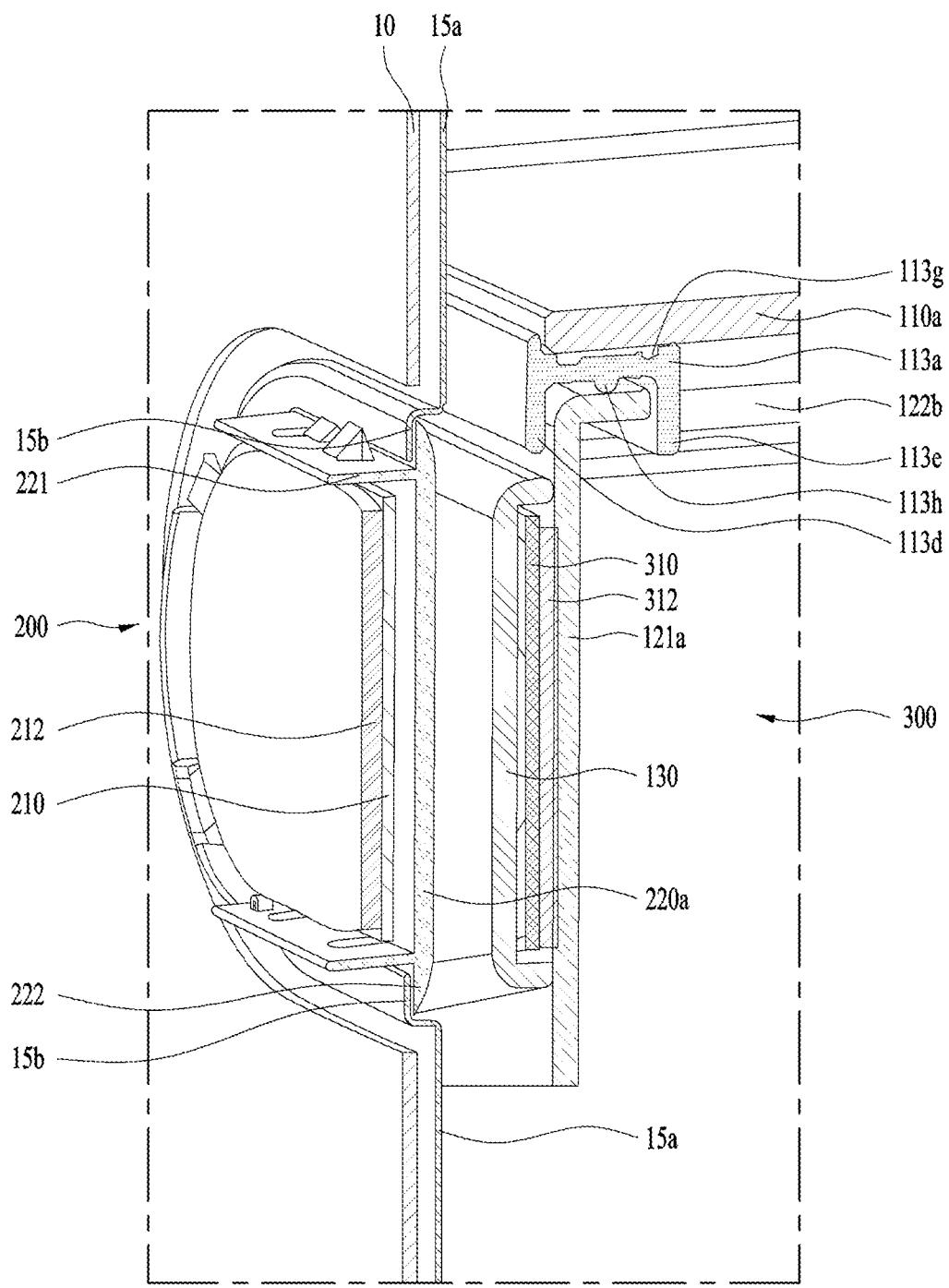
FIG. 34B is a partial sectional view illustrating another example of the transmitter and the receiver installed in the refrigerator.
Figure 35:
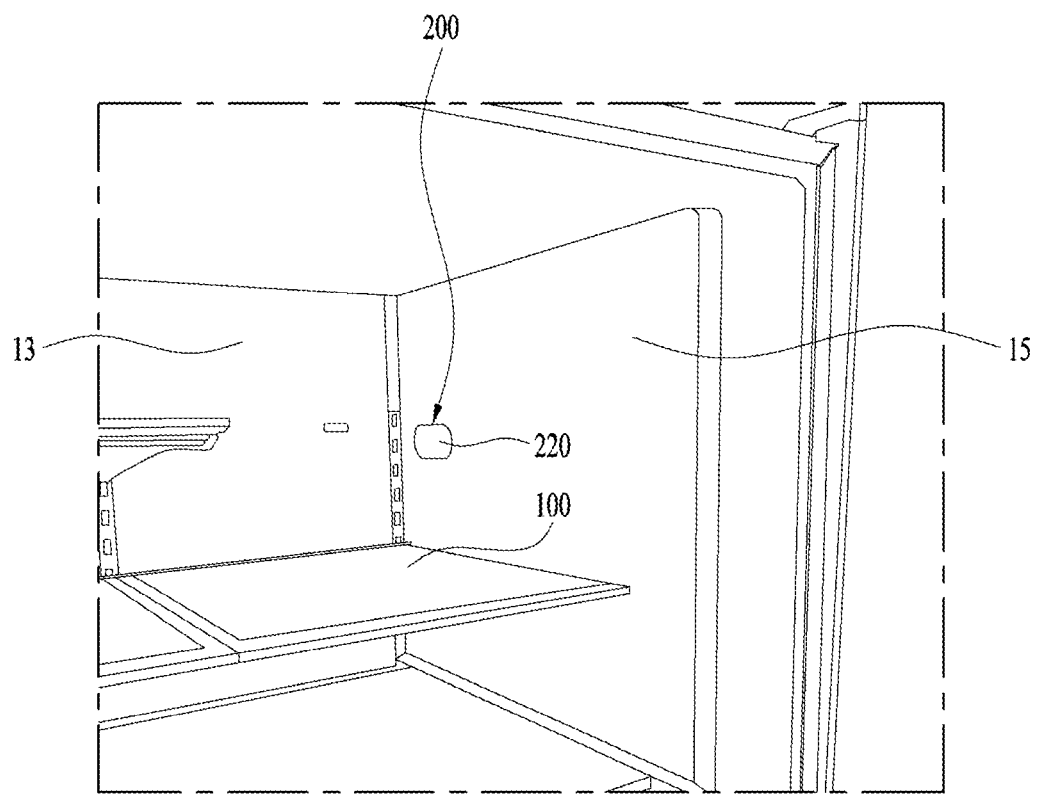
FIG. 35 is a partial perspective view illustrating the transmitter installed in the refrigerator.
Figure 36A:
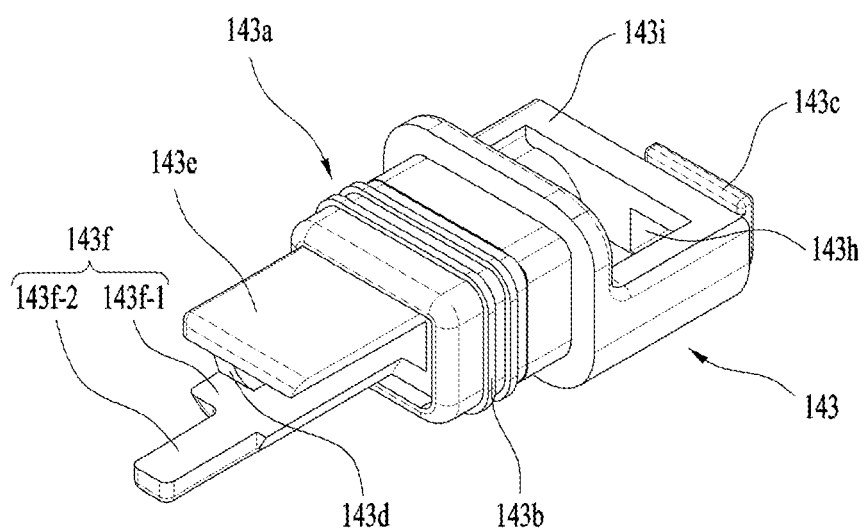
FIGS. 36A to 36E are perspective views illustrating right and left caps of the light source unit, and a plan view, a front view and a right side view illustrating the cap.
Figure 36B:
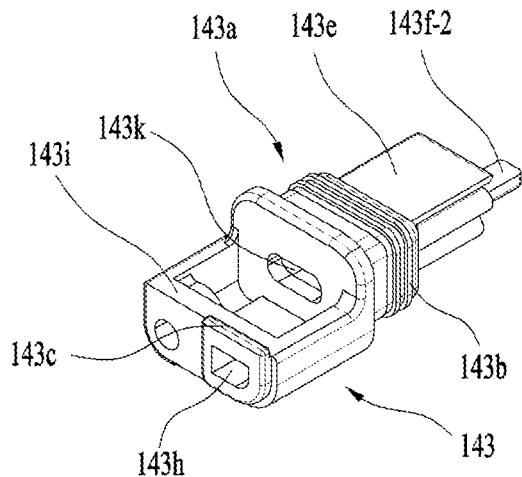
Figure 36C:
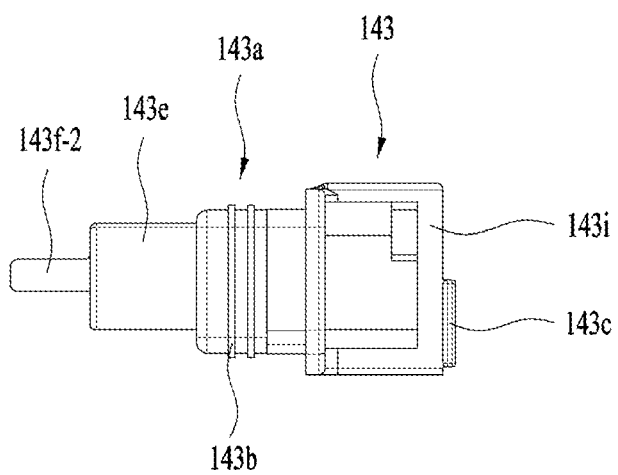
Figure 36D:
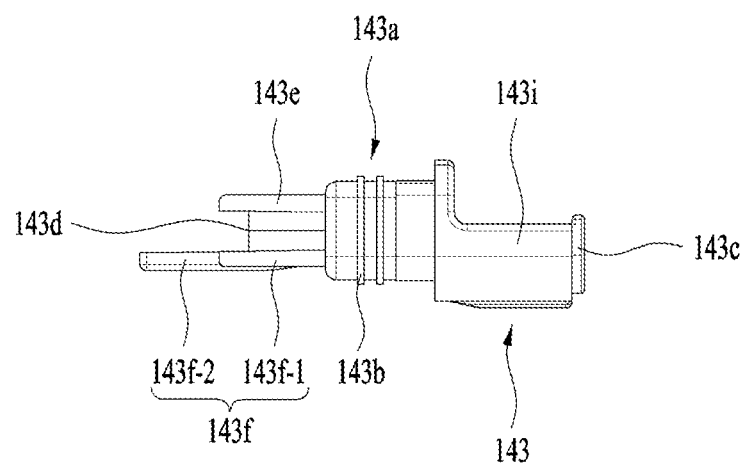
Figure 36E:
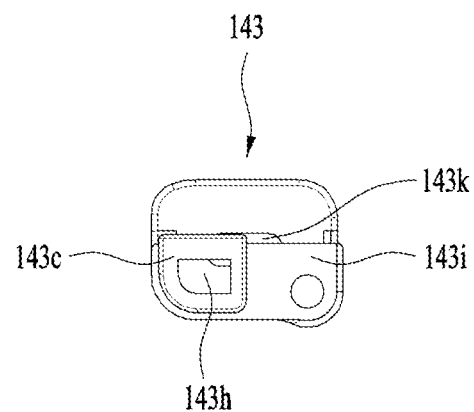

In the wake of the structure of the shelf 100 described above, the practical structures of the transmitter 200 and the receiver 300 as applied in practice to the refrigerator will be described below with reference to the related drawings. FIG. 21 is a partial perspective view illustrating the refrigerator and the shelf according to the present application, FIG. 22 is a partial plan view illustrating the bracket of the shelf and the receiver, and FIGS. 23A and 23B illustrate side views for explaining the alignment of the transmitter on the storage compartment sidewall and the receiver on the shelf. In particular, the transmitter 200 will be described below with reference to FIGS. 31 to 35. More specifically, FIG. 31 is a side view illustrating the side portion of the transmitter, and FIG. 32 is a rear view illustrating the rear surface of the transmitter. FIG. 33 is a partial perspective view of the inner case including the structure for installation of the transmitter. FIGS. 34A and 34B are sectional view illustrating various examples of the transmitter and the receiver installed in the refrigerator. FIG. 35 is a partial perspective view illustrating the transmitter installed in the refrigerator. In addition, FIGS. 16A to 20B illustrate the prerequisite structures of the shelf 100 in detail, and thus will be referenced in the following description.

The transmitter 200, as described above, may be disposed on the sidewall 15 so as to face the receiver 300 installed on the shelf 100. As illustrated in FIGS. 19, 21, 23, 31 and 32, the transmitter 200 may include a circuit board 210. In addition, the transmitter 200 may include a coil 211 formed on the board 210. The coil 211 may be provided on the surface of the transmitter 200, more particularly, the board 210 that faces the receiver 300. More specifically, the coil 211 may be formed on the surface that is closest to the receiver 300, among all of the surfaces of the transmitter 200, more particularly, the board 210. The coil 211 may generate electromagnetic waves for power transmission, and may correspond to the primary coil described with reference to FIG. 2.

Although the electromagnetic waves, generated in the transmitter 200, are transmitted to the receiver 300, some of the electromagnetic waves may leak in the opposite direction. Accordingly, the transmitter 200 may include a shield member 212 for preventing the leakage of electromagnetic waves. As clearly illustrated in FIG. 34B, the shield member 212 may be provided on the surface of the transmitter 200 that is opposite the surface of the transmitter 200 facing the receiver 300. That is, the transmitter 200 may include a first surface facing the receiver 300 and a second surface opposite the first surface, and the shield member 212 may be attached to the second surface. More specifically, the shield member 212 may be attached to, or may be located close to the surface that is opposite the surface provided with the coil 211. In addition, a shield coating may be applied for the same purpose, instead of the shield member 212. The shield member 212 may prevent the leakage of electromagnetic waves, and may also bypass or reorient leaking electromagnetic waves, i.e. electromagnetic waves that are directed to a wrong direction, toward the receiver 300. As such, most of the electromagnetic waves from the transmitter 200 may be transmitted to the receiver 300. In addition, the shield member 212 may serve to increase the inductance of the coil 211. Through the provision of the shield member 212, a greater amount of power may be effectively transmitted to the receiver 300. In addition, the transmitter 200 may include a terminal 213 connected to the board 210. The terminal 213 may be directly connected to an external power source in order to supply power to the receiver 300. In addition, because the storage compartment 2 is mainly used to store very humid and moist foods, water may splash on the transmitter 200 or beads of condensed water may be formed on the transmitter 200. Accordingly, a waterproof coating 214 may be applied to the transmitter 200. That is, the transmitter 200 may include the waterproof coating 214, which serves as a sealing member configured to prevent moisture and other impurities from being introduced into the transmitter 200. As illustrated in FIG. 31, the waterproof coating 214 may be applied on the board 210, and may effectively prevent short-circuit or electric shock by preventing moisture or other impurities from reaching the board 210.

The receiver 300, as described above, may be located on the left portion or the right portion of the shelf 100, i.e. on the left bracket 121a or the right bracket 121b so as to face the transmitter 200 located on the sidewall 15. As illustrated in FIG. 18, in order to firmly support the shelf 100, each of the brackets 121a and 121b is shaped such that the rear portion thereof is larger than the front portion thereof. Accordingly, the receiver 300 may be located on the rear portion of the bracket 121a or 121b, which is relatively wide, and thus has sufficient strength. That is, the receiver 300 may be located in the rear portion within a distance L1 from the rear end of the bracket 121a or 121b. The distance L may be set to, for example, one quarter of the entire length L of the bracket 121a or 121b. Accordingly, the receiver 300 may be located within a range of one quarter of the entire length L from the rear end to the front end of the bracket 121a or 121b.

As illustrated in FIGS. 18 to 23B, the receiver 300 may include a circuit board 300. In addition, the receiver 300 may include a coil 311 formed on the board 310. The coil 311 may be provided on the surface of the receiver 300, more particularly, the board 310 that faces the transmitter 200. More specifically, the coil 311 may be formed on the surface that is closest to the transmitter 200, among all of the surfaces of the receiver 300, more particularly, the board 310. The coil 311 may correspond to the secondary coil described above with reference to FIG. 2. As described above, because the coil 211 of the transmitter 200 is provided on the surface of the transmitter 200 that faces the receiver 300, and the coil 311 of the receiver 300 is provided on the surface of the receiver 300 that faces the transmitter 200, the coils 211 and 311 may face each other, and may realize effective power transmission.

While most of the electromagnetic waves generated in the transmitter 200 may be transmitted to the receiver 300, some electromagnetic waves may pass through the receiver 300 and then be transmitted to a storage container inside the storage compartment 2. When the container is formed of a metal material or the like, which may cause electromagnetic induction, the container may be heated, thus causing an increase in the temperature of food stored therein. In this case, the food in the container may be heated to a high temperature, thus being easily decomposed or spoiled. To prevent this problem, the receiver 300 may include a shield member 312, thereby preventing electromagnetic waves transmitted from the transmitter 200 from heating a food container. As clearly illustrated in FIG. 34B, the shield member 312 may be provided on the surface of the receiver 300 that is opposite the surface of the receiver 300 that faces the transmitter 200. That is, the receiver 300 may include a first surface facing the transmitter 200 and a second surface opposite the first surface, and the shield member 312 may be attached to the second surface. More specifically, the shield member 312 may be attached to, or may be located close to the surface that is opposite the surface provided with the coil 311. In addition, a shield coating may be applied for the same purpose, instead of the shield member 312. For example, the shield member 312 may be attached to the surface of the board 310 that is opposite the surface provided with the coil 311, and may be attached to the bracket 120 adjacent thereto. The shield member 312 may prevent the induction heating of the container as well as the leakage of electromagnetic waves, thereby increasing power reception efficiency. In addition, the shield member 312 may increase the inductance of the coil 311, thus further increasing power reception efficiency. In addition, as clearly illustrated in FIGS. 19, 20 and 22, the receiver 300 may be connected to the wires 142c and 142d of the light source unit 140. More specifically, the board 310 of the receiver 300 may be connected to the wires 142c and 142d, such that received power may be supplied to the module 142 through the wires 142c and 142d. In addition, like the transmitter 200, a waterproof coating may be applied to the receiver 300 so as to effectively prevent short-circuit or electric shock. That is, the receiver 300 may include the waterproof coating, which serves as a sealing member configured to prevent moisture and other impurities from being introduced into the receiver 300. The waterproof coating may be applied on the board 310, and may effectively prevent short-circuit or electric shock by preventing moisture or other impurities from reaching the board 310.

The coil 211 of the transmitter 200, as illustrated in FIGS. 21 to 23B, may be circularly wound so that the radius thereof about the center axis, which is perpendicular to the sidewall 15, is gradually increased. That is, the coil 211 may be spirally wound. Accordingly, the coil 211 may be placed in the same plane. In the receiver 300, in the same manner, the coil 311 may be spirally wound and may be placed in the same plane. Accordingly, through the configuration of the coils 211 and 311, the thickness of the transmitter 200 and the receiver 300 is not greatly increased, and thus the transmitter 200 and the receiver 300 do not occupy much space in the refrigerator. In addition, although the coils 211 and 311 have a circular shape in FIGS. 21 to 23B, they may have an elliptical shape as illustrated in FIG. 19.

Figure 52:
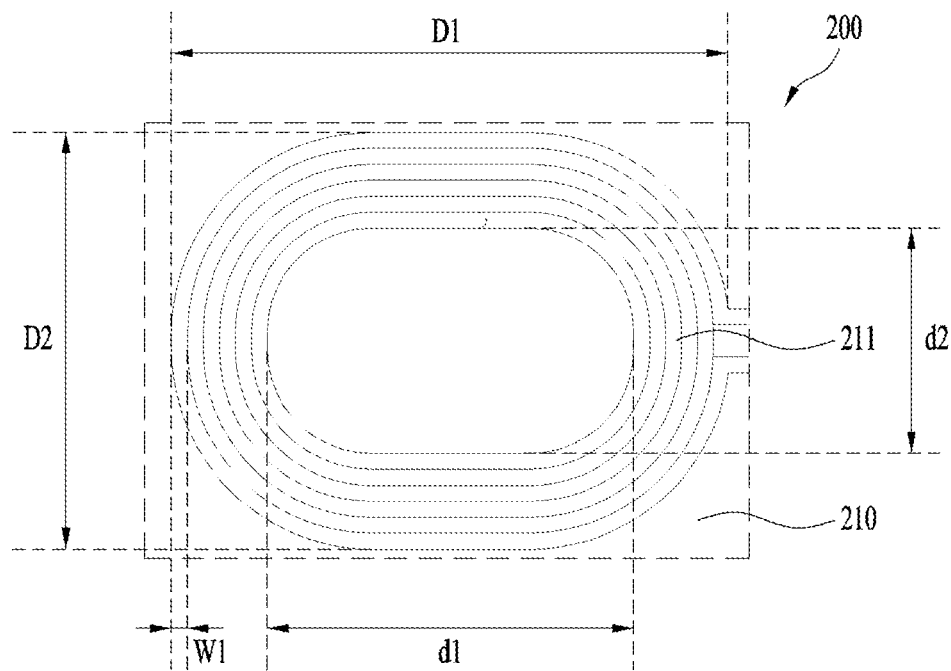
FIG. 52 is a plan view illustrating the detailed configuration of a board and a coil of the transmitter.
Figure 53:
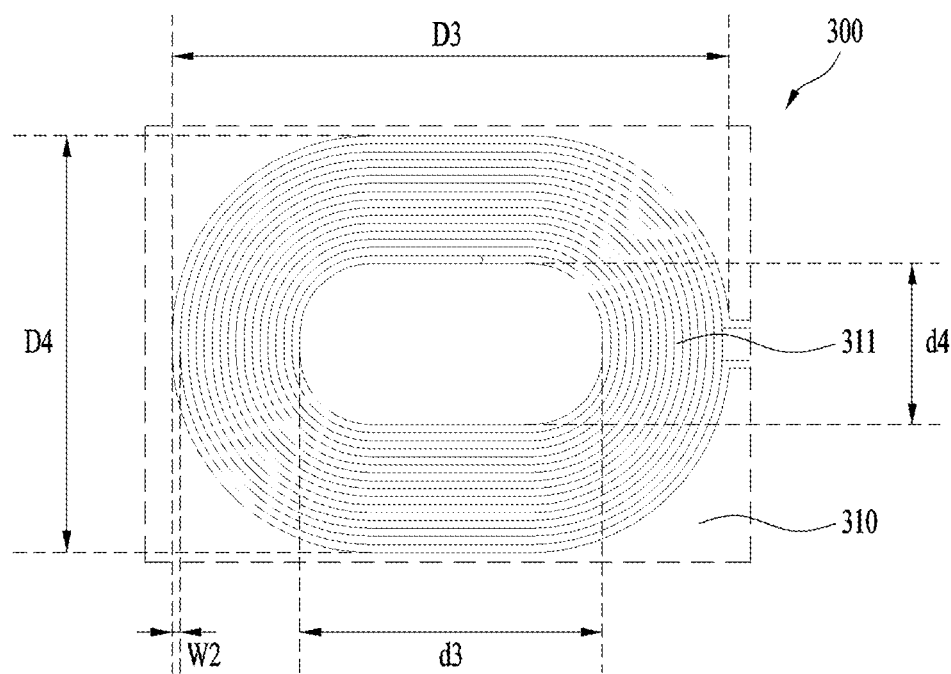
FIG. 53 is a plan view illustrating the detailed configuration of a board and a coil of the receiver.

The elliptical coils 211 and 311 may have a detailed configuration for efficient power transmission. FIG. 52 is a plan view illustrating the detailed configuration of the board and the coil of the transmitter, and FIG. 53 is a plan view illustrating the detailed configuration of the board and the coil of the receiver. The coils 211 and 311 and other elements of the transmitter 200 and the receiver 300 related thereto will be described below in more detail with reference to FIGS. 52 and 53 and other related drawings.

The elliptical coils 211 and 311 have certain short-axis outer diameters (e.g. minimum outer diameters D2 and D4). Accordingly, depending on the orientation thereof, the elliptical coils 211 and 311 may have smaller horizontal or vertical widths than circular coils, which have certain diameters (e.g. maximum outer diameters D1 and D3). That is, when compared with the circular coils, the elliptical coils 211 and 311 may have a compact profile. For this reason, the elliptical coils 211 and 311 may be suitable for placement in the limited space inside the refrigerator while performing effective power transmission. In addition, in order to continuously face the receiver 300 so as to stably transmit power even when the position of the receiver 300 is changed, the transmitter 200 may be larger than the receiver 300. That is, the coil 211 of the transmitter 200 may be larger than the coil 311 of the receiver 300. However, because the shelf 100 is continuously fixed at the same position in the refrigerator, the transmitter 200 and the receiver 300 may be continuously maintained at predetermined positions. Therefore, it may be unnecessary for the transmitter 200 to be larger than the receiver 300. For this reason, the transmitter 200 and the receiver 300 may be substantially the same size. That is, the outer profiles of the coil 211 of the transmitter 200 and the coil 311 of the receiver 300 may be the same size. More specifically, as illustrated in FIG. 19, the outer diameters D1 and D2 of the coil 211 may be the same as the outer diameters D3 and D4 of the coil 311. That is, the maximum outer diameter D1 of the coil 211 may be the same as the maximum outer diameter D3 of the coil 311, and the minimum outer diameter D2 of the coil 211 may be the same as the minimum outer diameter D4 of the coil 311.

Under the configuration described above, the coils 211 and 311 may have the following practical specification. First, in the coil 211 of the transmitter 200, the maximum outer diameter D1 may be 44 mm and the minimum outer diameter D2 may be 33 mm. In addition, the maximum inner-diameter d1 may be 30 mm and the minimum inner-diameter d2 may be 19 mm. The width W1 of patterns of the coil 211 may be 1.0 mm, and the distance between the patterns may be 0.2 mm. The thickness of the coil 211 may be 70 μm. In addition, the coil 211 may include two layers stacked one above another, and the number of turns of the patterns in each layer may be 5.5. Accordingly, the number of turns of all of the patterns may be 11.

In the coil 311 of the receiver 300, the maximum outer diameter D3 may be 44 mm and the minimum outer diameter D4 may be 33 mm. Accordingly, the outer diameters D1 and D2 of the coil 211 are the same as the outer diameters D3 and D4 of the coil 311. In addition, the maximum inner-diameter d3 may be 23 mm and the minimum inner-diameter d4 may be 12 mm. The width W2 of patterns of the coil 231 may be 0.6 mm, and the distance between the patterns may be 0.2 mm. The thickness of the coil 211 may be 70 μm. In addition, like the coil 211, the coil 311 may include two layers stacked one above another, and the number of turns of the patterns in each layer may be 13.5. Accordingly, the number of turns of all of the patterns may be 27. In addition, the inductance of the coil 311 may be 36.1±0.5 μH, and the DC resistance may be 2.8±0.2Ω. The inductance and the DC resistance are values that are acquired when the shield member 312 is installed.

The shield members 212 and 312 may be configured to have a larger outer profile than the outer profile of the coils 211 and 311 in order to block electromagnetic waves and magnetic flux leaking from the coils 211 and 311. The shield members 212 and 312 may have an elliptical shape having the maximum and minimum diameters illustrated in other drawings, for example, in FIGS. 17 and 19. Accordingly, the maximum diameter of the shield members 212 and 312 may be greater than the maximum diameters D1 and D3 of the coils 211 and 311. In addition, the minimum diameter of the shield members 212 and 312 may be greater than the minimum diameters D2 and D4 of the coils 211 and 311. For example, the maximum diameter of the shield members 212 and 312 may be set to 46 mm, and the minimum diameter may be set to 35 mm. The shield members 212 and 312 may be attached to the boards 210 and 310 using an adhesive, for example, a double-sided tape. In addition, for effective shielding, the shield members 212 and 312 may be formed of a ferromagnetic material. For example, the shield members 212 and 312 may be manufactured using a ferromagnetic material, the permeability μ of which is above 3000. More specifically, the shield members 212 and 312 may be formed of, for example, ferrite or an amorphous material selected from among ferromagnetic materials. When ferrite is used, Mn—Zn-based or Ni—Zn-based ferrite may be used. Mn—Zn-based ferrite is suitable for low loss, and Ni—Zn-based ferrite is suitable for high frequencies.

As illustrated in FIGS. 21, 23A, and 23B, the transmitter 200 may be mounted in the sidewall 15. Accordingly, the transmitter 200 may be stably installed in the sidewall 15, but may have difficulty in being separated from the sidewall 15 for repair and maintenance. For this reason, the transmitter 200 may be configured as a module that is easily separable from the sidewall 15. The modular transmitter 200 is illustrated in FIGS. 31 and 32, and will be described below in detail with reference to these drawings.

First, the transmitter 200, as described above, may include the board 210, on which the coil 211, the shield member 212, and the terminal 213 are installed. In addition, the transmitter 200 may include a cover 220 for covering the board 210. The cover 220 may be configured to accommodate the board 210 and the elements installed on the board. More specifically, the cover 220, as illustrated in FIGS. 34A and 34B, may include a body 220a, and the body 220a may take the form of a plate having a predetermined size to appropriately support the flat board 210. The cover 220 may include a wall 221, which protrudes from the body 220a and extends along the edge of the body. The cover 220 having the wall 221 and the body 220a may substantially define a container having a predetermined size. Accordingly, the board 210 and other elements may be accommodated in the defined inner space. In addition, the board 210 may be stably supported by the wall 221 and the body 220a. The wall 221 may further include a rib 211a for fixing the board 210. The cover 220 may further include a flange 222 extending from the body 220a. In addition, the cover 220 may include a rib 223, which extends from the wall 221 in the same direction as the flange 222. The transmitter 200 may attain a modular structure through the coupling of the cover 220 and the board 210.

Referring to FIG. 33, the inner case 10 may be provided with a hole or recess 200a in order to accommodate the modular transmitter 200. As illustrated in FIG. 34A, the gap between the inner case 10 and the outer case 10a is filled with a thermal insulation material S. Static electricity may be generated when the thermal insulation material S is introduced between the cases 10 and 10a. The static electricity may cause damage to the circuit of the transmitter 200 when the transmitter 200 is installed before the thermal insulation material S is disposed. For this reason, the transmitter 200 is installed after the gap between the cases 10 and 10a is filled with the thermal insulation material S. The recess 200a having a closed bottom portion is formed at a seat for the installation of the transmitter 200 in order to prevent the thermal insulation material S from being introduced into the storage compartment 2. In addition, in order to increase the strength of the inner case 10, a reinforcement plate 15a may be installed on the inner surface of the inner case 10. The reinforcement plate 15a may have a through-hole 200b for installation of the transmitter 200, and the through-hole 200b may communicate with the recess 200a. Accordingly, as illustrated in FIG. 34A, when the transmitter module 200 is inserted into the recess 200a, the flange 222 may be caught by the outer surface of the reinforcement plate 15a, and the rib 223 may be caught by the inner surface of the reinforcement plate 15a. Most of the transmitter module 200 is located in the recess 200a, and only the cover 210 is outwardly exposed so as to prevention deterioration in the external appearance as illustrated in FIG. 35. With this coupling mechanism, the transmitter module 200 may be stably attached to the sidewall 15, and may also be easily separated from the sidewall 15 for the repair and maintenance thereof. The flange 222 is formed so as to be larger than the through-hole 200b, in order to prevent foreign impurities from being introduced into the recess 200a. A sealing member 224 may be additionally provided around the wall 221 so as to completely seal the recess 200a in order to prevent a failure of the transmitter 200. In addition, prior to charging the thermal insulation material S, a wire connected to an external power supply may be located between the cases 10 and 10a at a position close to the recess 200a, and thereafter may be fixed between the cases 10 and 10a by the charged thermal insulation material S. Accordingly, when the transmitter 200 is installed in the recess 200a, the terminal 213 of the transmitter 200 may be directly connected to the wire close to the recess 200a, which may result in easy connection between the transmitter 200 and the external power supply. A terminal configured to be directly connected to the terminal 213 may be installed on the end of the wire that is connected to the external power supply, which may ensure easier connection between the transmitter 200 and the external power supply. In addition, as illustrated in FIG. 34B, the reinforcement plate 15a may have a recess 15b formed around the through-hole 200b. The flange 222 may be inserted into the recess 15b so as not to protrude outward from the reinforcement plate 15a. More specifically, the outer surface of the flange 200 may be disposed in the same plane as the surface of the sidewall 15 of the refrigerator. As such, the transmitter 200 is substantially integrally formed with the refrigerator sidewall 15, which may improve the external appearance of the refrigerator.

For reasons similar to those given in the above description of the transmitter 200, the receiver 300 may be formed as a module that may be easily attached to or separated from the bracket 120. The modular receiver 300 is illustrated in FIGS. 17 to 20, and will be described below in detail with reference to these drawings. For reference, FIGS. 17 to 19 illustrate the receiver 300 installed on the left bracket 121a, and FIGS. 20A and 20B illustrate the receiver installed on the right bracket 121b.

First, the receiver 300, as described above, may include the board 310, on which the coil 311, the shield member 312, and the wires 142c and 142d are installed. The receiver 300 may further include a cover 130 for covering the substrate 130. The cover 130 may be attached to the bracket 120 using a fastening member, and thus the receiver 300 may be surrounded by the bracket 120 and the cover 130. Accordingly, the cover 130 may protect the receiver 300 from the external environment. Because the cover 130 is attached to the bracket 120 to form a portion of the shelf 100, the shelf 100 may be described as including the cover 130. The cover 130 may also be configured to accommodate the board 310 and the elements installed on the board. In addition, the cover 130 may be formed of a material that does not impede power transmission between the transmitter 200 and the receiver 300 and the generation of a resonance frequency for power transmission. For example, the cover 130 may be formed of a polymer material, such as plastic, and other non-conductive/non-metallic materials.

More specifically, as clearly illustrated in FIGS. 20A and 20B, the cover 130 may include a body 130a. The body 130a may be formed as a plate-shaped member, and a rib 130b may extend from the edge of the body 130a in a direction approximately perpendicular to the body. Accordingly, the cover 130 may define a space for accommodation of the elements of the receiver 300 by the body 130a and the rib 130b. The cover 130 may further include a wall 131 protruding from the body 130a. The wall 131 and the body 130a may define a seat 131a having a predetermined size in the cover 130. The board 310 and other elements may be accommodated in the seat 131a. The wires 142c and 142d need to extend to the light source unit 140 in order to supply a voltage. In order to completely protect the wires 142c and 142d, the cover 130 may extend a long length along the side surface of the bracket 120 as illustrated, and the wires 142c and 142d may also be arranged along the cover 130 as illustrated. The cover 130 may have the same outer shape as that of the side surface of the bracket 120, which may improve the external appearance of the shelf 100.

The cover 130 may further include a plurality of ribs 132 configured to catch the wires 142c and 142d. The wires may be stably attached to the cover 130 by the ribs 132. The cover 130 may further include a plurality of bosses 134 formed on the body 130a. As illustrated in FIG. 18, the brackets 121a and 121b may have a plurality of fastening holes 121e that correspond to the bosses 134. The cover 130 may further include a plurality of protrusions 135 formed on the body 130a. As illustrated in FIG. 18, the brackets 121a and 121b may have a plurality of holes 121f for the insertion of the protrusions 135. Each of the brackets 121a and 121b may have a rear portion larger than a front portion thereof in order to firmly support the shelf 100. That is, the front portions of the brackets 121a and 121b have a limited space. Accordingly, the bosses 134 and the fastening holes 121e, which are relatively large, may be arranged in the cover 130 and the rear portions and central portions of the brackets 121a and 121b, whereas the protrusions 135 and the holes 121f, which are relatively small, may be arranged in the cover 130 and the front portions of the brackets 121a and 121b. When the cover 130 is coupled to the bracket 121a or 121b, the protrusions 135 may first be inserted into the holes 121f so as to allow the cover 130 to be located at an accurate coupling position. Through the positioning of the protrusions 135 and the holes 121f, the bosses 134 and the fastening holes 121e may also be aligned with each other. When a fastening member is fastened through the boss 134 and the fastening hole 121e, which are aligned with each other, the cover 130 may be coupled to one of the brackets 121a and 121b.

With the coupling of the cover 130 and the board 310 described above, i.e. with the insertion of the board 310 into the seat 131a, the transmitter 200 and the cover 130 may construct a module, and may be easily installed or separated at the same time. In addition, the wires 142c and 142d may be arranged along the cover 130 and may be discharged out of the cover 130 through an aperture 133 formed in the end of the cover so as to be connected to the module 142 by way of the protrusion 143c. Accordingly, as illustrated in FIGS. 18, 20 and 30, the cover 130, the receiver 300, and the light source unit 140 may construct a single module or assembly. With regard to the entire shelf 100, the receiver 300 and a portion of the cover 130 accommodating the receiver may constitute a receiver unit R as illustrated in FIG. 20A. The wires 142c and 142d and a portion of the cover 130 accommodating the wires may constitute a wire unit W. The light source unit 140 may be considered as a load for receiving a voltage by the wire unit W. The assembly of the cover 130, the receiver 300, and the light source unit 140 may be easily installed to the shelf 100, more particularly, the shelf 100 at the same time, and may also be easily separated for the repair and maintenance thereof. The cover 130 may be implemented in any form other than the solid member described above. For example, the receiver 300 and the wires 142c and 142d may be arranged on the bracket 121a or 121b, and a material that does not prevent power transmission, as described above, may be applied over the bracket 121a or 121b, the receiver 300 and the wires 142c and 142d. That is, instead of the solid cover 130, paint or any other flexible member may be used to perform the same function as the cover 130. In the same manner, other examples of the cover may not prevent power transmission and the generation of a resonance frequency, may fix the receiver 300 and the wires 142c and 142d to the brackets 121a and 121b, and may protect the receiver 300 and the wires 142c and 142d from foreign substances.

As described above, the shelf 100 may be moved upward or downward so as to be located at any of different heights. In order to supply a voltage to the light source unit 140 on the shelf 100, the transmitter 200 and the receiver 300 need to face each other. Accordingly, after movement of the shelf 100, one of the transmitter 200 and the receiver 300 needs to be adjusted to ensure that the transmitter 200 and the receiver 300 face each other. However, because the receiver 300 is fixed to the shelf 100 and is moved along with the shelf 100, it is necessary to adjust the transmitter 200 so as to face the receiver 300. As such, the transmitter 200 may continuously face the receiver 300 even after the shelf 100 is moved upward or downward. For the face-to-face arrangement of the transmitter 200 and the receiver 300, various structures may be applied. For example, as illustrated in FIGS. 21, 23A, and 23B, a plurality of transmitters 200 may be arranged on the sidewall 15 at different heights. More specifically, the transmitters 200 may be arranged at respective heights at which the shelf 100 may be located. In addition, as described above, the shelf 100 may be fixed to the rear wall 13 using the first and second catch pieces 123a and 123b, which are caught by the seating holes 18, which are adjacent to one another. As illustrated in FIGS. 23A, 23B, and 34, the bracket 120 of the fixed shelf 100 may be located between the seating holes 18, and the receiver 300, located on the side surface of the bracket 120, may also be located between the seating holes 18. Accordingly, as illustrated in FIGS. 23A and 23B, the respective transmitters 200 may be arranged on the sidewall 15 at heights H between the adjacent seating holes 18. That is, the transmitter 200 may be installed to the sidewall 15 of the refrigerator so as to be located between the adjacent seating holes 18, i.e. within a distance H. For this reason, even when the shelf 100 is moved from any one height illustrated in FIG. 23A to another height illustrated in FIG. 23B, the receiver 300 and the transmitter 200 may face each other for stable power transmission. In addition, for higher power transmission efficiency, the coils 211 and 311 of the transmitter 200 and the receiver 300 may face each other as illustrated even after the height of the shelf 100 is changed. Moreover, the coils 211 and 311 may be arranged to have the same center axis for excellent power transmission even after the height of the shelf 100 is changed. In addition, when the structure of the catch pieces 123a and 123b and the seating holes 18 is changed so that it does not resemble that illustrated in FIGS. 23A and 23B, the transmitter 200 and the receiver 300, which are arranged respectively on the sidewall 15 and the bracket 120 so as to face each other, may no longer be located between the seating holes 18. For example, unlike the catch pieces 123a and 123b arranged respectively on the top and bottom of the rear end of the bracket 120 illustrated in FIGS. 23A and 23B, one of the catch pieces 123a and 123b may be located at the center of the rear end of the bracket 120, such that the distance H between the seating holes 18 may be reduced depending on the change in the position of the catch piece 123a or 123b. Accordingly, the transmitter 200, which faces the receiver 300, may no longer be located within the distance H. However, even in this case, the receiver 300 is still located on the side portion of the bracket 120. Accordingly, when the entire transmitter 200 or at least a portion of the transmitter 200 is located on the sidewall 15 so as to face the side portion of the bracket 120, and more particularly, is located between the upper and lower ends of the bracket 120, the transmitter 200 may face the receiver 300, which is located on the side portion of the bracket 120, regardless of variation in the configuration of the catch pieces 123a and 123b and the seating holes 18.

As illustrated in FIGS. 23A and 23B, in order to form the transmitters 200 having the configuration described above, a plurality of coils 211 may be arranged on a single board 210. Instead of the transmitter 200 of FIGS. 23A and 23B, as illustrated in FIGS. 31 to 35, a plurality of modular transmitters 200 may be provided. In addition, instead of the transmitters 200, a single transmitter 200 may be installed on the sidewall 15 so as to slide vertically. Accordingly, the transmitter 200 may adjust the height thereof so as to suit the variable height of the shelf 100 and the receiver 300. In addition, as illustrated in FIGS. 23A and 23B, a single coil 211a may be arranged on the single board 210 to extend a height over which the receiver 300 may be arranged. As such, even if the height of the receiver 300 is changed when the height of the shelf 100 is changed, the transmitter 200 may continuously face the receiver 300. The position of the receiver 300 is determined by the seating holes 18. Accordingly, the heights of the seating holes 18 may be adjusted to allow any one of the transmitters 200, the positions of which are predetermined, to face the receiver 300 even after the height of the shelf 100 is changed.

In power transmission using electromagnetic induction, power transmission efficiency may be reduced when the distance between the transmitter 200 and the receiver 300 is increased. Therefore, the transmitter 200 and the receiver 300 may be arranged so as to come into contact with each other. However, referring to FIGS. 34A and 34B, because the thermal insulation material S is introduced into the gap between the inner and outer cases 10 and 10a at a high pressure, a high pressure is applied to the cases 10 and 10a. As such, the inner case 10, i.e. the sidewall 15 may bulge, and may have different dimensions from designed values. When the transmitter 200 and the receiver 300 are designed to come into contact with each other, the transmitter 200 and the receiver 300 may be pressed and damaged due to dimensional variation during fabrication. In addition, as described above, the shelf 100 is moved vertically and horizontally. Thus, when the transmitter 200 and the receiver 300 are designed to come into contact with each other, the sidewall 15 or the shelf 100 may be damaged upon the attachment or detachment of the shelf 100. Accordingly, as illustrated in FIGS. 34A and 34B, the transmitter 200 and the receiver 300 may be spaced apart from each other by a given distance t. That is, the transmitter 200 and the receiver 300 may be configured so as not to come into contact with each other. The distance t is set to prevent a considerable reduction in power transmission efficiency, and may be set to approximately 9 mm. Meanwhile, conventional wired power transmission requires direct contact between the shelf 100 and the inner case 10, and therefore, causes the problems described above, such as dimensional variation and damage, as well as corrosion, short-circuit, and electric shock. Therefore, in consideration of these problems, it will be more apparent that the application of the transmitter 200 and the receiver 300 based on wireless power transmission is optimal for the supply of a voltage to the light source of the shelf 100.

Figure 45:
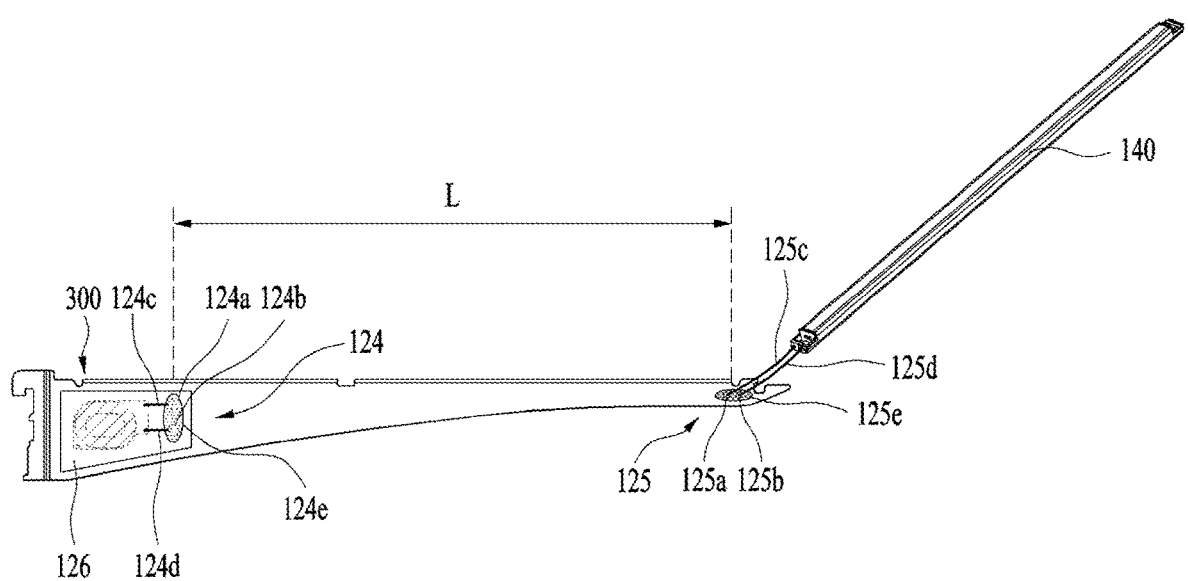
FIG. 45 is a perspective view illustrating an alternative example of the electrical connection of the receiver and the light source unit.

As illustrated in all of the drawings referenced above, the receiver 300 may be electrically connected to the light source unit 140 using the wires 142c and 142d, and may supply power transmitted from the transmitter 200 to the light source unit 140. Any other electrical connection, which is different from the electrical connection using the wires 142c and 142d, may be provided as an alternative example of the shelf 100. In relation with this, FIG. 45 is a perspective view illustrating an alternative example of the electrical connection of the receiver and the light source unit. The configuration of the shelf has been described above, and thus, only differences in configuration will be described below. For the same reason, the configuration described above with reference to the other drawings will be equally applied to any configuration not described above, and a detailed description thereof will be omitted.

The alternative example illustrated in FIG. 45 may use the bracket 121a for the electrical connection of the receiver 300 and the light source unit 140, rather than the wires 142c and 142d. As described above, the structures of the transmitter 200 and the receiver 300 and the configuration for power transmission from the transmitter 200 to the receiver 300 are the same as the above description. First, the shelf 100 may include a first connector 124 for electrically connecting the bracket 121a and the receiver 300 to each other. More specifically, the first connector 124 may be provided on the bracket 121a, and may include first and second contacts 124a and 124b, which are connected to the receiver 300. The first and second contacts 124a and 124b may be electrically connected to the receiver 300, more particularly, the board 310 by wires 124c and 124d. The shelf 100 may include a second connector 125 for electrically connecting the bracket 121a and the light source unit 140 to each other. More specifically, the second connector 125 may be provided on the bracket 121a and may include first and second contacts 125a and 125b, which are connected to the light source unit 140. The first and second contacts 125a and 125b may be electrically connected to the light source unit 140, more particularly, the module 142 by wires 125c and 125d. For the electrical connection between the first and second connectors 124 and 125, the body of the bracket 121a may be used. For this electrical connection, the bracket 121a may be formed of a highly conductive material, for example, steel. That is, as illustrated, a section L of the bracket 121a may electrically connect the first and second connectors 124 and 125 to each other. With this configuration, the receiver 300 may transmit received power to the light source unit 140 by way of the first connector 124, the bracket 121a, and the second connector 125 in sequence.

A seal 124e may be provided on the first and second contacts 124a and 124b of the first connector 124 so as to protect the same from moisture and other foreign substances. For the same reason, a seal 125e may be provided on the first and second contacts 125a and 125b of the second connector 125. The seals 124e and 125e may be formed by applying a sealing material on the first and second contacts 124a, 124b, 125a and 125b. In addition, an insulation material may be applied on the bracket 121a in order to prevent short-circuit or electric shock. In addition, in order to protect the receiver 300, a cover 126 may be attached to the bracket 121a. Because the bracket 121a is used for electrical connection, the cover 126 may be formed to cover only the receiver 300 and the first connector 124. That is, unlike the cover 130 configured to extend a long length in order to protect the wires 142c and 142d, the cover 126 may have a considerably reduced size. If necessary, an additional cover, which has the same function as the cover 126, may be applied to protect the second connector 125. Although the electrical connection structure applied to the left bracket 121a has been described above, this structure may be equally applied to the right bracket 121b. The electrical connection structure of FIG. 45 may simplify the structure of the shelf and may ensure effective power transmission to the light source unit 140.

Figure 46:
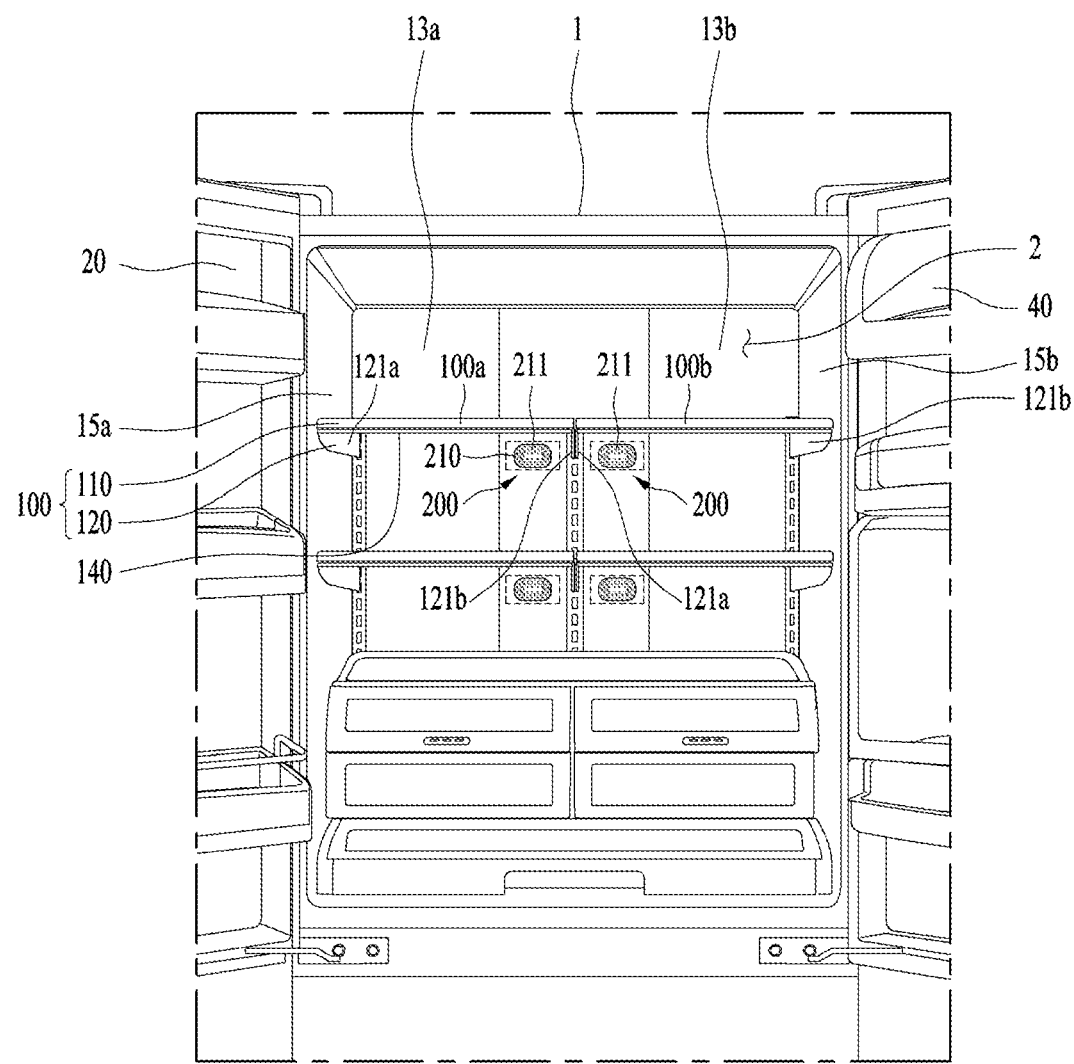
FIG. 46 is a front view illustrating the transmitter installed to a rear wall of the storage compartment.
Figure 47:
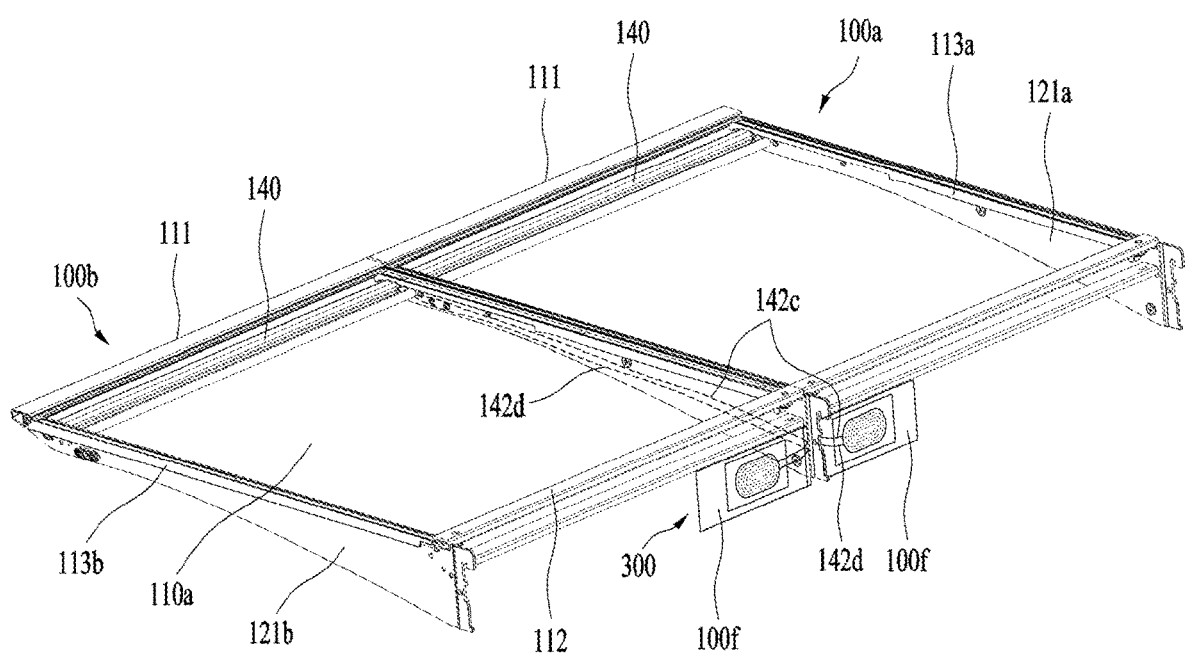
FIG. 47 is a perspective view illustrating the shelf having the receiver installed to a rear portion thereof.

As described above with reference to FIG. 14, the transmitter 200 may be located on the rear wall 13, rather than the sidewall 15, and thus, the receiver 300 may be located on the rear portion of the shelf 100 so as to face the transmitter 200. FIG. 46 is a front view illustrating the transmitter installed to the rear wall of the storage compartment, and FIG. 47 is a perspective view illustrating the shelf having the receiver installed to the rear portion thereof. To clearly show the transmitter 200, the structure for mounting the receiver 300 illustrated in FIG. 47 is omitted in the shelf 100 of FIG. 46. As in the example of FIG. 45, the configuration of the shelf has been described above, and thus only differences in configuration will be described below. For the same reason, the configuration described above with reference to the other drawings will be equally applied to any configuration not described above, and a detailed description thereof will be omitted.

Referring to FIG. 46, the refrigerator includes the left and right shelves 100a and 100b, and therefore, a pair of transmitters 200 may be installed respectively on the left and right rear walls 13a and 13b in order to supply power to the left and right shelves 100a and 100b. More specifically, the transmitters 200 may be arranged on the central portion of the rear wall. That is, one transmitter 200 may be located on the left rear wall 13a at a position close to the right bracket 121b of the left shelf 100a, and the other transmitter 200 may be located on the right rear wall 13b at a position close to the left bracket 121a of the right shelf 100b. Referring to FIG. 47, a pair of brackets 100f for supporting the receiver 300 may be additionally formed on the rear portions of the left and right shelves 100a and 100b. More specifically, one bracket 100f may extend a predetermined length from the rear portion of the right bracket 121b of the left shelf 100a in a direction parallel to the left rear wall 13a. The other bracket 100f may extend a predetermined length from the rear portion of the left bracket 121a of the right shelf 100b in a direction parallel to the right rear wall 13b. The brackets 100f may be provided with respective receivers 300. In addition, the wires 142c and 142d may connect the receivers 300 and the light source units 140 to each other in order to supply transmitted power. More specifically, the wires 142c and 142d may extend from the receivers 300 to the light source units 140 along the brackets 121a and 121b. In order to protect the receivers 300 and the wires 142c and 142d, the cover 130 described above may extend to cover the entire side surface of each bracket 121a or 121b and the bracket 100f. With this configuration, the transmitter 200 and the receiver may face each other to thus achieve effective power transmission. Unlike the illustration of FIG. 46, one transmitter 200 may be located on the left rear wall 13a at a position close to the left bracket 121a of the left shelf 100a, and the other transmitter 200 may be located on the right rear wall 13b at a position close to the right bracket 121b of the right shelf 100b. In this case, in the same manner, the receivers 300 and the brackets 100f described above may be provided respectively on the left bracket 121a of the left shelf 100a (see, for example, FIG. 16A) and the right bracket 121b of the right shelf 100b so as to face the transmitters 200.

Figure 48:
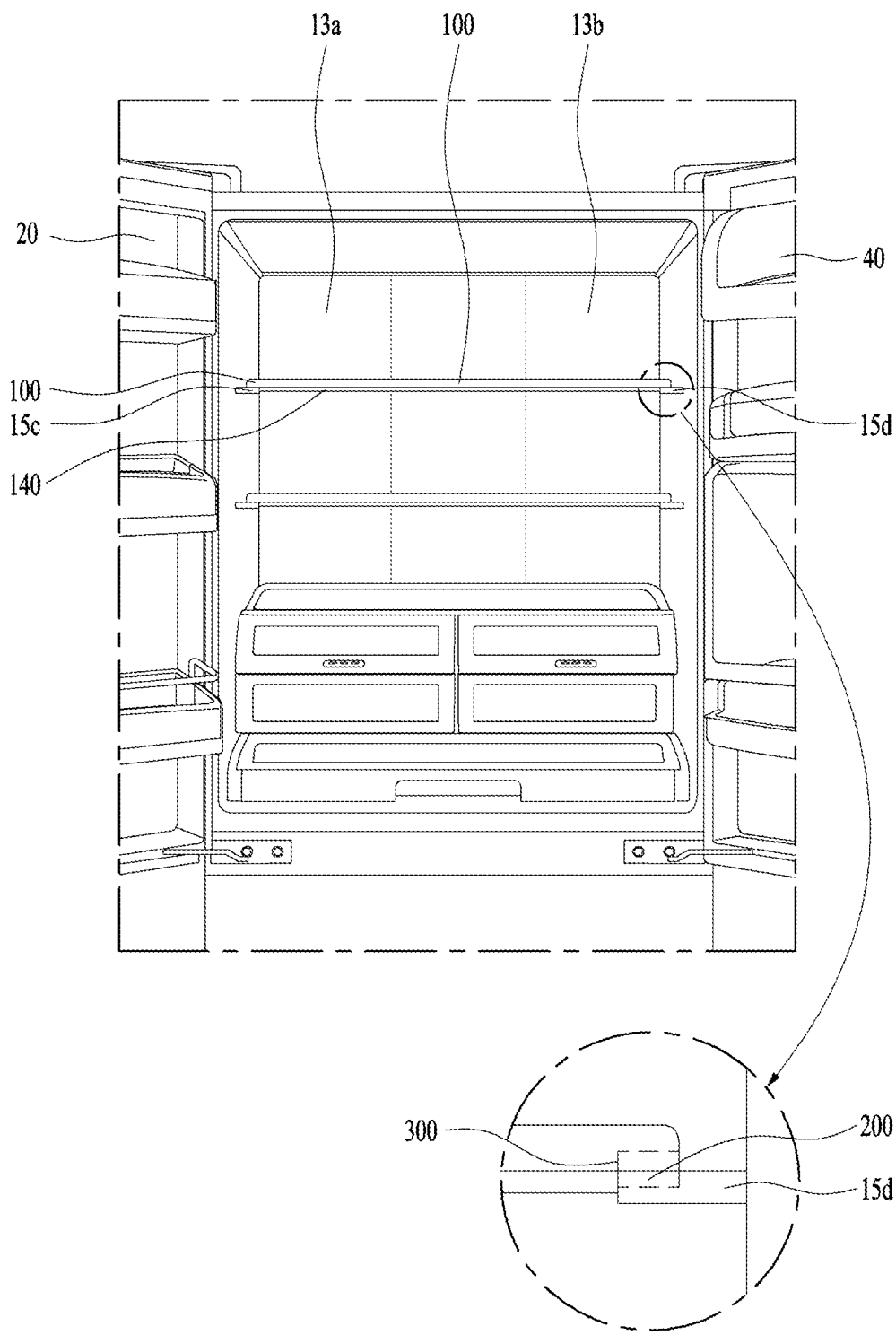
FIG. 48 is a front view illustrating the configuration of the transmitter and the receiver of the shelf, which is supported by a sidewall of the storage compartment.
Figure 49:
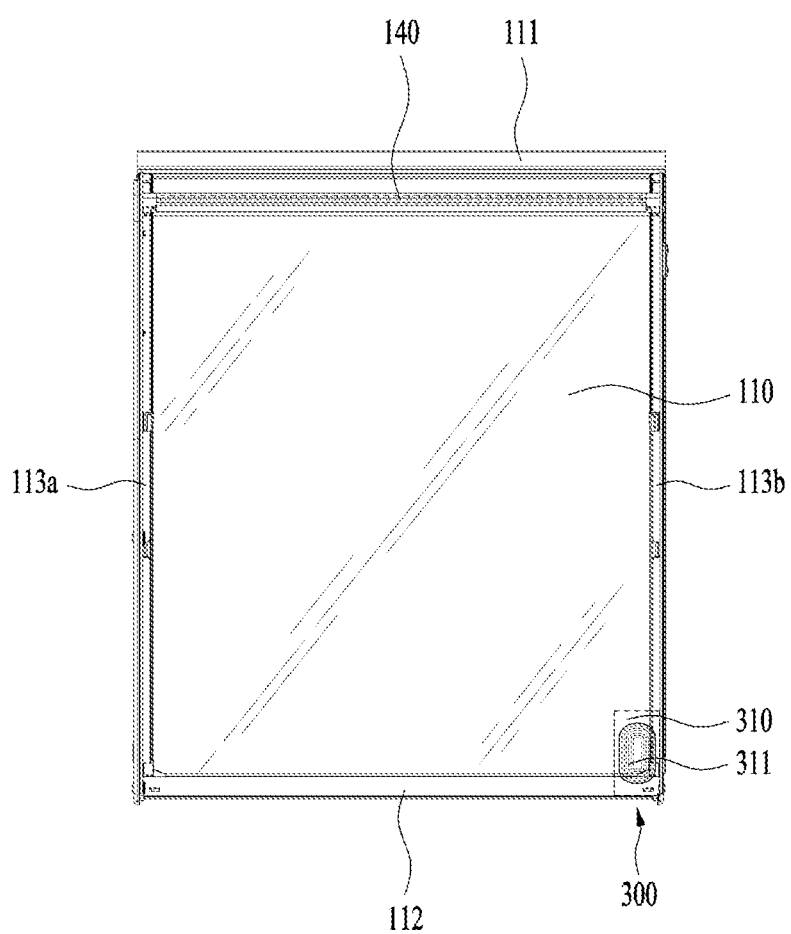
FIG. 49 is a rear view illustrating the shelf of FIG. 48.
Figure 50:
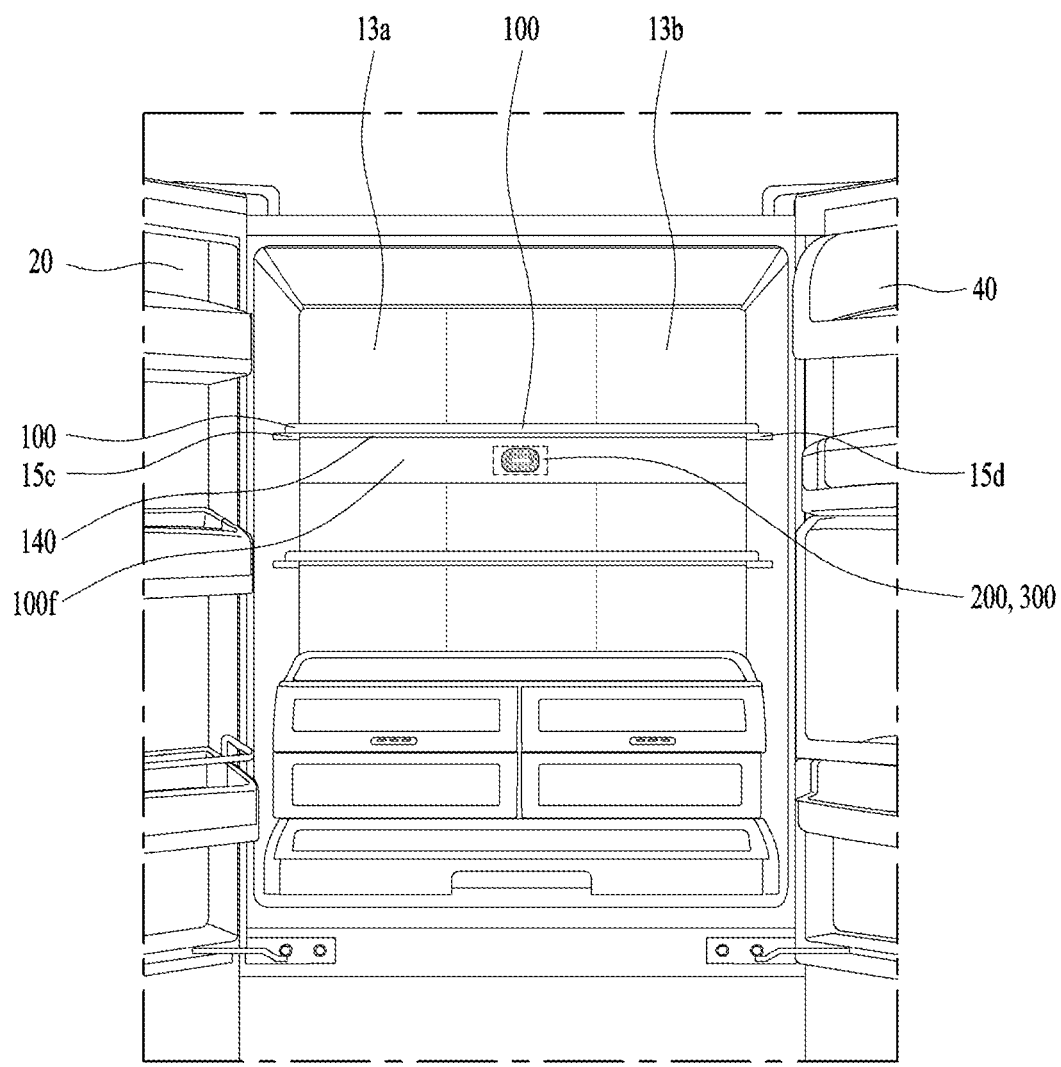
FIG. 50 is a front view illustrating another example of the configuration of the transmitter and the receiver of the shelf, which is supported by the sidewall of the storage compartment.
Figure 51:
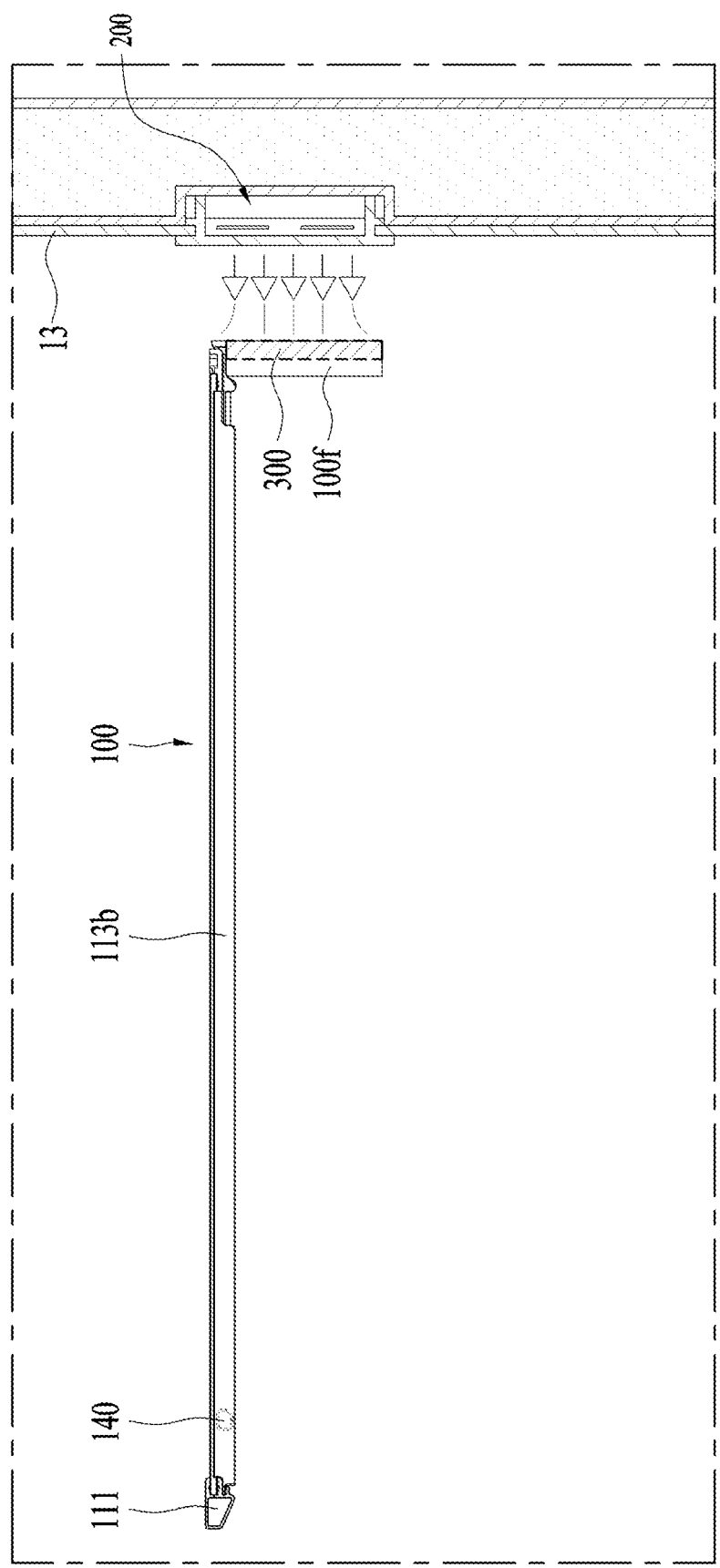
FIG. 51 is a side view illustrating the shelf of FIG. 50.

The shelf 100 may be supported on the sidewall 15 of the refrigerator, rather than the rear wall 13. The transmitter 200 and the receiver 300 may be applied to wirelessly supply power to the light source unit 140 of the shelf 100. FIG. 48 is a front view illustrating the configuration of the transmitter and the receiver of the shelf, which is supported by the sidewall of the storage compartment, and FIG. 49 is a rear view illustrating the shelf of FIG. 48. FIG. 50 is a front view illustrating another example of the configuration of the transmitter and the receiver of the shelf, which is supported by the sidewall of the storage compartment, and FIG. 51 is a side view illustrating the shelf of FIG. 50. As in the example of FIGS. 45 to 47, the configuration of the shelf has been described above, and thus only differences in configuration will be described below. For the same reason, the configuration described above with reference to the other drawings will be equally applied to any configuration not described above, and a detailed description thereof will be omitted.

Referring to FIG. 48, the sidewalls 15a and 15b of the refrigerator may include supports 15c and 15d in order to support the shelf 100. More specifically, the left support 15c may extend a predetermined length from the left sidewall 15a into the storage compartment 2, and similarly, the right support 15d may extend a predetermined length from the right sidewall 15b into the storage compartment 2. In addition, the left and right side portions of the shelf 100 may be placed on the left and right supports 15c and 15d, whereby the shelf 100 may be stably supported in the refrigerator. Because the supports 15c and 15d and the left and right side portions of the shelf 100 face each other, the transmitter 200 and the receiver 300 may be installed on the left support 15c and the left side portion of the shelf, or on the right support 15d and the right side portion of the shelf, which face each other. For example, as illustrated in FIG. 48, when the transmitter 200 is installed on the right support 15d, the receiver 300 may be installed on the right side portion of the shelf so as to face the transmitter. More specifically, the support 15d has a width smaller than a length thereof, and thus, the transmitter 200 may have a small width to suit the shape of the support 15d. The transmitter 200 may be installed on any region of the top of the support 15d. However, in order to be invisible to the user, the transmitter may be located on the central portion or the rear portion of the support 15d, rather than the front portion. In addition, as illustrated in FIG. 49, because the right rail 113b is located on the right side portion of the shelf 100, the receiver 300 may be installed on the lower surface (i.e. the bottom) of the right rail 113b so as to face the transmitter 200. When the transmitter 200 is located on the rear portion of the support 15d, the receiver 300 may be located on the rear region of the lower surface of the rail 113b so as to face the transmitter 200. The rail 113b may be used for the electrical connection between the light source unit 140, located on the front portion, and the receiver 300. For this electrical connection, the first and second connectors 124 and 125 described with reference to FIG. 45 may also be applied to the rail 113b, and the rail 113b may be formed of a conductive material. In the same manner, in order to prevent short-circuit or electric shock, an insulation material may be applied to the other surface of the rail 113b excluding, for example, electrical contacts, such as the contacts 124a, 124b, 125a and 125b of FIG. 45. Instead of the rail 113b, the wires 142c and 142d described above may be used to electrically connect the receiver 300 and the light source unit 140 to each other. In addition, protective members, such as the covers 130 and 126 described above, may be applied in order to protect, for example, the receiver and the light source unit from moisture and other foreign substances.

Alternatively, referring to FIG. 51, even when the shelf 100 is supported on the sidewall 15, the transmitter 200 may be located on the rear wall 13. While FIG. 50 illustrates the transmitter 200 as being located on the central portion of the rear wall 13, the transmitter 200 may be located on any region of the rear wall 200 close to the rear portion of the shelf 100. As illustrated in FIGS. 50 and 51, the bracket 100f may be provided on the rear portion of the shelf 100 so as to support the receiver 300. The bracket 100f, as clearly illustrated in FIG. 51, may extend a predetermined length downward from the rear end of the shelf 100. The receiver 300 may be installed on the bracket 100f so as to face the transmitter 200. As described in the example of FIGS. 48 and 49, any one of the rails 113a and 113b may be used for the electrical connection between the light source unit 140, located on the front portion, and the receiver 300. The first and second connectors 124 and 125 described with reference to FIG. 45 may also be applied to any one of the rails 113a and 113b, and the corresponding rail may be formed of a conductive material. An insulation material may be applied to the other surface of the rail 113a or 113b for electrical connection excluding the electrical contacts. Alternatively, the wires 142c and 142d may be used to electrically connect the receiver 300 and the light source unit 140 to each other. In addition, protective members, such as the covers 130 and 126 described above, may be applied in order to protect, for example, the wires 142c and 142d, the receiver 300, and the connectors 124 and 125 from moisture and other foreign substances.

With the configuration of FIGS. 48 to 51 described above, even in the shelf 100 supported on the sidewall 15, power may be effectively supplied to the light source unit 140 using the transmitter 200 and the receiver 300.

The configuration of the refrigerator described above may wirelessly supply required power to the light source unit 140 of the shelf 100. However, to provide a more improved function, it is necessary to apply appropriate control in consideration of the structure and characteristics of the refrigerator. In addition, optimization of this control enables more effective and efficient realization of an intended functional improvement. For this reason, a control method for the refrigerator described above is developed, and will be described below with reference to the related drawings. Unless there is a description to the contrary of a portion thereof, the referenced drawings and the descriptions thereto are basically included in the following description and the drawings related to the control method for reference.

Control methods to be described below may be applied to control the operations of the above-described elements, i.e. various elements, and may provide intended functions based on the operations. Accordingly, operations and functions related to the control method may be considered as the features of the control method and the features of all of the related structural elements. In addition, a control unit may be called various names, such as a processor, a controller, and a control device, and may control all elements of the refrigerator for performing predetermined operations. Accordingly, the control unit may substantially control all methods and modes to be described in the present application, and thus, all steps to be described below may become the features of the control unit. For this reason, although the following steps and details thereof are not clearly described as being performed by the control unit or the refrigerator, they should be understood as the features of the controller or the refrigerator.

Figure 15:
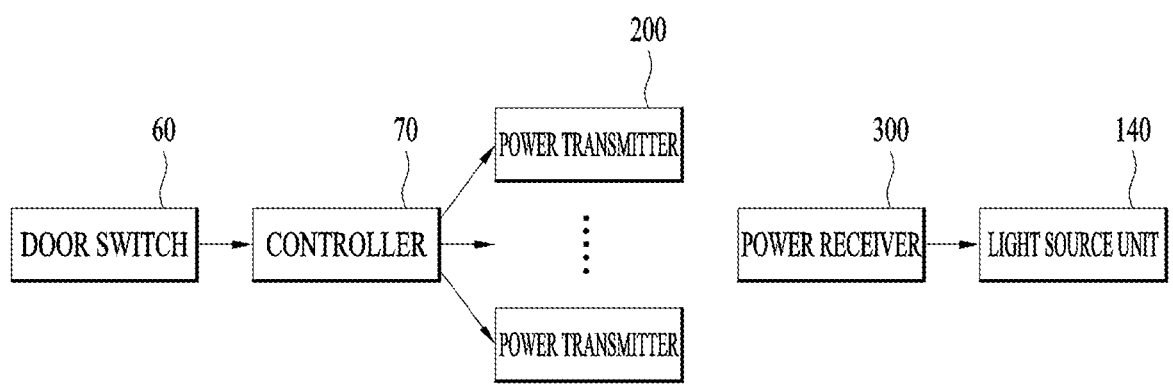
FIG. 15 is a block diagram illustrating the configuration of the refrigerator according to one example of the present application.
Figure 54:
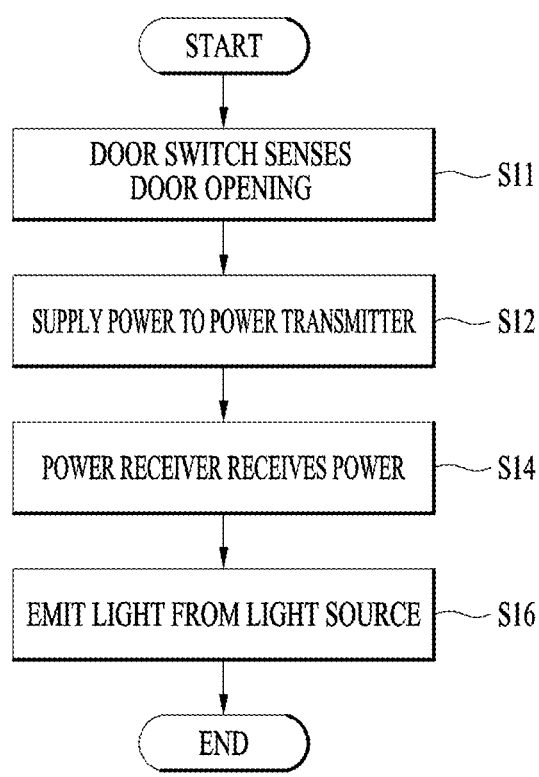
FIG. 54 is a flowchart illustrating a method of controlling the light source when a door is opened.
Figure 55:
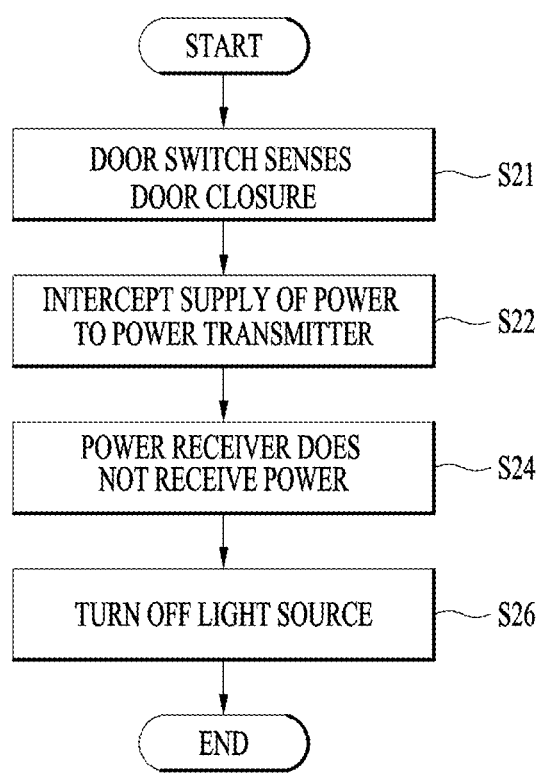
FIG. 55 is a flowchart illustrating a method of controlling the light source when the door is closed.

FIG. 15 is a block diagram illustrating the refrigerator according to the present application. FIG. 54 is a flowchart illustrating a method of controlling the light source when a door is opened, and FIG. 55 is a flowchart illustrating a method of controlling the light source when the door is closed.

Referring to FIG. 15, the configuration of the refrigerator may be described in terms of control. First, the refrigerator may have a door switch 60 for sensing the opening or closing of the doors 20 and 40. In order to sense the opening or closing thereof, the door switch 60 may be located close to the doors 20 and 40. The door switch 60 may include a first door switch for sensing the opening or closing of the first door 20, and a second door switch for sensing the opening or closing of the second door 40.

The sensed signal of the door switch 60 may be transmitted to a controller 70. The controller 70 may determine the opening or closing of the doors 20 and 40 based on the signal received from the door switch 60. The controller 70 may supply power to the transmitter 200, which may transmit power. Here, the controller 70 may supply power to the transmitter 200 only when the door is opened.

As described above, a plurality of transmitters 200 may be installed. The controller 70 may supply power to all of the transmitters 200, or to only some of the transmitters 200 when the door is opened. The power may be wirelessly transmitted from the transmitter 200 to the receiver 300. The power received by the receiver 300 may be transmitted to the light source unit 140 so that light is emitted from the light source unit 140.

Based on the configuration of the refrigerator described above, a detailed control method will be described below with reference to FIGS. 54 and 55.

Referring to FIG. 54, when the door 20 or 40 is opened, the door switch 60 may sense the opening of the door 20 or 40 (S11).

After the sensing step S11, the controller 70 may supply power to the transmitter 200 (S12). In the supply step S12, power may be supplied to all of the transmitters 200 when the opening of the door 20 or 40 is sensed.

Alternatively, the controller 70 may selectively supply power to some of the transmitters 200. More specifically, the controller 70 may supply power only to the transmitter 200 that is connected to the shelf 100 that is exposed by the opened door, so as to allow only the exposed shelf 100 to emit light. That is, the power may be supplied only to the transmitter 200 that is located on the sidewall 15 exposed by the opened door. For example, when the first door 20 located at the left side is opened, power may be supplied only to the transmitter 200 that is installed on the left sidewall 15, so that only the exposed left shelf emits light.

When electromagnetic waves are generated in the transmitter 200 in the state in which the receiver 300 is not located close to the transmitter, a metallic container near the transmitter may be heated by induction heating, which may cause damage to stored food. To prevent this phenomenon, in another example of selective power supply to the transmitter 200, power is not supplied to the transmitter 200 that does not face the receiver 300. That is, power may be supplied to only the transmitter 200 that faces the receiver 300. For such selective supply, the controller 70 may detect variation in the frequency of electromagnetic waves received from the transmitter 200, thereby detecting the transmitter 200 that does not face the receiver 300. More specifically, in addition to transmitting the electromagnetic waves, the transmitter 200 may receive some of the electromagnetic waves. The transmitter 200 that faces the receiver 300 senses great variation in frequency caused by resonance for power transmission, whereas the transmitter 200 that does not face the receiver 300 senses only small variation in frequency. That is, the transmitter 200 that does not face the receiver 300 may receive low-frequency-band electromagnetic waves. Accordingly, the controller 70 may intercept the supply of power to the transmitter 200 when the frequency variation of electromagnetic waves, transmitted from and again received by the corresponding transmitter 200, is small.

After the supply step S12, the receiver 300 may receive power via, for example, electromagnetic induction (S14). The power received by the receiver 300 may be changed into current to thereby be transmitted to the light source unit 140, such that the light source unit 140 may emit light (S16). When excessively strong light is emitted from the beginning, the user may be subjected to glare. Accordingly, in the emission step S16, the intensity of light emitted from the light source unit 140 may be controlled so as to gradually increase as time passes, which may allow the user to acclimatize to the light.

While most of the electromagnetic waves from the transmitter 200 are transmitted to the receiver 300, some of the electromagnetic waves may cause heating of a metallic container, thus causing damage to food in the container. In order to prevent such induction heating, power may be supplied to the transmitter 200 only for a predetermined time after the door 20 or 40 is opened. That is, when the predetermined time has passed after the door 20 or 40 is opened, the supply of power to the transmitter 200 may stop. The stoppage of the supply of power is performed after the predetermined time has passed even if the door 20 or 40 remains open, in order to prevent induction heating. For example, when 7 minutes has passed after the door 20 or 40 is opened, the supply of power to the transmitter 200 may stop. Because no electromagnetic waves are transmitted to the receiver 300 when power is not supplied to the transmitter 200, induction heating may be prevented. When power is not supplied to the transmitter 200, the light source unit 140 may also be turned off. In this case, the interception of power and the turning-off of the light source unit 140 may be announced to the user in order to prevent the user from suspecting a failure. This notification may be performed in various ways. For example, an alarm, light, or voice may be used for notification.

Referring to FIG. 55, when the door 20 or 40 is closed, the door switch 60 may sense the closing of the door (S21). Thereafter, the controller 70 intercepts the supply of power to all of the transmitters 200 (S22). Because no electromagnetic waves are generated in the transmitter 200, the receiver 300 cannot receive power (S24), and the light source unit 140 is turned off (S26).

Although the exemplary embodiments have been illustrated and described as above, it will of course be apparent to those skilled in the art that the embodiments are provided to assist understanding and the embodiments are not limited to the above description, and various modifications and variations can be made in the embodiments without departing from the spirit or scope of the disclosure, and the modifications and variations should not be understood individually from the viewpoint or scope of the disclosure so long as they include the constituent elements set forth in the claims.

What is claimed is:

1. A refrigerator comprising:
a cabinet having a storage compartment defined therein, the cabinet comprising a wall that defines at least a portion of the storage compartment;
a door configured to open and close at least a portion of the storage compartment;
a shelf configured to be detachably installed at the wall;
a light source disposed at the shelf and configured to illuminate an interior region of the storage compartment;
a power receiving coil that is electrically connected to the light source and is wound by a first number of turns in a circular or elliptical shape;
a plurality of power transmitting coils that are vertically arranged on the wall and electrically connected to an external power supply, each of the plurality of power transmitting coils being configured to face the power receiving coil and wound by a second number of turns in a circular or elliptical shape, wherein the first number of turns of the power receiving coil is greater than the second number of turns of each of the plurality of power transmitting coils;
a door switch configured to detect whether the door is opened and closed; and
at least one processor configured to:
detect, by the door switch, that the door is open, and
based on a detection that the door has been open for at least a predetermined duration of time, cut off power supplied from the external power supply to the plurality of power transmitting coils.

2. The refrigerator according to claim 1, wherein the at least one processor is configured to receive a signal from the door switch indicating that the door is opened or closed.

3. The refrigerator according to claim 1, wherein the predetermined duration of time is greater than or equal to 7 minutes.

4. The refrigerator according to claim 1, wherein the at least one processor is configured to control an output of a notification regarding the power being cut off based on determining that the door has been open for at least the predetermined duration of time, the notification comprising at least one of an audible alert or a visible alert.

5. The refrigerator according to claim 1, wherein a mutual inductance between the power receiving coil and one of the plurality of power transmitting coils is configured to increase based on an increase of the first number of turns of the power receiving coil.

6. The refrigerator according to claim 5, further comprising:
a transmitter comprising the plurality of power transmitting coils; and
a receiver comprising the power receiving coil,
wherein a resonance frequency between the transmitter and the receiver is configured to increase based on an increase of the mutual inductance between the power receiving coil and one of the plurality of power transmitting coils.

7. The refrigerator according to claim 6, wherein the resonance frequency is 300 kHz to 400 kHz.

8. The refrigerator according to claim 1, wherein the first number of turns of the power receiving coil is 27, and the second number of turns of each of the plurality of power transmitting coils is 11.

9. The refrigerator according to claim 1, wherein an outer diameter of each of the plurality of power transmitting coils is substantially equal to an outer diameter of the power receiving coil.

10. The refrigerator according to claim 9, wherein an inner diameter of each of the plurality of power transmitting coils is less than an inner diameter of the power receiving coil.

11. The refrigerator according to claim 1, wherein the cabinet comprises sidewalls, a rear wall, a top wall, and a bottom wall that define the storage compartment, the storage compartment having an opening at a front surface thereof, and
wherein the door is configured to open and close at least a portion of the opening of the storage compartment.

12. The refrigerator according to claim 11, wherein at least one of the plurality of power transmitting coils is disposed on the rear wall or at least one of the sidewalls.

13. The refrigerator according to claim 12, wherein the power receiving coil is disposed at the shelf and configured to face the at least one of the plurality of power transmitting coils.

14. The refrigerator according to claim 13, wherein the shelf comprises a bracket that is disposed at a rear side of the shelf and configured to face the rear wall of the storage compartment, and
wherein the power receiving coil is disposed at the bracket.

15. The refrigerator according to claim 13, wherein the shelf comprises a bracket that is disposed at a lateral side of the shelf and configured to face one of the sidewalls of the storage compartment, and
wherein the power receiving coil is disposed at the bracket.

16. The refrigerator according to claim 1, wherein the light source is disposed at a first side of the shelf.

17. The refrigerator according to claim 16, wherein the power receiving coil is disposed at a second side of the shelf that is different from the first side, the power receiving coil being configured to face at least one of the plurality of power transmitting coils, and
wherein the power receiving coil is configured to supply power from the at least one of the plurality of power transmitting coils to the light source.

18. The refrigerator according to claim 1, wherein the light source comprises a plurality of light emitting diodes that are arranged along a front side of the shelf, and
wherein a diameter of the power receiving coil is less than a front-rear distance from the front side of the shelf to the power receiving coil.

19. The refrigerator according to claim 1, wherein the power receiving coil comprises a pair of first winding layers that are stacked, the first number of turns being equal to an overall number of turns of the pair of first winding layers, and
wherein each of the plurality of power transmitting coils comprises a pair of second winding layers that are stacked, the second number of turns being equal to an overall number of turns of the pair of second winding layers.

* * * * *